(12) United States Patent
Ono et al.

(10) Patent No.: US 12,531,030 B2
(45) Date of Patent: Jan. 20, 2026

(54) DISPLAY WITH SILICON GATE DRIVERS AND SEMICONDUCTING OXIDE PIXELS

(71) Applicant: Apple Inc., Cupertino, CA (US)

(72) Inventors: Shinya Ono, Santa Clara, CA (US); Chin-Wei Lin, San Jose, CA (US); Chen-Ming Chen, Taoyuan (TW); Hassan Edrees, Santa Clara, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 18/407,578

(22) Filed: Jan. 9, 2024

(65) Prior Publication Data

US 2025/0131885 A1 Apr. 24, 2025

Related U.S. Application Data

(60) Provisional application No. 63/592,879, filed on Oct. 24, 2023.

(51) Int. Cl.
*G09G 3/3266* (2016.01)
*G11C 19/28* (2006.01)

(52) U.S. Cl.
CPC ..... *G09G 3/3266* (2013.01); *G09G 2300/0842* (2013.01); *G09G 2310/0286* (2013.01); *G09G 2310/0291* (2013.01); *G09G 2310/08* (2013.01); *G11C 19/28* (2013.01)

(58) Field of Classification Search
CPC ......... G09G 3/3266; G09G 2300/0842; G09G 2310/0286; G09G 2310/0291; G09G 2310/08; G11C 19/28
See application file for complete search history.

(56) References Cited

U.S. PATENT DOCUMENTS

| 8,724,406 B2 | 5/2014 | Tseng et al. |
| 9,589,523 B2 | 3/2017 | Xiao |
| 10,042,110 B2 | 8/2018 | Park |

(Continued)

FOREIGN PATENT DOCUMENTS

| KR | 101816305 B1 | 1/2018 |
| KR | 20200070156 A | 6/2020 |

(Continued)

OTHER PUBLICATIONS

U.S. Appl. No. 17/839,281, filed Jun. 13, 2022.

*Primary Examiner* — Benyam Ketema
(74) *Attorney, Agent, or Firm* — Treyz Law Group; Jason Tsai

(57) ABSTRACT

A display may include an array of pixels that receive control signals from a chain of gate drivers. The pixels can be formed using semiconducting oxide transistors, whereas the gate drivers can be formed using silicon transistor. Each gate driver may include a shift register subcircuit and an output buffer subcircuit. The shift register subcircuit may include a first set of transistors at least partially controlled by one or more shift register clock signals. The output buffer subcircuit may include a second set of transistors at least partially controlled by one or more output buffer clock signals. The output buffer clock signals can toggle independently from the shift register clock signals. Operated in this way, the shift register clock signals can have pulse widths optimized for stability while the output buffer clock signals can have pulse widths optimized for speed.

20 Claims, 38 Drawing Sheets

(56) References Cited

U.S. PATENT DOCUMENTS

| | | | |
|---|---|---|---|
| 10,916,214 B2 | 2/2021 | Huang | |
| 10,998,446 B2 | 5/2021 | Feng et al. | |
| 11,062,787 B2 | 7/2021 | Zhang et al. | |
| 11,187,902 B2 | 11/2021 | Urness et al. | |
| 11,487,061 B2 | 11/2022 | Bhargava et al. | |
| 12,198,772 B2* | 1/2025 | Qing | G09G 3/3266 |
| 2005/0156860 A1* | 7/2005 | Kim | G11C 19/28 345/100 |
| 2006/0071923 A1 | 4/2006 | Lee et al. | |
| 2006/0139293 A1 | 6/2006 | Cho | |
| 2012/0213323 A1 | 8/2012 | Tsai | |
| 2015/0036784 A1* | 2/2015 | Qing | G09G 3/3233 377/68 |
| 2015/0054799 A1 | 2/2015 | Chang et al. | |
| 2016/0189626 A1* | 6/2016 | Sun | G11C 19/28 377/64 |
| 2016/0307535 A1 | 10/2016 | Xiao | |
| 2017/0032733 A1* | 2/2017 | Jang | G09G 3/20 |
| 2017/0186373 A1* | 6/2017 | Nishikawa | G09G 3/3266 |
| 2017/0221452 A1* | 8/2017 | Hashimoto | G09G 5/18 |
| 2017/0256203 A1* | 9/2017 | Han | G11C 19/287 |
| 2018/0047341 A1* | 2/2018 | Ma | G09G 3/36 |
| 2018/0068635 A1* | 3/2018 | Zhu | G11C 19/28 |
| 2018/0091151 A1* | 3/2018 | Zheng | H03K 19/096 |
| 2019/0057638 A1 | 2/2019 | Kim et al. | |
| 2019/0219777 A1 | 7/2019 | Yakabe et al. | |
| 2020/0013473 A1* | 1/2020 | Xuan | G09G 3/20 |
| 2020/0074937 A1* | 3/2020 | Choi | G09G 3/3266 |
| 2020/0192101 A1 | 6/2020 | Ayres et al. | |
| 2020/0202761 A1* | 6/2020 | Choi | G09G 3/3266 |
| 2020/0219576 A1* | 7/2020 | Yao | G09G 3/20 |
| 2020/0341280 A1 | 10/2020 | Bablumyan et al. | |
| 2020/0357479 A1 | 11/2020 | Tao et al. | |
| 2021/0200351 A1* | 7/2021 | Yang | G09G 3/3677 |
| 2021/0272491 A1* | 9/2021 | Wang | G09G 3/3677 |
| 2021/0384276 A1 | 12/2021 | Imai et al. | |
| 2022/0283371 A1 | 9/2022 | Tekolste et al. | |
| 2022/0334396 A1 | 10/2022 | Alexeev et al. | |
| 2022/0366855 A1* | 11/2022 | Chang | G11C 19/28 |
| 2023/0014107 A1* | 1/2023 | Kitsomboonloha | G09G 3/3266 |
| 2023/0036780 A1* | 2/2023 | Lu | G09G 3/3655 |
| 2023/0084070 A1* | 3/2023 | Feng | G09G 3/20 345/204 |
| 2023/0316985 A1* | 10/2023 | Qing | G09G 3/2092 345/204 |
| 2024/0127758 A1* | 4/2024 | Ono | G09G 3/3233 |
| 2024/0221849 A1* | 7/2024 | Yang | G09G 3/20 |
| 2024/0242677 A1* | 7/2024 | Han | G09G 3/3677 |
| 2024/0312421 A1* | 9/2024 | Ono | G09G 3/3677 |
| 2025/0131885 A1* | 4/2025 | Ono | G09G 3/3266 |

FOREIGN PATENT DOCUMENTS

| | | |
|---|---|---|
| KR | 20210114603 A | 9/2021 |
| WO | 2022150630 A1 | 7/2022 |

* cited by examiner

DISPLAY WITH SILICON GATE DRIVERS AND SEMICONDUCTING OXIDE PIXELS

This application claims the benefit of U.S. Provisional Patent Application No. 63/592,879, filed Oct. 24, 2023, which is hereby incorporated by reference herein in its entirety.

BACKGROUND

This relates generally to electronic devices with displays and, more particularly, to display driver circuitry for displays such as organic light-emitting diode (OLED) displays.

Electronic devices often include displays. For example, cellular telephones, tablets, wrist-watches, and portable computers typically include displays for presenting image content to users. OLED displays have an array of display pixels based on light-emitting diodes. In this type of display, gate driver circuitry is used to provide control signals to respective rows in the array of display pixels. It can be challenging to design the gate driver circuitry.

SUMMARY

An electronic device may include a display having an array of display pixels. The display pixels may be organic light-emitting diode display pixels. Each display pixel may include an organic light-emitting diode (OLED) that emits light, one or more storage capacitor, and only semiconducting oxide transistors such as n-type semiconducting oxide transistors. The array of display pixels can be driven using a chain of gate driver circuits. The gate driver circuits can be implemented using only silicon transistors such as p-type low-temperature polysilicon transistors or using a combination of both silicon transistors and semiconducting oxide transitions. Implementing all of the pixel transistors as semiconducting oxide transistors can enable low refresh rate operations such as display refresh rates lower than 10 Hz or as low as 1 Hz or less, whereas implementing all or most of the gate driver transistors as silicon transistors can help improve the robustness of the gate drivers.

An aspect of the disclosure provides a display gate driver circuit that includes a shift register subcircuit configured to receive shift register clock signals, to receive a carry in signal, and to generate a carry out signal and an output buffer subcircuit configured to receive an output buffer clock signal and to generate a corresponding gate output signal. The output buffer subcircuit can include a first transistor having a first source-drain terminal configured to receive the output buffer clock signal, a second source-drain terminal at which the gate output signal is generated, and a gate terminal, a second transistor having a first source-drain terminal coupled to the second source-drain terminal of the first transistor, a second source-drain terminal coupled to a power supply line, and a gate terminal, and a third transistor having a gate terminal coupled to the gate terminal of the first transistor, a first source-drain terminal coupled to the gate terminal of the second transistor, and a second source-drain terminal coupled to a given node within the shift register subcircuit.

An aspect of the disclosure provides a gate driver circuit that includes a shift register subcircuit configured to receive shift register clock signals, to receive a carry in signal, and to generate a carry out signal and an output buffer subcircuit configured to receive an output buffer clock signal and to generate a corresponding gate output signal. The output buffer subcircuit can include a first silicon transistor having a first source-drain terminal configured to receive the output buffer clock signal, a second source-drain terminal at which the gate output signal is generated, and a gate terminal, a capacitor coupled across the gate terminal and the second source-drain terminal of the first silicon transistor, and a second semiconducting oxide transistor having a first source-drain terminal coupled to the second source-drain terminal of the first silicon transistor, a second source-drain terminal coupled to a power supply line, and a gate terminal.

An aspect of the disclosure provides a gate driver circuit that includes a shift register subcircuit configured to receive shift register clock signals, to receive a carry in signal, and to generate a carry out signal, where the shift register subcircuit includes only silicon transistors and a plurality of capacitors, and an output buffer subcircuit configured to receive an output buffer clock signal and to generate a corresponding gate output signal. The output buffer subcircuit can include a first semiconducting oxide transistor having a first source-drain terminal configured to receive the output buffer clock signal, a second source-drain terminal at which the gate output signal is generated, and a gate terminal and a second semiconducting oxide transistor having a first source-drain terminal coupled to the first semiconducting oxide transistor, a second source-drain terminal coupled to a power supply line, and a gate terminal that is coupled to a given node within the shift register subcircuit.

DETAILED DESCRIPTION

Figure 1:
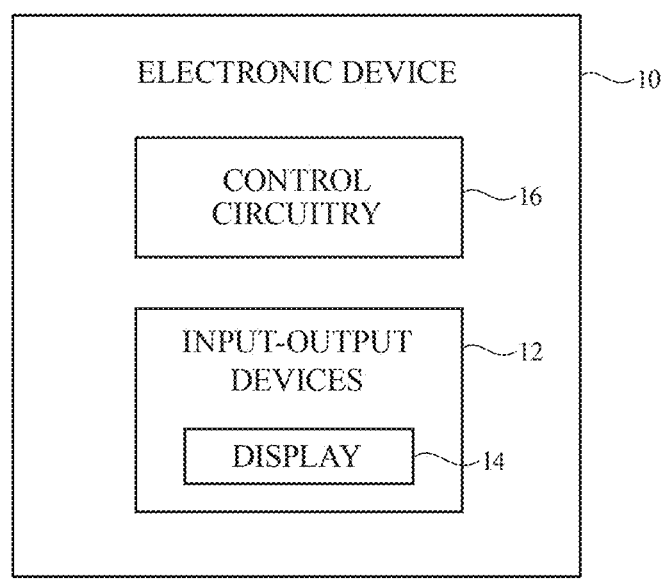
FIG. 1 is a diagram of an illustrative electronic device having a display in accordance with some embodiments.

An illustrative electronic device of the type that may be provided with a display is shown in FIG. 1. As shown in FIG. 1, electronic device 10 may have control circuitry 16. Control circuitry 16 may include storage and processing circuitry for supporting the operation of device 10. The storage and processing circuitry may include storage such as hard disk drive storage, nonvolatile memory (e.g., flash memory or other electrically-programmable-read-only memory configured to form a solid state drive), volatile memory (e.g., static or dynamic random-access-memory), etc. Processing circuitry in control circuitry 16 may be used to control the operation of device 10. The processing circuitry may be based on one or more microprocessors, application processors, microcontrollers, digital signal processors, baseband processors, power management units, audio chips, application specific integrated circuits, etc.

Input-output circuitry in device 10 such as input-output devices 12 may be used to allow data to be supplied to device 10 and to allow data to be provided from device 10 to external devices. Input-output devices 12 may include buttons, joysticks, scrolling wheels, touch pads, key pads, keyboards, microphones, speakers, tone generators, vibrators, cameras, sensors, light-emitting diodes and other status indicators, data ports, etc. A user can control the operation of device 10 by supplying commands through input-output devices 12 and may receive status information and other output from device 10 using the output resources of input-output devices 12.

Input-output devices 12 may include one or more displays such as display 14. Display 14 may be a touch screen display that includes a touch sensor for gathering touch input from a user or display 14 may be insensitive to touch. A touch sensor for display 14 may be based on an array of capacitive touch sensor electrodes, acoustic touch sensor structures, resistive touch components, force-based touch sensor structures, a light-based touch sensor, or other suitable touch sensor arrangements.

Control circuitry 16 may be used to run software on device 10 such as operating system code and applications. During operation of device 10, the software running on control circuitry 16 may display images on display 14 using an array of pixels in display 14. Device 10 may be a tablet computer, laptop computer, a desktop computer, a display, a cellular telephone, a media player, a wristwatch device or other wearable electronic equipment, or other suitable electronic device.

Display 14 may be an organic light-emitting diode display or may be a display based on other types of display technology. Configurations in which display 14 is an organic light-emitting diode (OLED) display are sometimes described herein as an example. This is, however, merely illustrative. Any suitable type of display may be used in device 10, if desired.

Display 14 may have a rectangular shape (i.e., display 14 may have a rectangular footprint and a rectangular peripheral edge that runs around the rectangular footprint) or may have other suitable shapes. Display 14 may be planar or may have a curved profile.

Figure 2:
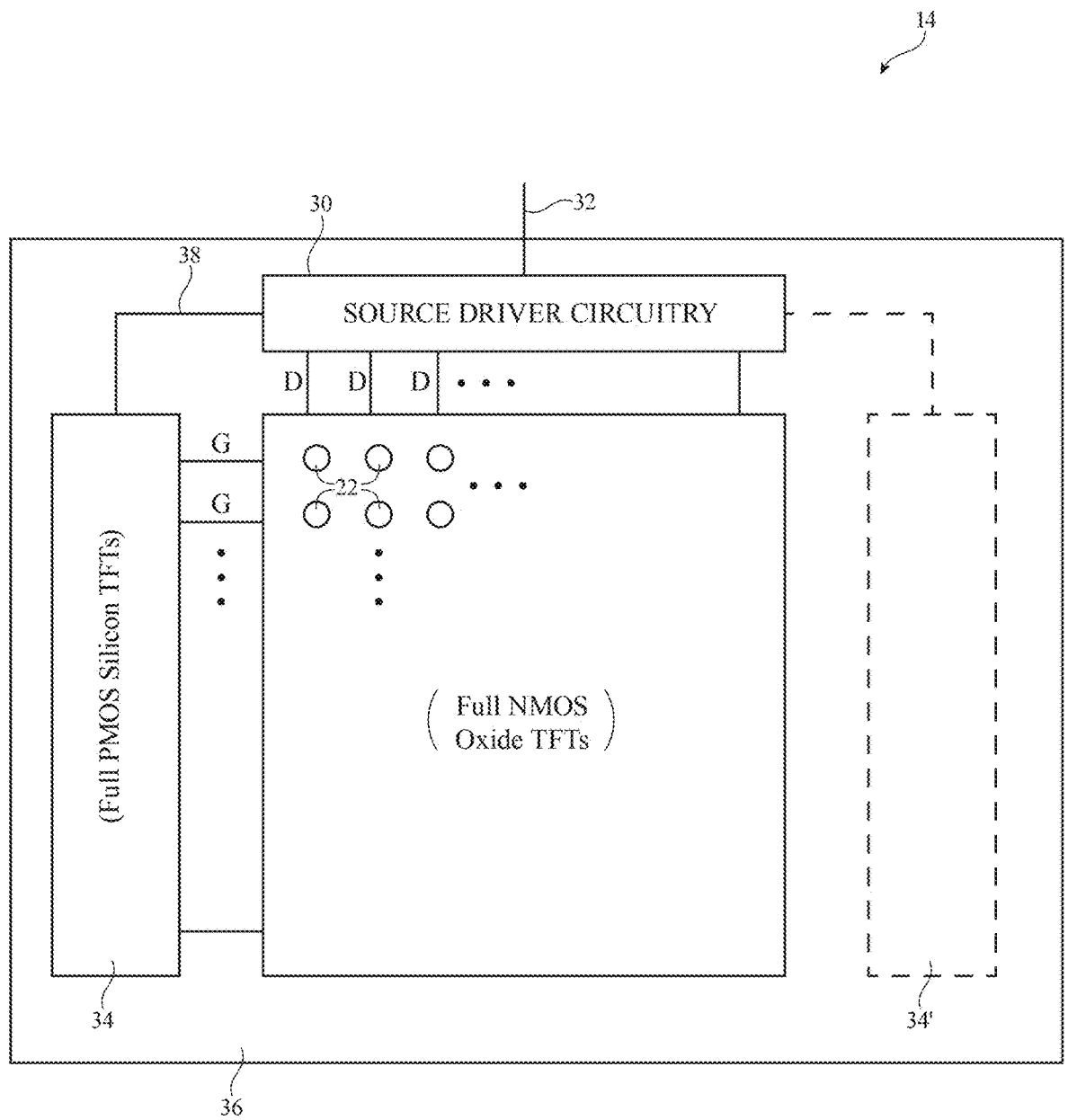
FIG. 2 is a diagram of an illustrative display having an array of organic light-emitting diode display pixels coupled to gate driver circuitry in accordance with some embodiments.

A top view of a portion of display 14 is shown in FIG. 2. As shown in FIG. 2, display 14 may have an array of pixels 22 formed on a substrate 36. Substrate 36 may be formed from glass, metal, plastic, ceramic, porcelain, or other substrate materials. Pixels 22 may receive data signals over signal paths such as data lines D (sometimes referred to as data signal lines, column lines, etc.) and may receive one or more control signals over control signal paths such as horizontal control lines G (sometimes referred to as gate lines, scan lines, emission lines, row lines, etc.). There may be any suitable number of rows and columns of pixels 22 in display 14 (e.g., tens or more, hundreds or more, or thousands or more).

Each pixel 22 may have a light-emitting diode 26 that emits light 24 under the control of a pixel control circuit formed from thin-film transistor circuitry such as thin-film transistors 28 and thin-film capacitors). Thin-film transistors 28 may be polysilicon thin-film transistors, semiconducting oxide thin-film transistors such as indium zinc gallium oxide transistors, or thin-film transistors formed from other semiconductors. Pixels 22 may contain light-emitting diodes of different colors (e.g., red, green, and blue) to provide display 14 with the ability to display color images.

Display 14 may also include source driver circuit 30 and gate driver circuitry 34 formed on substrate 36. Source driver circuitry 30 and gate driver circuitry 34 may be used in controlling the operation of pixels 22. The source driver circuitry 30 may be formed from integrated circuits, thin-film transistor circuits, or other suitable electronic circuitry. Source driver circuitry 30 of FIG. 2 may contain communications circuitry for communicating with system control circuitry such as control circuitry 16 of FIG. 1 over path 32. Path 32 may be formed from traces on a flexible printed circuit or other cable. During operation, the control circuitry (e.g., control circuitry 16 of FIG. 1) may supply circuitry 30 with information on images to be displayed on display 14.

To display the images on display pixels 22, source driver circuitry 30 may supply image data to data lines D (e.g., data lines that run down the columns of pixels 22) while issuing clock signals and other control signals to support other display driver circuitry such as gate driver circuitry 34 over path 38. If desired, source driver circuitry 30 may also supply clock signals and other control signals to additional gate driver circuitry such as gate driver circuitry 34' on an opposing edge of display 14 (e.g., the gate driver circuitry may be formed on more than one side of the display pixel array). If desired, gate driver circuitry can be formed along three different edges of the pixel array or can be formed along four different edges of the pixel array.

Gate driver circuitry 34 (sometimes referred to as horizontal line control circuitry or row driver circuitry) may be implemented as part of an integrated circuit and/or may be implemented using thin-film transistor circuitry. Horizontal/row control lines G in display 14 may carry gate line signals (scan line control signals or scan signals), emission enable control signals (emission signals), and/or other horizontal control signals for controlling the pixels in each row. There may be any suitable number of horizontal control signals per row of pixels 22 (e.g., one or more row control lines, two or more row control lines, three or more row control lines, four or more row control lines, five or more row control lines, etc.). Gate driver circuitry 34 may include multiple gate driver circuits connected in a chain. For example, each gate driver may be configured to generate one or more scan signals and/or carry signals that are fed forward to a succeeding gate driver in the chain or that are fed back to a preceding gate driver in the chain.

The active components within display 14 may be implemented using thin-film transistors such as semiconducting oxide transistors and silicon transistors. "Semiconducting oxide" transistors can be defined herein as thin-film transistors having a channel region formed from semiconducting oxide material (e.g., indium gallium zinc oxide or IGZO, indium tin zinc oxide or ITZO, indium gallium tin zinc oxide or IGTZO, indium tin oxide or ITO, or other semiconducting oxide material) and are generally n-type (n-channel) transistors. In contrast, "silicon transistors" can be defined herein as thin-film transistors having a channel region formed from silicon material such as polysilicon deposited using a low temperature process. Silicon transistors having such type of polysilicon active material deposited using a low temperature process are thus sometimes referred to as LTPS (low temperature polysilicon) transistors.

In accordance with an embodiment, pixels 22 within the active area of display 14 can be implemented using only semiconducting oxide (e.g., n-type) transistors. In other words, pixels 22 do not include any silicon transistors. Semiconducting oxide transistors exhibit lower leakage than silicon transistors, so implementing pixels 22 using only semiconducting oxide transistors can be beneficial and technically advantage by helping to reduce flicker (e.g., by preventing current from leaking away from one or more storage nodes within pixel 22) and by enabling display 14 to operate at low refresh rates. For example, implementing pixels 22 using only semiconducting oxide transistors can enable display 14 to operate using refresh rates lower than 60 Hz, lower than 30 Hz, lower than 10 Hz, at 1 Hz, at 2 Hz, at 1-10 Hz, or less than 1 Hz. The example of FIG. 2 in which pixel 22 includes only semiconducting oxide transistors is illustrative. If desired, each pixel 22 can include one or more semiconducting oxide transistors and/or can include one or more silicon transistors.

In contrast to pixels 22, gate driver circuitry 34 formed along a peripheral edge of display 14 can be implemented using only silicon (e.g., LTPS) transistors. In other words, gate driver circuitry 34 does not include any semiconducting oxide transistors. As an example, gate driver circuitry 34 can be implemented using only p-type metal-oxide-semiconductor (PMOS) silicon transistors. As another example, gate driver circuitry 34 can be implemented using only n-type metal-oxide-semiconductor (NMOS) silicon transistors. As another example, gate driver circuitry 34 can be implemented using both PMOS and NMOS silicon transistors. Silicon transistors offer improved reliability and robustness compared to semiconducting oxide transistors, so implementing gate driver circuitry 34 using only silicon transistors can be beneficial and technically advantageous by prolonging the lifetime of gate driver circuitry 34 where a lot of switching activity takes place and where leakage is not as big of a concern relative to pixels 22. The example of FIG. 2 in which pixel 22 includes only silicon transistors is illustrative. If desired, gate driver circuitry 34 can include one or more silicon transistors and/or can include one or more semiconducting oxide transistors.

Figure 3:
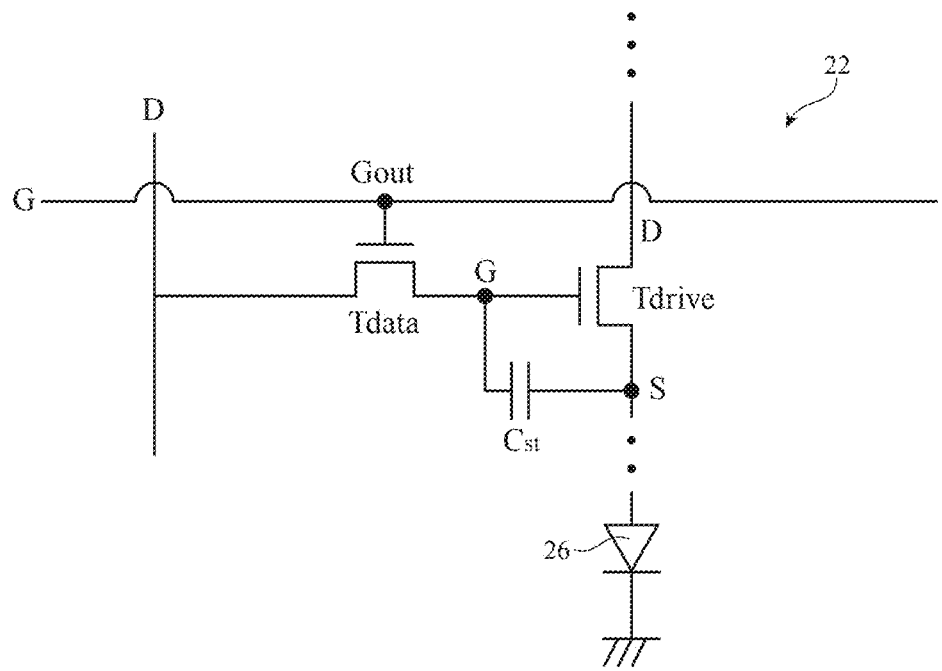
FIG. 3 is a circuit diagram of an illustrative display pixel in accordance with some embodiments.

FIG. 3 is a circuit diagram of an illustrative display pixel 22 within display 14. As shown in FIG. 3, display pixel 22 may include a light-emitting element such as an organic light-emitting diode 26, one or more capacitors such as storage capacitor Cst, and thin-film transistors such a drive transistor Tdrive and a data loading transistor Tdata. Light-emitting diode 26 may have an associated diode capacitance Coled (not shown). As described above, all of the transistors within pixel 22 such as transistors Tdrive and Tdata can be implemented as semiconducting oxide transistors.

Drive transistor Tdrive has a gate terminal G, a drain terminal D, and a source terminal S. The terms "source" and "drain" terminals that are used to describe current-conducting terminals of a transistor are sometimes interchangeable and may sometimes be referred to herein as "source-drain" terminals. For example, the drain terminal D of the drive transistor can be referred to as a first source-drain terminal, whereas the source terminal S of the drive transistor can be referred to as a second source-drain terminal, or vice versa. Transistor Tdrive and light-emitting diode 26 can be coupled in series between a positive power supply line and a ground power supply line. In the example of FIG. 3, storage capacitor Cst may be coupled across the gate and source terminals of drive transistor Tdrive. Data loading transistor Tdata may have a first source-drain terminal coupled to the gate terminal of transistor Tdrive, a second source-drain terminal coupled to a data line D (e.g., a column line carrying a data signal), and a gate terminal configured to receive a gate driver output signal GOUT from a gate line G. Gate output signal GOUT is therefore sometimes referred to as a gate line signal or a scan control signal.

Display pixel 22 shown in FIG. 3 is illustrative. If desired, pixel 22 can include additional transistors such as one or emission transistors (e.g., a transistor that is activated during an emission phase of pixel 22), one or more initialization transistors (e.g., a transistor that is activated during an initialization phase to initialize an internal node of pixel 22 to an initialization voltage level or a reference voltage level), one or more anode reset transistors (e.g., a transistor that is activated during a reset phase to reset the anode terminal of diode 26 to a reset voltage level), one or more biasing transistors (e.g., a transistor that is activated during a threshold voltage sampling phase or an on-bias stress phase to bias an internal node of pixel 22 to a known voltage level), one or more additional capacitors (e.g., a capacitor configured to boost a drive current that flows through the drive transistor during the emission phase), and/or other additional components. If desired, pixel 22 can be controlled using one or more scan (row control) signals, two or more scan signals, three or more scan signals, one or more emission (row control) signals, two or more emission signals, other row control or column control signals, or other global control signal(s).

Figure 4:
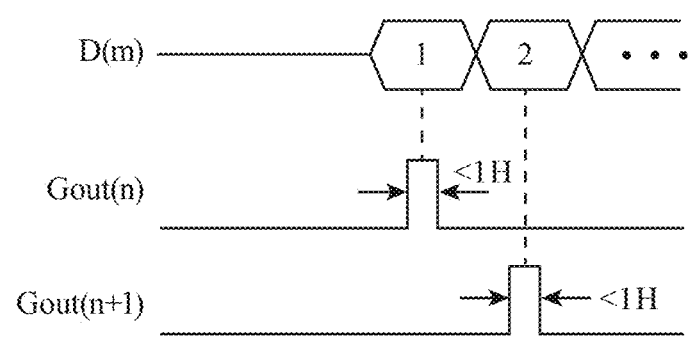
FIG. 4 is a timing diagram illustrating short gate pulses that are used for successive data loading operations in accordance with some embodiments.

FIG. 4 is a timing diagram illustrating short gate pulses that can be used for loading data signals into successive rows of pixels 22. In FIG. 4, gate output signal GOUT(n) can be used to control the data loading transistors in pixels 22 in row n of the display pixel array, and gate output signal GOUT(n+1) can be used to control the data loading transistors in pixels 22 in row (n+1) of the display pixel array. As shown in FIG. 4, gate output signal GOUT(n) can be pulsed high to load data signals D(1) into a row of pixels, and gate output signal GOUT(n+1) can be subsequently pulsed high to load data signals D(2) into a succeeding row of pixels. Each of the gate pulses can have a pulse width that is fixed to one row time or less (e.g., the pulse width can be less than 1H). The timing of signals GOUT that are used to control the data loading transistors (sometimes referred to as data loading scan signals or data programming control signals) is most critical since it has a tightest timing margin. Since the time duration for the data loading GOUT pulse can be fixed to one row time (1H) or less, the gate driver circuit that generates these GOUT pulses must exhibit sufficient driving capability to drive signals GOUT high and low at the requisite speed of display 14.

Figure 5A:
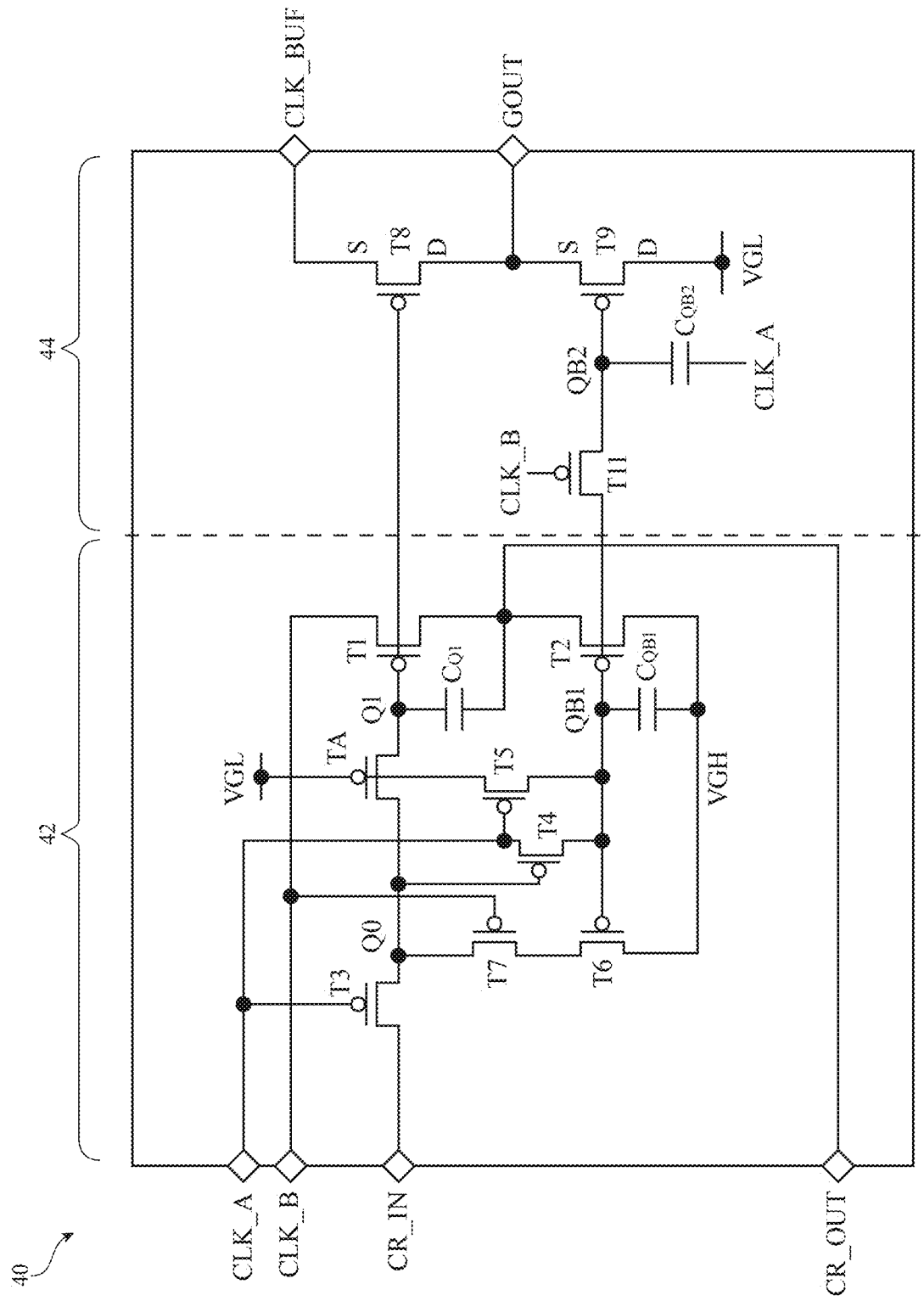
FIG. 5A is a circuit diagram of an illustrative gate driver circuit having a shift register subcircuit and an output buffer subcircuit in accordance with some embodiments.

In accordance with an embodiment, FIG. 5A is a circuit diagram of an illustrative gate driver circuit 40 configured to generate gate output signals GOUT with fast rise and/or fall times. As shown in FIG. 5A, gate driver 40 may include a logic subcircuit 42 and an output buffer subcircuit 44. The logic subcircuit 42 portion of gate driver 40 can receive a carry in signal CR_IN from a gate driver in a preceding row and can output a carry out signal CR_OUT to a gate driver in a succeeding row. Operated in this way, the logic subcircuit 42 is sometimes referred to and defined herein a "shift register" subcircuit 42. As an example, all of the transistors within gate driver circuit 40 are implemented as silicon transistors (e.g., all of transistors within gate driver 40 can be implemented as PMOS LTPS thin-film transistors).

Shift register subcircuit 42 may include transistors T1-T7 and TA and capacitors $C_{Q1}$ and $C_{QB1}$. Transistors T1-T8 and TA are therefore sometimes referred to as logic or shift register transistors. Transistor T1 may have a gate terminal coupled to node Q1, a drain terminal configured to receive a logic (shift register) clock signal CLK_B, and a source terminal coupled to a carry output port on which carry out signal CR_OUT is generated. Signal CR_OUT can be fed to one or more succeeding gate driver stages in the chain of gate drivers. Capacitor $C_{Q1}$ may be coupled across the gate and source terminals of transistor T1. Transistor T2 may have a drain terminal coupled to the carry output port, a gate terminal coupled to node QB1, and a source terminal coupled to high (positive) power supply voltage VGH. Capacitor $C_{QB1}$ may be coupled across the gate and source terminals of transistor T2. Voltage VGH may be 5 V, 6 V, 7 V, 3 to 10 V, greater than 10 V, greater than 15 V, 20 V, 15-25 V, greater than 20 V, or any suitable positive power supply voltage level.

Transistor TA may have a first source-drain terminal coupled to node Q1, a second source-drain terminal coupled to node Q0, and a gate terminal configured to receive low (ground) power supply voltage VGL. Power supply voltage VGL may be 0 V, −2 V, −4, −6V, less than −8 V, −10V, −5 to −15 V, less than −10 V, or any suitable ground or negative power supply voltage level.

Transistors T3, T7, and T6 may be coupled in series. In particular, transistor T3 may have a source terminal coupled to node Q0, a drain terminal configured to receive a carry in signal from a preceding stage via a feedforward path (e.g., to receive signal CR_IN from a previous gate driver stage in the chain), and a gate terminal configured to receive logic (shift register) clock signal CLK_A. Transistor T7 may have a drain terminal coupled to node Q0, a gate terminal configured to receive clock signal CLK_B, and a source terminal. Transistor T6 may have a drain terminal coupled to the source terminal of transistor T7, a gate terminal coupled to node QB1, and a source terminal coupled to high voltage VGH.

Transistor T5 may have a drain terminal coupled to power supply voltage VGL, a gate terminal configured to receive clock signal CLK_A, and a source terminal coupled to node QB1. Transistor T4 may have a first source-drain terminal coupled to node QB1, a second source-drain terminal configured to receive clock signal CLK_A, and a gate terminal coupled to node Q0.

Output buffer subcircuit 44 may include transistor T8 coupled in series with transistor T9. Transistors T8 and T9 in output buffer subcircuit 44 are sometimes referred to as output buffer transistors. First output buffer transistor T8 has a source terminal configured to receive output buffer clock signal CLK_BUF, a gate terminal coupled to node Q1, and a drain terminal coupled to a gate driver output port on which gate output signal GOUT is generated. Transistor T8 can be sized relatively large to help ensure that gate output signal GOUT has sufficiently short rise and fall times. Signal GOUT may, for example, represent a scan signal for controlling data loading transistor Tdata in FIG. 3 or other switching transistors within pixel 22. Second output buffer transistor T9 has a source terminal coupled to the gate driver output port, a gate terminal coupled to node QB2, and a drain terminal coupled to low power supply signal VGL.

Output buffer subcircuit 44 may also include transistor T11 and capacitor $C_{QB2}$. Transistor T11 has a first source-drain terminal coupled to node QB2, a second source-drain terminal coupled to node QB1, and a gate terminal configured to receive shift register clock signal CLK_B. Capacitor $C_{QB2}$ can have a first terminal coupled to node QB2 and a second terminal configured to receive shift register clock signal CLK_A. Connected in this way, transistor T11 and capacitor $C_{QB2}$ can be used to ensure that node QB2 is less than VGL when output buffer transistor T9 needs to be turned on.

The shift register clock signals CLK_A and CLK_B controlling logic subcircuit portion 42 of gate driver 40 are separate and isolated from the output buffer clock signal CLK_BUF controlling the output buffer portion 44 of gate driver 40. Having isolated clock signals to control the two different portions of gate driver 40 allows the shift register subcircuit 42 to operate with more process margin and longer lifetime (e.g., by allowing the internal nodes within subcircuit 42 enough time to settle/stabilize) while enabling the output buffer subcircuit 44 to operate independently at a faster speed to satisfy the more stringent timing constraints dictated by the data programming phase. In general, the pulse width for the shift register (logic) clock signals can be as long as needed, whereas the pulse width for the output buffer clock signals can be as short as needed.

Figure 5B:
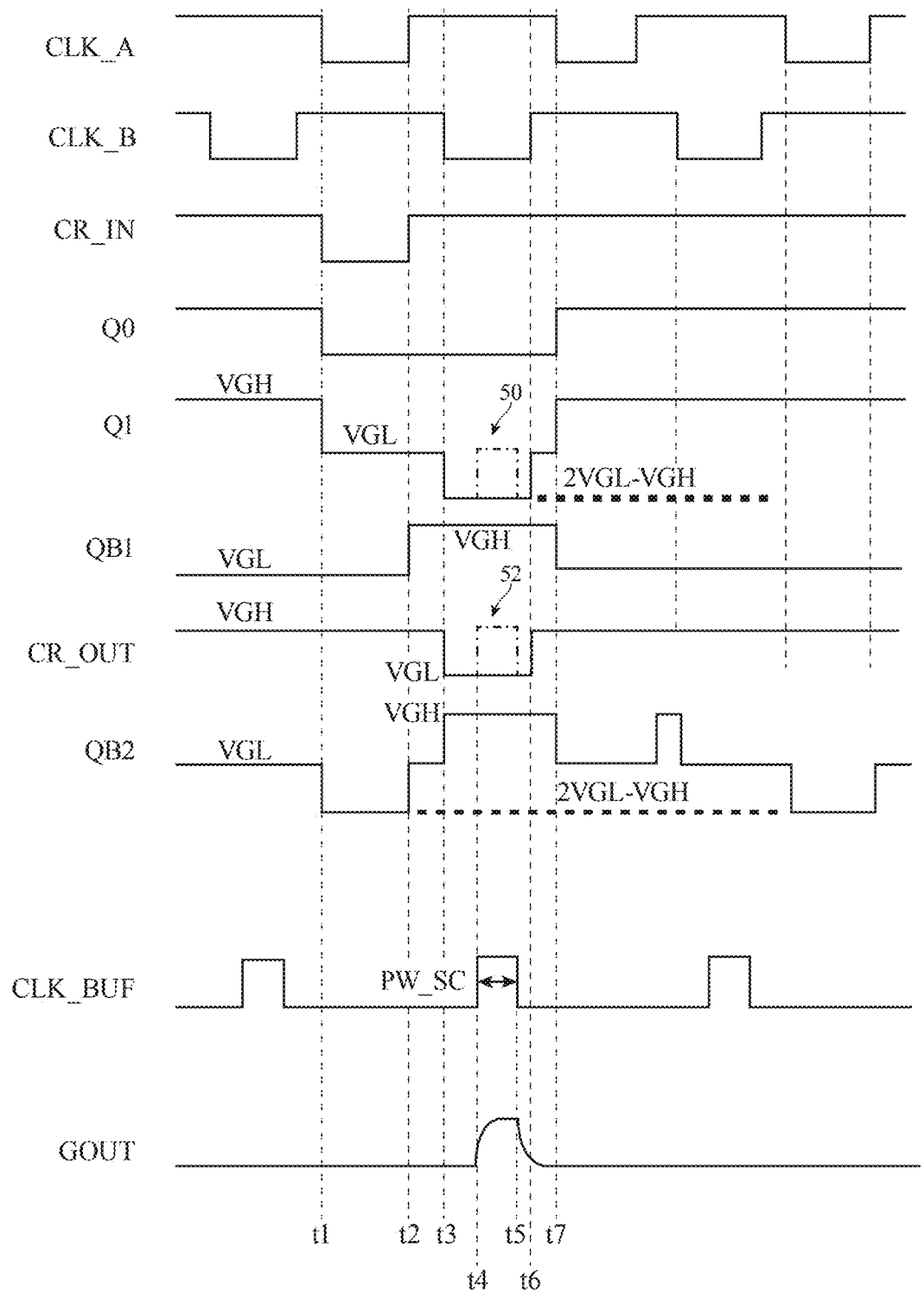
FIG. 5B is a timing diagram showing illustrative waveforms involved in operating the gate driver circuit shown in FIG. 5A in accordance with some embodiments.

FIG. 5B is a timing diagram illustrating the operation of gate driver 40 of the type shown in FIG. 5A. As shown in FIG. 5B, clock signal CLK_B may be a delayed version of clock signal CLK_A (or vice versa). The shift register clock signals CLK_A and CLK_B also have a wider pulse width than the output buffer clock signal CLK_BUF, which allows time for the internal nodes within subcircuit 42 such as nodes Q1 and QB1 to settle.

At time t1, the carry in signal CR_IN from the prior row is pulsed low (from time t1 to t2), which may be synchronized with a CLK_A pulse that turns on transistors T3 and T5, may cause nodes Q0 and Q1 to fall from VGH to VGL and node QB2 to fall from VGL to (2VGL-VGH) due to the capacitive coupling through capacitor $C_{QB2}$. At time t2, signals CR_IN and CLK_A may be driven high, which can cause node QB1 to be driven from VGL to VGH using transistor T4 and can cause node QB2 to be bumped back up to VGL via capacitor $C_{QB2}$.

At time t3, signal CLK_B may be pulsed low (from time t3 to t6), which causes carry out signal CR_OUT to be pulsed low through transistor T1. At the same time, node Q1 is pushed down to an even lower level (e.g., from VGL to 2VGL-VGH) by coupling through capacitor $C_{Q1}$. At time t3, node QB2 can be pull up (e.g., from VGL to VGH) using transistor T11.

At time t4, output buffer clock signal CLK_BUF may be pulsed high, which causes the gate output signal GOUT to be pulsed high through transistor T8. Clock signal CLK_BUF may have a pulse width PW_SC. At time t5, output buffer clock signal CLK_BUF may be deasserted, which causes the gate output signal GOUT to return to its initial level.

At time t6, the rising edge of shift register clock signal CLK_B will cause carry out signal CR_OUT to return to its initial VGH level. At the same time, node Q1 will rise back up to VGL due to coupling through capacitor $C_{Q1}$.

At time t7, a CLK_A pulse while the feedforward carry in signal CR_IN is high will cause node Q0 to be reset to its initial high level while resetting node QB1 low. Node Q0 rising will also cause node Q1 to be driven back up to VGH via transistor TA. By having a separate (isolated) output buffer clock pulse CLK_BUF that is narrower than the shift register clock pulses in CLK_A and CLK_B, gate driver 40 is able to generate gate output signal GOUT having sufficiently fast rise and fall times.

Figure 5C:
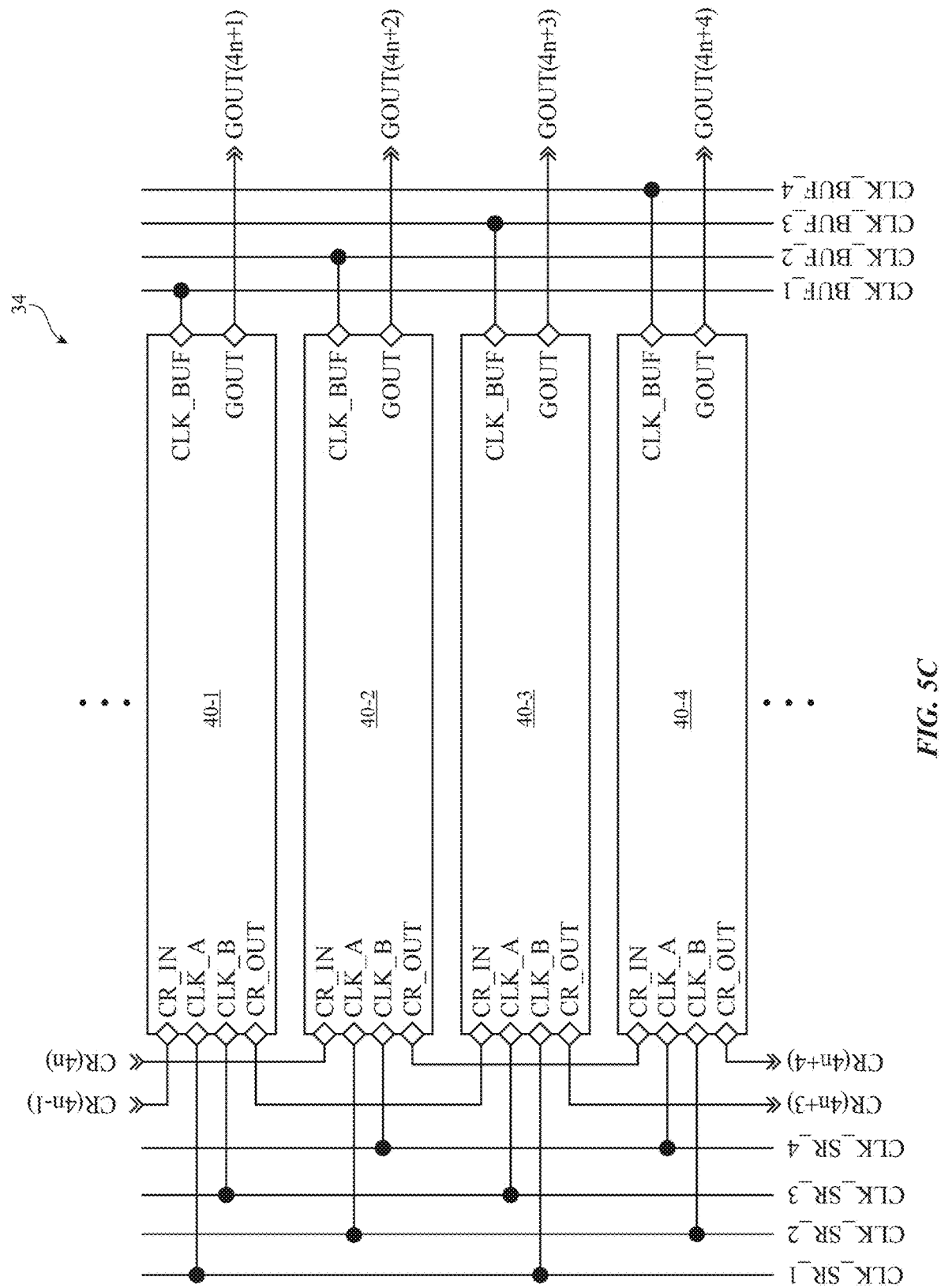
FIG. 5C is a block diagram showing multiple gate driver circuits coupled together in a chain in accordance with some embodiments.

FIG. 5C is a block diagram showing multiple gate driver circuits 40 of the type described in connection with FIGS. 5A and 5B coupled together in a chain. As shown in FIG. 5C, gate driver circuitry 34 may include a chain of gate drivers 40 such as gate drivers 40-1, 40-2, 40-3, and 40-4. Although only four gate drivers 40 are shown in FIG. 5C, gate driver circuitry 34 may include hundreds, or thousands of gate drivers 40 connected in a chain. Gate driver 40-1 can be configured to generate first gate output signal GOUT(4n+1). Gate driver 40-2 can be configured to generate second gate output signal GOUT(4n+2). Gate driver 40-3 can be configured to generate third gate output signal GOUT(4n+3). Gate driver 40-4 can be configured to generate fourth gate output signal GOUT(4n+4).

In the example of FIG. 5C, each gate driver 40 may receive a carry in signal from a gate driver two rows above and may thus generate a carry out signal that is fed forward to a gate driver two rows below. For example, gate driver 40-1 in row (4n+1) may receive a carry in signal from row (4n−1) and may output a carry out signal to row (4n+3). As another example, gate driver 40-3 in row (4n+3) may receive a carry in signal from row (4n+1) and may output a carry out signal to row (4n+5). This is merely illustrative. In general, gate driver 40 may receive a carry in signal from a gate driver in any preceding row (e.g., from one row above, two rows above, three rows above, four rows above, or more than four rows above) and may output a carry out signal to another gate driver in any succeeding row (e.g., to one row below, two rows below, three rows below, four rows below, or more than four rows below).

Although each gate driver 40 includes two shift register clock ports (e.g., CLK_A and CLK_B), gate driver circuitry 34 can be controlled using four different shift register clock signals CLK_SR_1, CLK_SR_2, CLK_SR_3, and CLK_SR_4. Clock signal CLK_SR_1 can be fed to the CLK_A port of a first gate driver in every group of four gate drivers 40 and can be fed to the CLK_B port of a third gate driver in every group of four gate drivers 40. Clock signal CLK_SR_2 can be fed to the CLK_A port of a second gate driver in every group of four gate drivers 40 and can be fed to the CLK_B port of a fourth gate driver in every group of four gate drivers 40. Clock signal CLK_SR_3 can be fed to the CLK_B port of a first gate driver in every group of four gate drivers 40 and can be fed to the CLK_A port of a third gate driver in every group of four gate drivers 40. Clock signal CLK_SR_4 can be fed to the CLK_B port of a second gate driver in every group of four gate drivers 40 and can be fed to the CLK_A port of a fourth gate driver in every group of four gate drivers 40.

Although each gate driver 40 includes one output buffer clock port (e.g., CLK_BUF), gate driver circuitry 34 can also be controlled using four different output buffer clock signals CLK_BUF_1, CLK_BUF_2, CLK_BUF_3, and CLK_BUF_4. Clock signal CLK_BUF_1 can be fed to the CLK_BUF port of a first gate driver in every group of four gate drivers 40. Clock signal CLK_BUF_2 can be fed to the CLK_BUF port of a second gate driver in every group of four gate drivers 40. Clock signal CLK_BUF_3 can be fed to the CLK_BUF port of a third gate driver in every group of four gate drivers 40. Clock signal CLK_BUF_4 can be fed to the CLK_BUF port of a fourth gate driver in every group of four gate drivers 40.

Figure 5D:
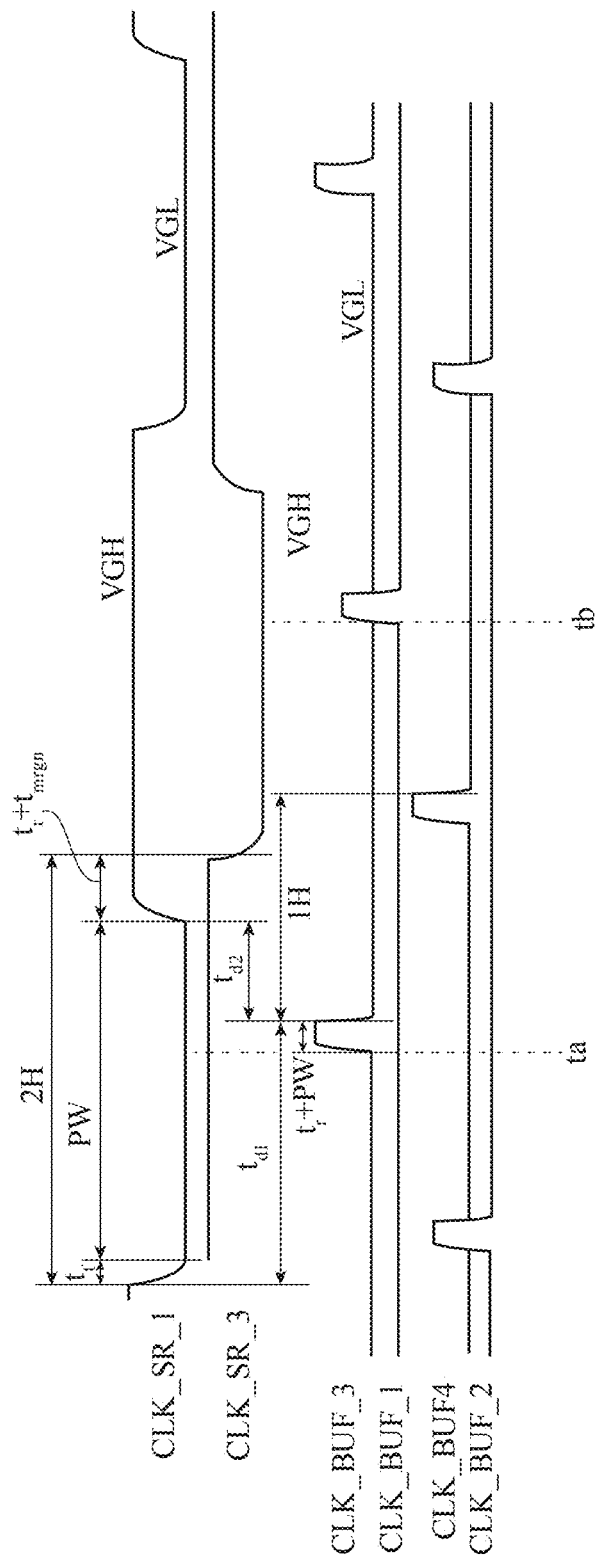
FIG. 5D is a timing diagram showing various clock signal waveforms that can be used to control multiple gate driver circuits connected in a chain in accordance with some embodiments.

FIG. 5D is a timing diagram showing at least some of the various clock signal waveforms that can be used to control the chain of gate drivers shown in FIG. 5C. As shown in FIG. 5D, shift register clock signal CLK_SR_3 may be a delayed version of shift register clock signal CLK_SR_1 and may have non-overlapping pulses. The shift register clock signals can toggle between power supply voltages VGL and VGH. At time ta, output buffer signal CLK_BUF_3 may be pulsed high during the pulse width of CLK_SR_1. At time tb, output buffer signal CLK_BUF_1 may be pulsed high during the pulse width of CLK_SR_3. Output buffer clock signals CLK_BUF_4 and CLK_BUF_2 may be similarly aligned to CLK_SR_2 and CLK_SR_4 (not shown in order to avoid obscuring the present embodiments). The output buffer clock signals can also toggle between power supply voltages VGL and VGH.

As described above, output buffer transistor T8 can be sized relatively large to ensure that the rise and fall times of gate output signal GOUT are sufficiently fast. A large transistor T8 typically results in a large parasitic gate capacitance that can couple the rising edge and the falling edge of the output buffer clock signal CLK_BUF to the gate terminal of T8. Such parasitic coupling can result in an inadvertent pulse at node Q1 (see pulse 50 at time t4 in FIG. 5B), which can also lead to an unintentional pulse in the carry out signal CR_OUT (see pulse 52 at time t4).

Figure 6A:
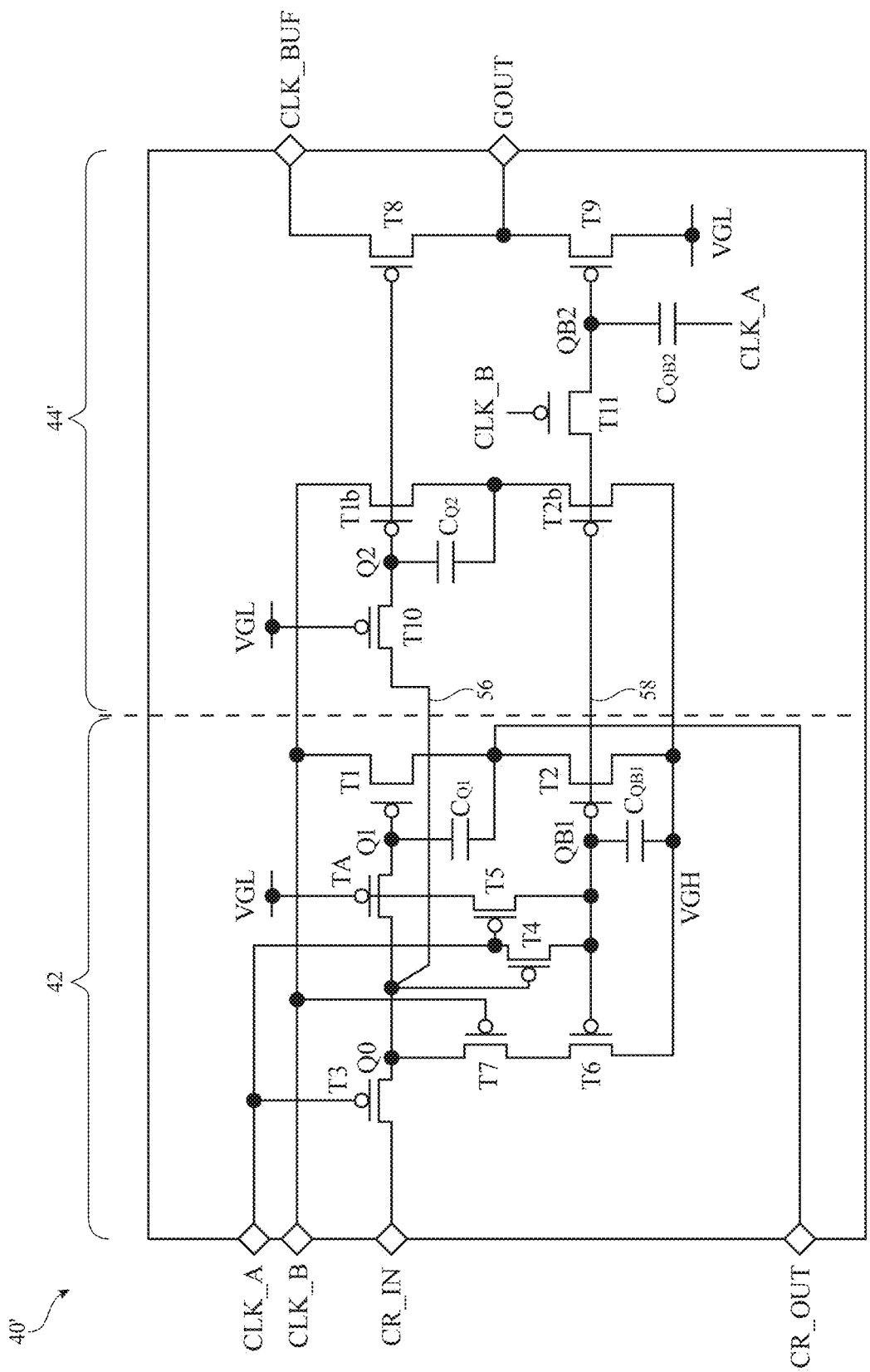
FIG. 6A is a circuit diagram of an illustrative gate driver circuit that includes additional isolation transistors for mitigating coupling from an output buffer clock signal in accordance with some embodiments.

FIG. 6A shows another embodiment of gate driver circuit 40' that includes additional transistors configured to isolate the output buffer clock signal CLK_BUF from nodes Q1 and the carry output port. As shown in FIG. 6A, gate driver 40' may include shift register subcircuit 42 and output buffer subcircuit 44'. The shift register subcircuit 42 in gate driver 40' of FIG. 6A may have an identical structure as shift register subcircuit 42 in gate driver 40 of FIG. 5A and need not be reiterated in detail to avoid obscuring the present embodiment. As an example, all of the transistors within gate driver circuit 40' can be implemented as silicon transistors (e.g., all of transistors within gate driver 40' can be implemented as PMOS LTPS thin-film transistors).

Output buffer subcircuit 44' may include transistor T8 coupled in series with transistor T9. Transistors T8 and T9 in output buffer subcircuit 44' are sometimes referred to as output buffer transistors. First output buffer transistor T8 has a source terminal configured to receive output buffer clock signal CLK_BUF, a gate terminal coupled to node Q2, and a drain terminal coupled to a gate driver output port on which gate output signal GOUT is generated. Transistor T8 can be sized relatively large to help ensure that gate output signal GOUT has sufficiently short rise and fall times. Signal GOUT may, for example, represent a scan signal for controlling data loading transistor Tdata in FIG. 3 or other switching transistors within pixel 22. Second output buffer transistor T9 has a source terminal coupled to the gate driver output port, a gate terminal coupled to node QB2, and a drain terminal coupled to low power supply signal VGL.

Output buffer subcircuit 44' may also include transistor T11 and capacitor $C_{QB2}$. Transistor T11 has a first source-drain terminal coupled to node QB2 via path 58, a second source-drain terminal coupled to node QB1, and a gate terminal configured to receive shift register clock signal CLK_B. Capacitor $C_{QB2}$ can have a first terminal coupled to node QB2 and a second terminal configured to receive shift register clock signal CLK_A. Connected in this way, transistor T11 and capacitor $C_{QB2}$ can be used to ensure that node QB2 is less than VGL when output buffer transistor T9 needs to be turned on.

Output buffer subcircuit 44' may further include transistors T10, T1b, T2b, and capacitor $C_{Q2}$. Transistor T10 may have a first source-drain terminal coupled to node Q2 (i.e., the gate terminal of transistor T8), a second source-drain terminal coupled to node Q0 via path 56, and a gate terminal configured to receive low voltage VGL. Transistor T1b may have a first source-drain terminal configured to receive shift register clock signal CLK_B, a second source-drain terminal, and a gate terminal that is coupled to node Q2. Capacitor $C_{Q2}$ may be coupled across the gate terminal and the second source-drain terminal of transistor T1b. Transistor T2b may have a first source-drain terminal coupled to the second source-drain terminal of transistor T1b, a second source-drain terminal coupled to high voltage VGH, and a gate terminal that is coupled to node QB1 via path 58. Configured in this way, transistors T10, T1b, and T2b can collectively be used to isolate any parasitic coupling that might be coupled onto the gate terminal (node Q2) of T8 from the internal nodes of shift register subcircuit 42.

Figure 6B:
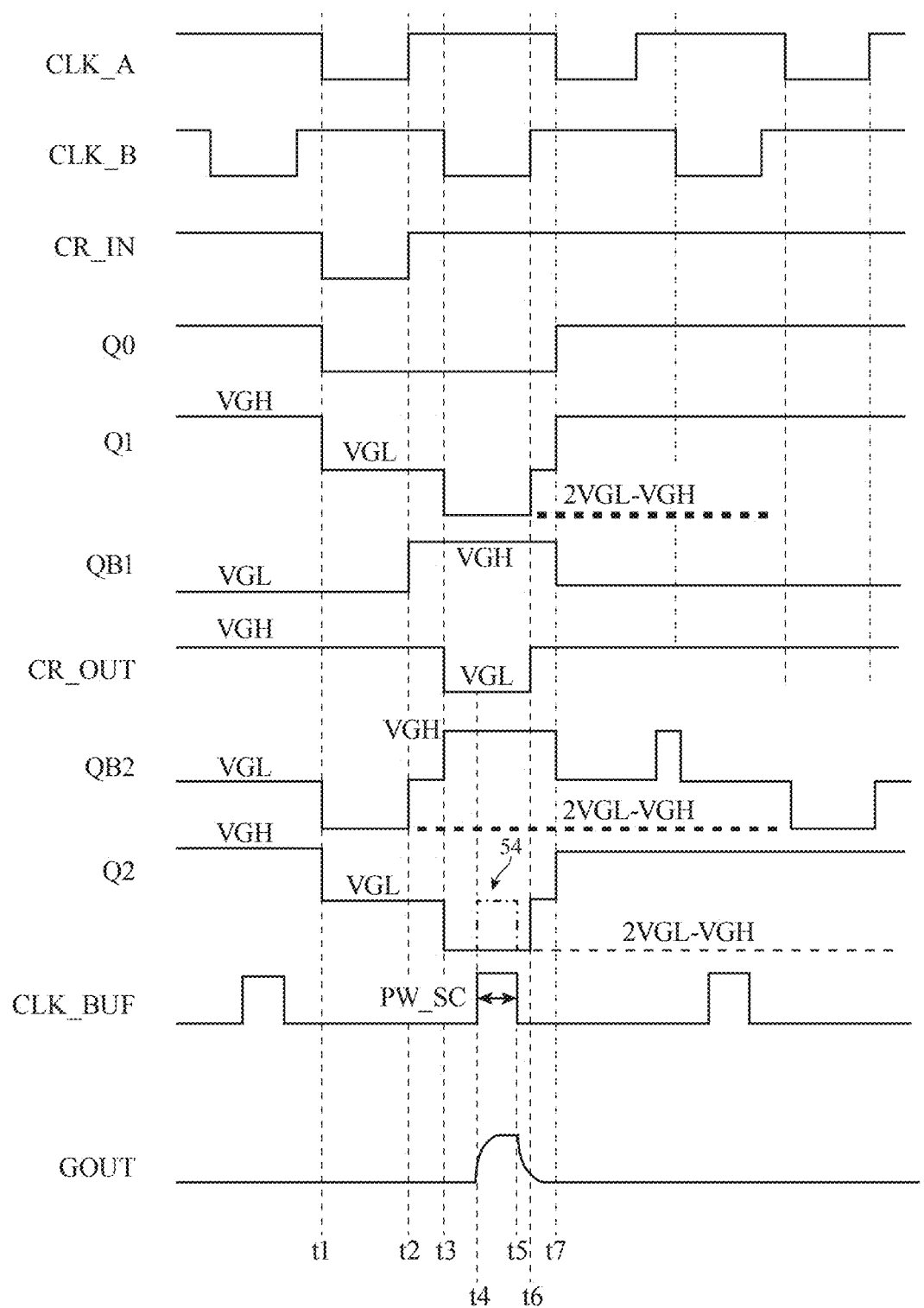
FIG. 6B is a timing diagram showing illustrative waveforms involved in operating the gate driver circuit shown in FIG. 6A in accordance with some embodiments.

FIG. 6B is a timing diagram illustrating the operation of gate driver 40' of the type shown in FIG. 6A. At time t1, the carry in signal CR_IN from the prior row is pulsed low (from time t1 to t2), which may be synchronized with a CLK_A pulse that turns on transistors T3 and T5, may cause nodes Q0 and Q1 to fall from VGH to VGL and node QB2 to fall from VGL to (2VGL-VGH) due to the capacitive coupling through capacitor $C_{QB2}$. Node Q0 falling can also cause node Q2 to fall from VGH to VGL using transistor T10. At time t2, signals CR_IN and CLK_A may be driven high, which can cause node QB1 to be driven from VGL to VGH using transistor T4 and can cause node QB2 to be bumped back up to VGL via capacitor $C_{QB2}$.

At time t3, signal CLK_B may be pulsed low (from time t3 to t6), which causes carry out signal CR_OUT to be pulsed low through transistor T1. During this time, node Q2 can also fall from VGL to (2VGL-VGH). At the same time, node Q1 is pushed down to an even lower level (e.g., from VGL to 2VGL-VGH) by coupling through capacitor $C_{Q1}$. At time t3, node QB2 can be pull up (e.g., from VGL to VGH) using transistor T11.

At time t4, output buffer clock signal CLK_BUF may be pulsed high, which causes the gate output signal GOUT to be pulsed high through transistor T8. Clock signal CLK_BUF may have a pulse width PW_SC. At time t5, output buffer clock signal CLK_BUF may be deasserted, which causes the gate output signal GOUT to return to its initial level.

At time t6, the rising edge of shift register clock signal CLK_B will cause carry out signal CR_OUT to return to its initial VGH level. At the same time, node Q1 will rise back up to VGL due to coupling through capacitor $C_{Q1}$, and node Q2 will rise back up to VGL as well.

At time t7, a CLK_A pulse while the feedforward carry in signal CR_IN is high will cause node Q0 to be reset to its initial high level while resetting node QB1 low. Node Q0 rising will also cause node Q1 to be driven back up to VGH via transistor TA. Node Q2 will also rise back up to VGH. By having a separate (isolated) output buffer clock pulse CLK_BUF that is narrower than the shift register clock pulses in CLK_A and CLK_B, gate driver 40' is able to generate gate output signal GOUT having sufficiently fast rise and fall times.

As described above, output buffer transistor T8 can be sized relatively large to ensure that the rise and fall times of gate output signal GOUT are sufficiently fast. A large transistor T8 typically results in a large parasitic gate capacitance that can couple the rising edge and the falling edge of the output buffer clock signal CLK_BUF to the gate terminal of T8. Such parasitic coupling can result in an inadvertent pulse at node Q2 (see pulse 54 at time t4 in FIG. 6B). Isolating node Q2 from the internal nodes of shift register subcircuit 42 using transistor T10 in this way can be technically advantageous since the parasitic clock coupling will not affect the carry out waveform.

A plurality of gate drivers 40' can be coupled together in a chain in a way similar to that already shown in FIG. 5C. The carry signals can be fed from one gate driver 40' to another gate driver 40'. At least four different shift register clock signals CLK_SR1, CLK_SR_2, CLK_SR_3, and CLK_SR4 can be used to control the CLK_A and CLK_B ports in each group of four gate drivers 40'. Similarly, at least four different output buffer clock signals CLK_BUF_1, CLK_BUF_2, CLK_BUF_3, and CLK_BUF_4 can be used to control the CLK_BUF ports in each group of four gate drivers 40'. The timing of these shift register clock signals and output buffer clock signals that are used to control a chain of gate drivers 40' can be identical or similar to the waveforms already shown in FIG. 5D.

Figure 7A:
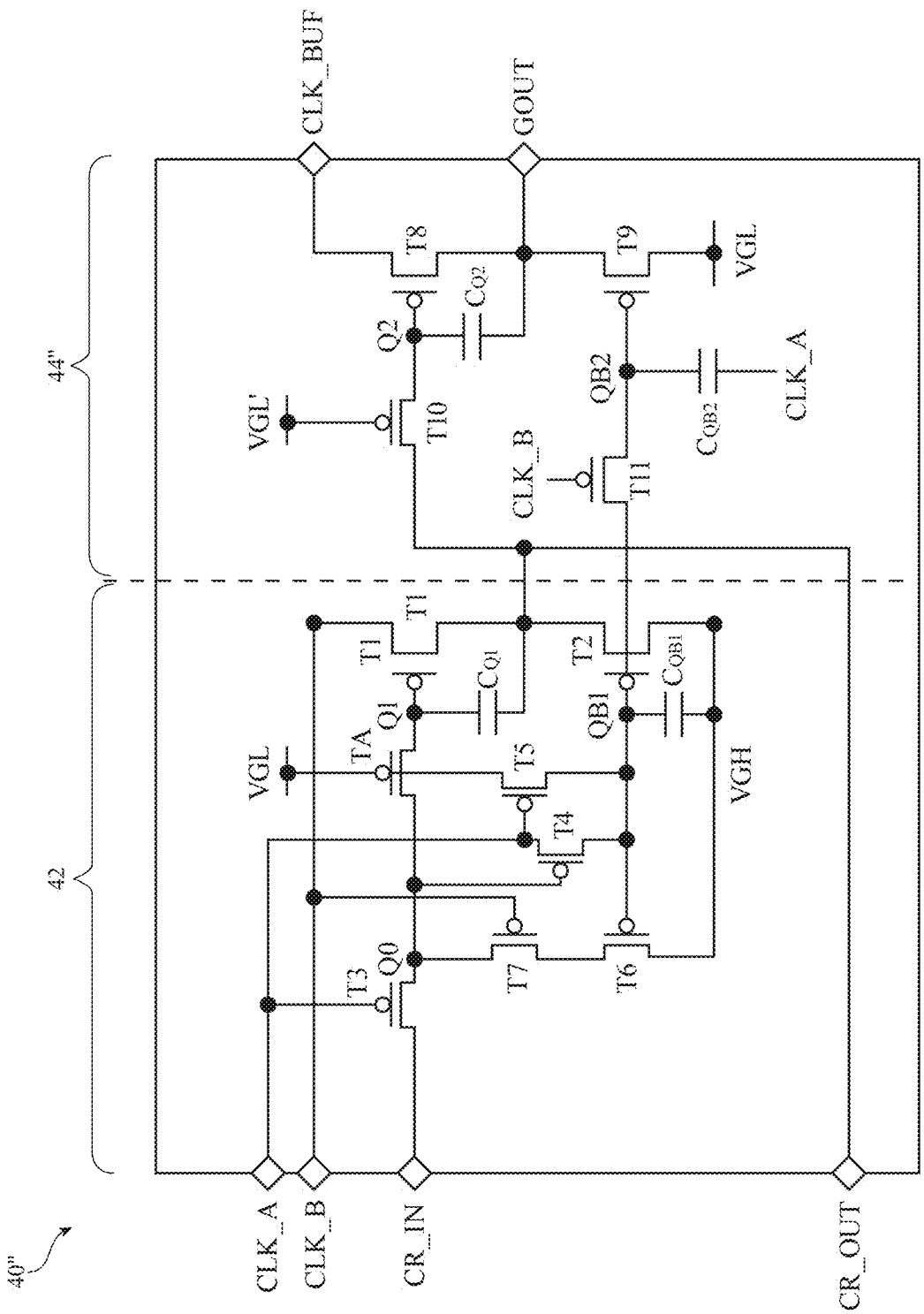
FIG. 7A is a circuit diagram of an illustrative gate driver circuit having a shift-register subcircuit and an output buffer subcircuit powered using different ground voltages in accordance with some embodiments.

FIG. 7A shows another embodiment of gate driver circuit 40" that is powered using two different low voltages VGL and VGL'. As shown in FIG. 7A, gate driver 40" may include shift register subcircuit 42 and output buffer subcircuit 44". The shift register subcircuit 42 in gate driver 40" of FIG. 7A may have an identical structure as shift register subcircuit 42 in gate driver 40 of FIG. 5A and need not be reiterated in detail to avoid obscuring the present embodiment. As an example, all of the transistors within gate driver circuit 40" can be implemented as silicon transistors (e.g., all of transistors within gate driver 40" can be implemented as PMOS LTPS thin-film transistors).

Output buffer subcircuit 44" may include transistor T8 coupled in series with transistor T9. First output buffer transistor T8 has a source terminal configured to receive output buffer clock signal CLK_BUF, a gate terminal coupled to node Q2, and a drain terminal coupled to a gate driver output port on which gate output signal GOUT is generated. Transistor T8 can be sized relatively large to help ensure that gate output signal GOUT has sufficiently short rise and fall times. Signal GOUT may, for example, represent a scan signal for controlling data loading transistor Tdata in FIG. 3 or other switching transistors within pixel 22. Second output buffer transistor T9 has a source terminal coupled to the gate driver output port, a gate terminal coupled to node QB2, and a drain terminal coupled to low power supply signal VGL.

Output buffer subcircuit 44" may also include transistor T11 and capacitor $C_{QB2}$. Transistor T11 has a first source-drain terminal coupled to node QB2, a second source-drain terminal coupled to node QB1, and a gate terminal configured to receive shift register clock signal CLK_B. Capacitor $C_{QB2}$ can have a first terminal coupled to node QB2 and a second terminal configured to receive shift register clock signal CLK_A. Connected in this way, transistor T11 and capacitor $C_{QB2}$ can be used to ensure that node QB2 is less than VGL when output buffer transistor T9 needs to be turned on.

Output buffer subcircuit 44" may further include transistors T10 and capacitor $C_{Q2}$. Transistor T10 may have a first source-drain terminal coupled to node Q2 (i.e., the gate terminal of transistor T8), a second source-drain terminal coupled to the carry output port, and a gate terminal configured to receive low voltage VGL'. Low voltage VGL' may be less than VGL (e.g., VGL' may be at least one Vth less than VGL, where Vth represents the threshold voltage of transistor T10). Capacitor $C_{Q2}$ may be coupled across the gate terminal and the drain terminal of transistor T8.

Figure 7B:
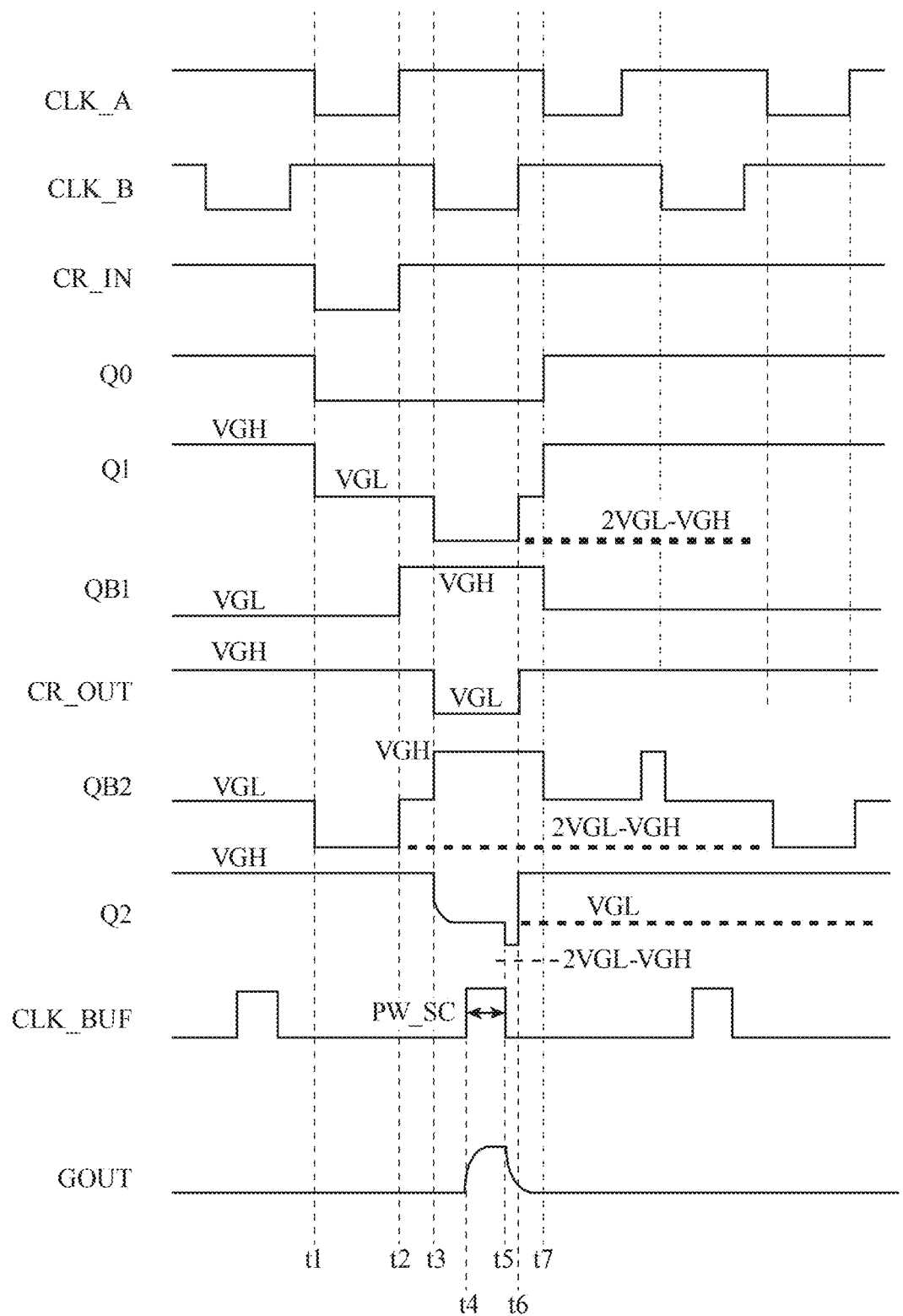
FIG. 7B is a timing diagram showing illustrative waveforms involved in operating the gate driver circuit shown in FIG. 7A in accordance with some embodiments.

FIG. 7B is a timing diagram illustrating the operation of gate driver 40" of the type shown in FIG. 7A. At time t1, the carry in signal CR_IN from the prior row is pulsed low (from time t1 to t2), which may be synchronized with a CLK_A pulse that turns on transistors T3 and T5, may cause nodes Q0 and Q1 to fall from VGH to VGL and node QB2 to fall from VGL to (2VGL-VGH) due to the capacitive coupling through capacitor $C_{QB2}$. At time t2, signals CR_IN and CLK_A may be driven high, which can cause node QB1 to be driven from VGL to VGH using transistor T4 and can cause node QB2 to be bumped back up to VGL via capacitor $C_{QB2}$.

At time t3, signal CLK_B may be pulsed low (from time t3 to t6), which causes carry out signal CR_OUT to be pulsed low through transistor T1. During this time, node Q2 can also fall from VGH to VGL through transistor T10. At the same time, node Q1 is pushed down to an even lower level (e.g., from VGL to 2VGL-VGH) by coupling through capacitor $C_{Q1}$. At time t3, node QB2 can be pull up (e.g., from VGL to VGH) using transistor T11.

At time t4, output buffer clock signal CLK_BUF may be pulsed high, which causes the gate output signal GOUT to be pulsed high through transistor T8. Clock signal CLK_BUF may have a pulse width PW_SC. At time t5, output buffer clock signal CLK_BUF may be deasserted, which causes the gate output signal GOUT to return to its initial level. At the falling edge of GOUT at time t5, node Q2 may be coupled down to a voltage below VGL through capacitor $C_{Q2}$.

At time t6, the rising edge of shift register clock signal CLK_B will cause carry out signal CR_OUT to return to its initial VGH level. At the same time, node Q1 will rise back up to VGL due to coupling through capacitor $C_{Q1}$, and node Q2 will rise back up to VGH using transistor T10.

At time t7, a CLK_A pulse while the feedforward carry in signal CR_IN is high will cause node Q0 to be reset to its initial high level while resetting node QB1 low. Node Q0 rising will also cause node Q1 to be driven back up to VGH via transistor TA. By having a separate (isolated) output buffer clock pulse CLK_BUF that is narrower than the shift register clock pulses in CLK_A and CLK_B, gate driver 40"

is able to generate gate output signal GOUT having sufficiently fast rise and fall times.

A plurality of gate drivers 40" can be coupled together in a chain in a way similar to that already shown in FIG. 5C. The carry signals can be fed from one gate driver 40" to another gate driver 40". At least four different shift register clock signals CLK_SR1, CLK_SR_2, CLK_SR_3, and CLK_SR4 can be used to control the CLK_A and CLK_B ports in each group of four gate drivers 40". Similarly, at least four different output buffer clock signals CLK_BUF_1, CLK_BUF_2, CLK_BUF_3, and CLK_BUF_4 can be used to control the CLK_BUF ports in each group of four gate drivers 40". The timing of these shift register clock signals and output buffer clock signals that are used to control a chain of gate drivers 40" can be identical or similar to the waveforms already shown in FIG. 5D.

Figure 8A:
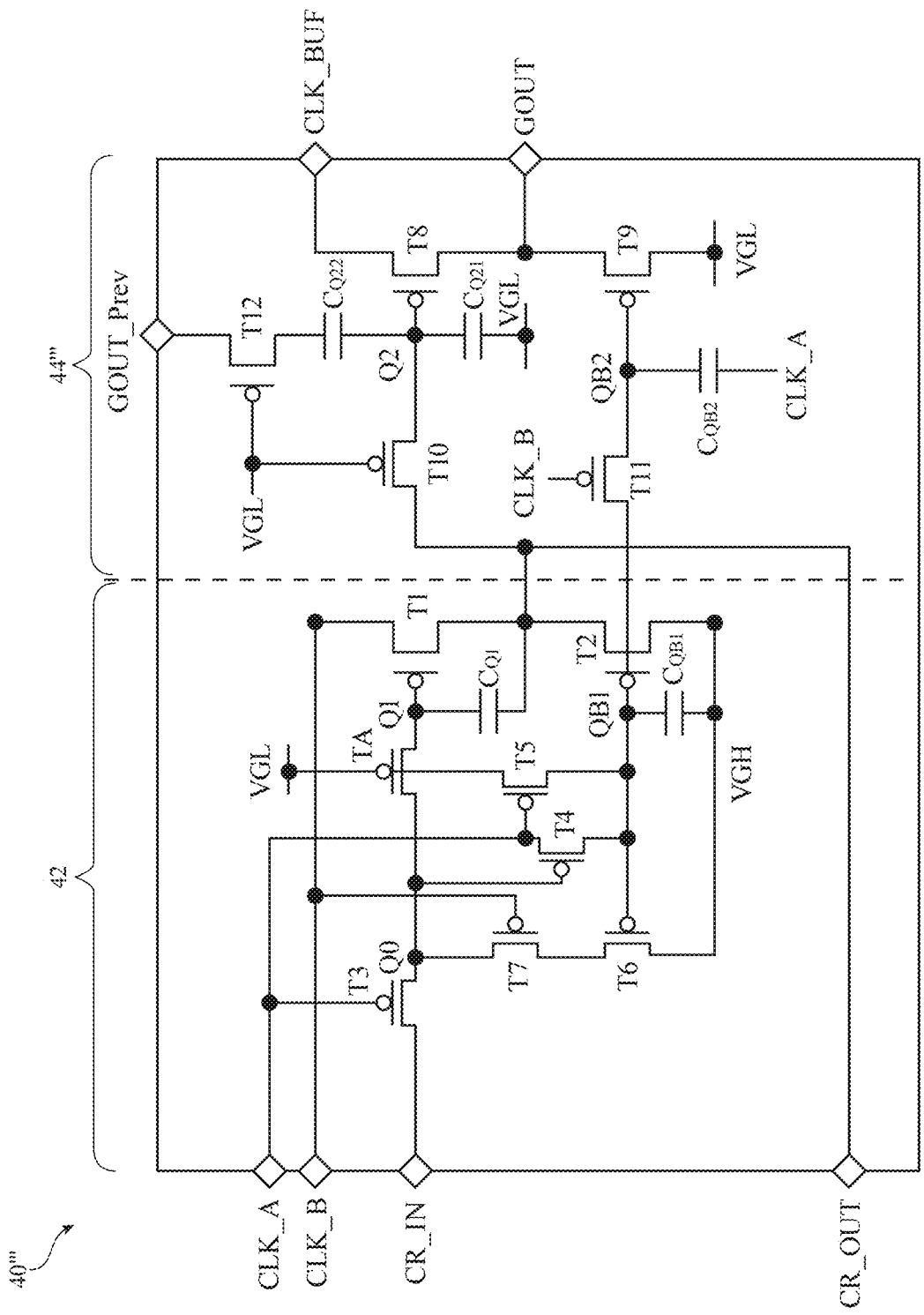
FIG. 8A is a circuit diagram of an illustrative gate driver circuit having a shift-register subcircuit that generates a carry out signal and having an output buffer subcircuit that receives the carry out signal and a gate output signal from another gate driver circuit in a preceding row in accordance with some embodiments.

FIG. 8A shows another embodiment of gate driver circuit 40''' in which both carry signals and gate output signals are fed from a preceding gate driver to a succeeding gate driver. As shown in FIG. 8A, gate driver 40''' may include shift register subcircuit 42 and output buffer subcircuit 44'''. The shift register subcircuit 42 in gate driver 40''' of FIG. 8A may have an identical structure as shift register subcircuit 42 in gate driver 40 of FIG. 5A and need not be reiterated in detail to avoid obscuring the present embodiment. As an example, all of the transistors within gate driver circuit 40''' can be implemented as silicon transistors (e.g., all of transistors within gate driver 40''' can be implemented as PMOS LTPS thin-film transistors).

Output buffer subcircuit 44''' may include transistor T8 coupled in series with transistor T9. First output buffer transistor T8 has a source terminal configured to receive output buffer clock signal CLK_BUF, a gate terminal coupled to node Q2, and a drain terminal coupled to a gate driver output port on which gate output signal GOUT is generated. Transistor T8 can be sized relatively large to help ensure that gate output signal GOUT has sufficiently short rise and fall times. Signal GOUT may, for example, represent a scan signal for controlling data loading transistor Tdata in FIG. 3 or other switching transistors within pixel 22. Second output buffer transistor T9 has a source terminal coupled to the gate driver output port, a gate terminal coupled to node QB2, and a drain terminal coupled to low power supply signal VGL.

Output buffer subcircuit 44''' may also include transistor T11 and capacitor $C_{QB2}$. Transistor T11 has a first source-drain terminal coupled to node QB2, a second source-drain terminal coupled to node QB1, and a gate terminal configured to receive shift register clock signal CLK_B. Capacitor $C_{QB2}$ can have a first terminal coupled to node QB2 and a second terminal configured to receive shift register clock signal CLK_A. Connected in this way, transistor T11 and capacitor $C_{QB2}$ can be used to ensure that node QB2 is less than VGL when output buffer transistor T9 needs to be turned on.

Output buffer subcircuit 44" may further include transistors T10, T12 and capacitors $C_{Q21}$ and $C_{Q21}$. Transistor T10 may have a first source-drain terminal coupled to node Q2 (i.e., the gate terminal of transistor T8), a second source-drain terminal coupled to the carry output port, and a gate terminal configured to receive low voltage VGL. Capacitor $C_{Q21}$ may have a first terminal coupled to node Q2 and a second terminal shunted (shorted) to VGL. In other embodiments, the second terminal of capacitor $C_{Q21}$ may instead be coupled (shorted) to VGH or other static voltage line. Capacitor $C_{Q22}$ may have a first terminal coupled to node Q2 and a second terminal coupled to transistor T12. Transistor T12 may have a first source-drain terminal coupled to capacitor $C_{Q22}$, a second source-drain terminal configured to receive signal GOUT_Prev (e.g., a gate output signal from a previous row), and a gate terminal configured to receive low voltage VGL. Transistors T10 and T12 can serve as isolation transistors for isolating any inadvertent parasitic coupling from signals CLK_BUF and GOUT_Prev from affecting the carry out signal CR_OUT. Capacitor $C_{Q22}$ can be used to push node Q2 to a lower voltage when GOUT_Prev is pulsed, whereas capacitor $C_{Q21}$ can be used as a storage capacitor that holds the charge at node Q2 after transistor T12 is turned off.

Figure 8B:
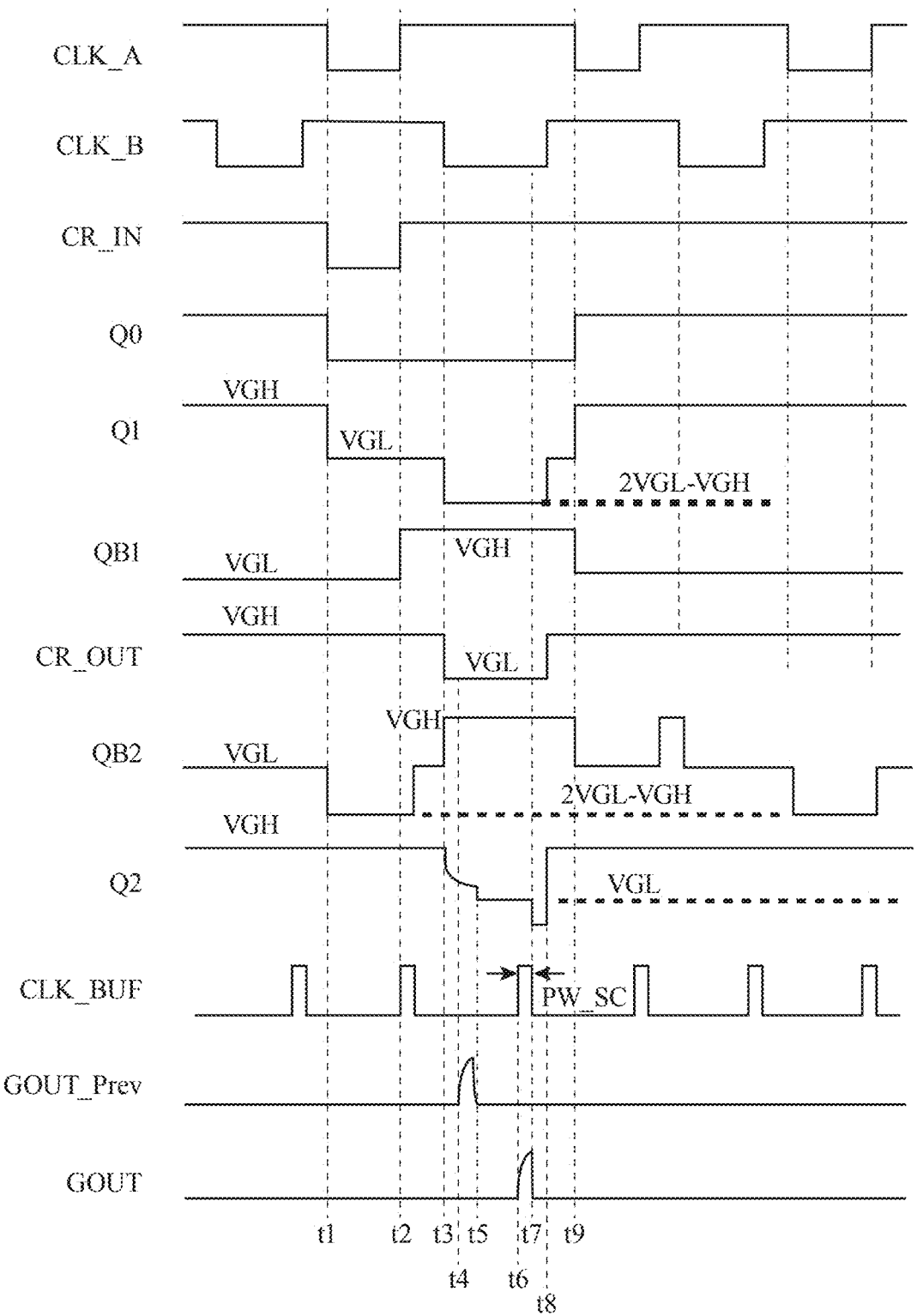
FIG. 8B is a timing diagram showing illustrative waveforms involved in operating the gate driver circuit shown in FIG. 8A in accordance with some embodiments.

FIG. 8B is a timing diagram illustrating the operation of gate driver 40''' of the type shown in FIG. 8A. At time t1, the carry in signal CR_IN from the prior row is pulsed low (from time t1 to t2), which may be synchronized with a CLK_A pulse that turns on transistors T3 and T5, may cause nodes Q0 and Q1 to fall from VGH to VGL and node QB2 to fall from VGL to (2VGL-VGH) due to the capacitive coupling through capacitor $C_{QB2}$. At time t2, signals CR_IN and CLK_A may be driven high, which can cause node QB1 to be driven from VGL to VGH using transistor T4 and can cause node QB2 to be bumped back up to VGL via capacitor $C_{QB2}$. At time t2, signal CLK_BUF can also be pulsed high for a short period of time.

At time t3, signal CLK_B may be pulsed low, which causes carry out signal CR_OUT to be pulsed low through transistor T1. During this time, node Q2 can also fall from VGH to a lower voltage through transistor T10. At the same time, node Q1 is pushed down to an even lower level (e.g., from VGL to 2VGL-VGH) by coupling through capacitor $C_{Q1}$. At time t3, node QB2 can be pull up (e.g., from VGL to VGH) using transistor T11.

At time t4, GOUT_Prev can be pulsed high. This can cause node Q2 to be pulled all the way down to VGL by the end of the falling edge of GOUT_Prev (at time t5).

At time t6, output buffer clock signal CLK_BUF may be pulsed high, which causes the gate output signal GOUT to be pulsed high through transistor T8. Clock signal CLK_BUF may have a pulse width PW_SC. At time t7, output buffer clock signal CLK_BUF may be deasserted, which causes the gate output signal GOUT to return to its initial level.

At time t8, the rising edge of shift register clock signal CLK_B will cause carry out signal CR_OUT to return to its initial VGH level. At the same time, node Q1 will rise back up to VGL due to coupling through capacitor $C_{Q1}$, and node Q2 will rise back up to VGH using transistor T10.

At time t9, a CLK_A pulse while the feedforward carry in signal CR_IN is high will cause node Q0 to be reset to its initial high level while resetting node QB1 low. Node Q0 rising will also cause node Q1 to be driven back up to VGH via transistor TA. By having a separate (isolated) output buffer clock pulse CLK_BUF that is narrower than the shift register clock pulses in CLK_A and CLK_B, gate driver 40''' is able to generate gate output signal GOUT having sufficiently fast rise and fall times.

Figure 8C:
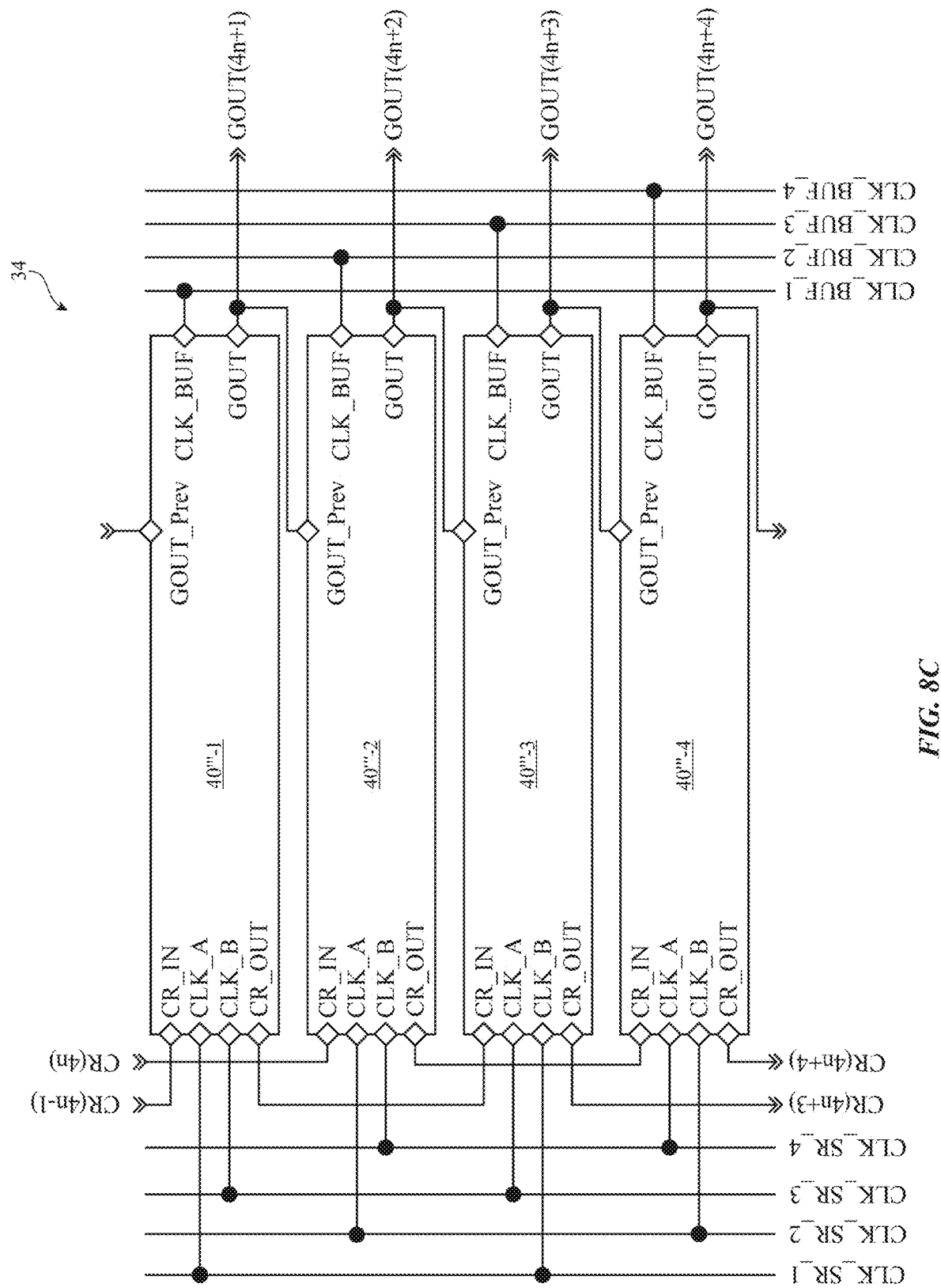
FIG. 8C is a block diagram showing multiple gate driver circuits of the type shown in FIG. 8A coupled together in a chain in accordance with some embodiments.

FIG. 8C is a block diagram showing multiple gate driver circuits 40''' of the type described in connection with FIGS. 8A and 8B coupled together in a chain. As shown in FIG. 8C, gate driver circuitry 34 may include a chain of gate drivers 40 such as gate drivers 40'''-1, 40'''-2, 40'''-3, and 40'''-4. Although only four gate drivers 40''' are shown in FIG. 8C, gate driver circuitry 34 may include hundreds, or thousands of gate drivers 40''' connected in a chain. Gate driver 40'''-1 can be configured to generate first gate output signal GOUT (4n+1). Gate driver 40'''-2 can be configured to generate second gate output signal GOUT(4n+2). Gate driver 40'''-3 can be configured to generate third gate output signal GOUT(4n+3). Gate driver 40'''-4 can be configured to generate fourth gate output signal GOUT(4n+4). The connection of the shift register clock signals and the output buffer clock signals are similar that already described in connection with FIG. 5C. FIG. 8C, however, also shows the gate output signals being fed from one stage to another (e.g., signal GOUT from one row is being fed to the GOUT_Prev port of a succeeding gate driver). The timing of these shift register clock signals and output buffer clock signals that are used to control a chain of gate drivers 40''' can be identical or similar to the waveforms already shown in FIG. 5D.

Figure 9A:
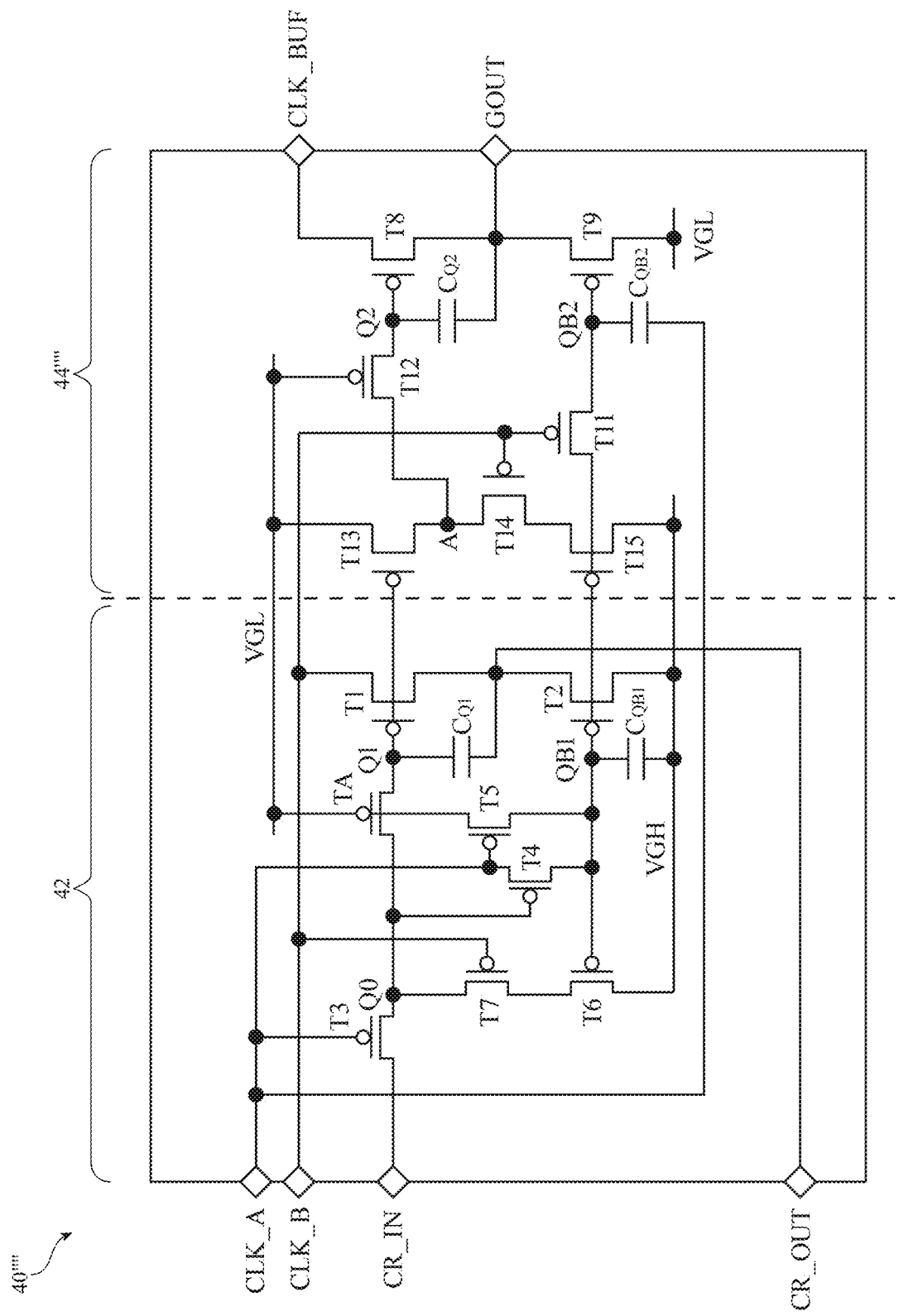
FIG. 9A is a circuit diagram of an illustrative gate driver circuit having a shift-register subcircuit that generates a carry out signal and having an output buffer subcircuit that does not receive the carry out signal in accordance with some embodiments.

FIG. 9A shows another embodiment of gate driver circuit 40'''' that is powered using power supply voltages VGL and VGH. As shown in FIG. 9A, gate driver 40'''' may include shift register subcircuit 42 and output buffer subcircuit 44''''. The shift register subcircuit 42 in gate driver 40'''' of FIG. 9A may have an identical structure as shift register subcircuit 42 in gate driver 40 of FIG. 5A and need not be reiterated in detail to avoid obscuring the present embodiment. As an example, all of the transistors within gate driver circuit 40'''' can be implemented as silicon transistors (e.g., all of transistors within gate driver 40'''' can be implemented as PMOS LTPS thin-film transistors).

Output buffer subcircuit 44'''' may include transistor T8 coupled in series with transistor T9. First output buffer transistor T8 has a source terminal configured to receive output buffer clock signal CLK_BUF, a gate terminal coupled to node Q2, and a drain terminal coupled to a gate driver output port on which gate output signal GOUT is generated. Transistor T8 can be sized relatively large to help ensure that gate output signal GOUT has sufficiently short rise and fall times. Signal GOUT may, for example, represent a scan signal for controlling data loading transistor Tdata in FIG. 3 or other switching transistors within pixel 22. Second output buffer transistor T9 has a source terminal coupled to the gate driver output port, a gate terminal coupled to node QB2, and a drain terminal coupled to low power supply signal VGL.

Output buffer subcircuit 44'''' may also include transistor T11 and capacitor $C_{QB2}$. Transistor T11 has a first source-drain terminal coupled to node QB2, a second source-drain terminal coupled to node QB1, and a gate terminal configured to receive shift register clock signal CLK_B. Capacitor $C_{QB2}$ can have a first terminal coupled to node QB2 and a second terminal configured to receive shift register clock signal CLK_A. Connected in this way, transistor T11 and capacitor $C_{QB2}$ can be used to ensure that node QB2 is less than VGL when output buffer transistor T9 needs to be turned on.

Output buffer subcircuit 44'''' may further include transistors T12-T15 and capacitor $C_{Q2}$. Capacitor $C_{Q2}$ may be coupled across the gate terminal and the drain terminal of transistor T8. Transistor T12 may have a first source-drain terminal coupled to node Q2 (i.e., the gate terminal of transistor T8), a second source-drain terminal coupled to node A, and a gate terminal configured to receive low voltage VGL. Transistors T13 may have a drain terminal coupled to low voltage VGL, a gate terminal coupled to node Q1 in the shift register subcircuit 42, and a source terminal coupled to node A. Transistor T14 may have a drain terminal coupled to node A, a gate terminal configured to receive clock signal CLK_B, and a source terminal coupled to transistor T15. Transistor T15 may have a drain terminal coupled to the source terminal of T14, a gate terminal coupled to node QB1 in the shift register subcircuit 42, and a source terminal coupled to high power supply voltage VGH.

Figure 9B:
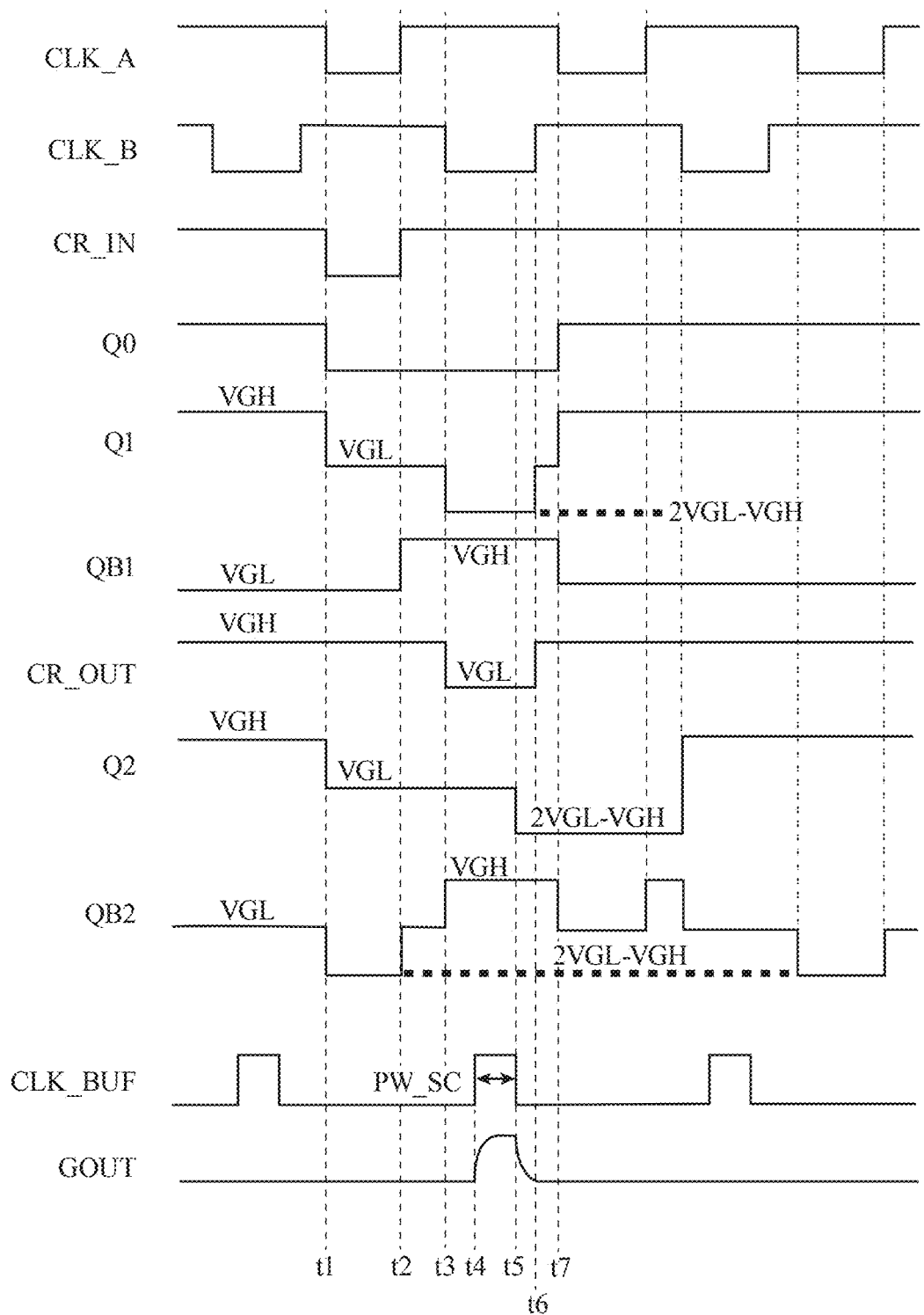
FIG. 9B is a timing diagram showing illustrative waveforms involved in operating the gate driver circuit shown in FIG. 9A in accordance with some embodiments.

FIG. 9B is a timing diagram illustrating the operation of gate driver 40'''' of the type shown in FIG. 9A. At time t1, the carry in signal CR_IN from the prior row is pulsed low (from time t1 to t2), which may be synchronized with a CLK_A pulse that turns on transistors T3 and T5, may cause nodes Q0 and Q1 to fall from VGH to VGL and node QB2 to fall from VGL to (2VGL-VGH) due to the capacitive coupling through capacitor $C_{QB2}$. At time t2, signals CR_IN and CLK_A may be driven high, which can cause node QB1 to be driven from VGL to VGH using transistor T4 and can cause node QB2 to be bumped back up to VGL via capacitor $C_{QB2}$.

At time t3, signal CLK_B may be pulsed low (from time t3 to t6), which causes carry out signal CR_OUT to be pulsed low through transistor T1. During this time, node Q1 is pushed down to an even lower level (e.g., from VGL to 2VGL-VGH) by coupling through capacitor $C_{Q1}$. At time t3, node QB2 can be pull up (e.g., from VGL to VGH) using transistor T11.

At time t4, output buffer clock signal CLK_BUF may be pulsed high, which causes the gate output signal GOUT to be pulsed high through transistor T8. Clock signal CLK_BUF may have a pulse width PW_SC. At time t5, output buffer clock signal CLK_BUF may be deasserted, which causes the gate output signal GOUT to return to its initial level. At the falling edge of GOUT at time t5, node Q2 may be coupled down to a voltage below VGL through capacitor $C_{Q2}$ (e.g., from VGL to 2VGL-VGH).

At time t6, the rising edge of shift register clock signal CLK_B will cause carry out signal CR_OUT to return to its initial VGH level. At the same time, node Q1 will rise back up to VGL due to coupling through capacitor $C_{Q1}$.

At time t7, a CLK_A pulse while the feedforward carry in signal CR_IN is high will cause node Q0 to be reset to its initial high level while resetting node QB1 low. Node Q0 rising will also cause node Q1 to be driven back up to VGH via transistor TA. By having a separate (isolated) output buffer clock pulse CLK_BUF that is narrower than the shift register clock pulses in CLK_A and CLK_B, gate driver 40'''' is able to generate gate output signal GOUT having sufficiently fast rise and fall times. Node Q2 will later be driven back up to VGH at the following CLK_B pulse.

A plurality of gate drivers 40'''' can be coupled together in a chain in a way similar to that already shown in FIG. 5C. The carry signals can be fed from one gate driver 40'''' to another gate driver 40''''. At least four different shift register clock signals CLK_SR1, CLK_SR_2, CLK_SR_3, and CLK_SR4 can be used to control the CLK_A and CLK_B ports in each group of four gate drivers 40''''. Similarly, at least four different output buffer clock signals CLK_BUF_1, CLK_BUF_2, CLK_BUF_3, and CLK_BUF_4 can be used to control the CLK_BUF ports in each group of four gate drivers 40''''. The timing of these shift register clock signals and output buffer clock signals that are used to control a chain of gate drivers 40'''' can be identical or similar to the waveforms already shown in FIG. 5D.

Figure 10A:
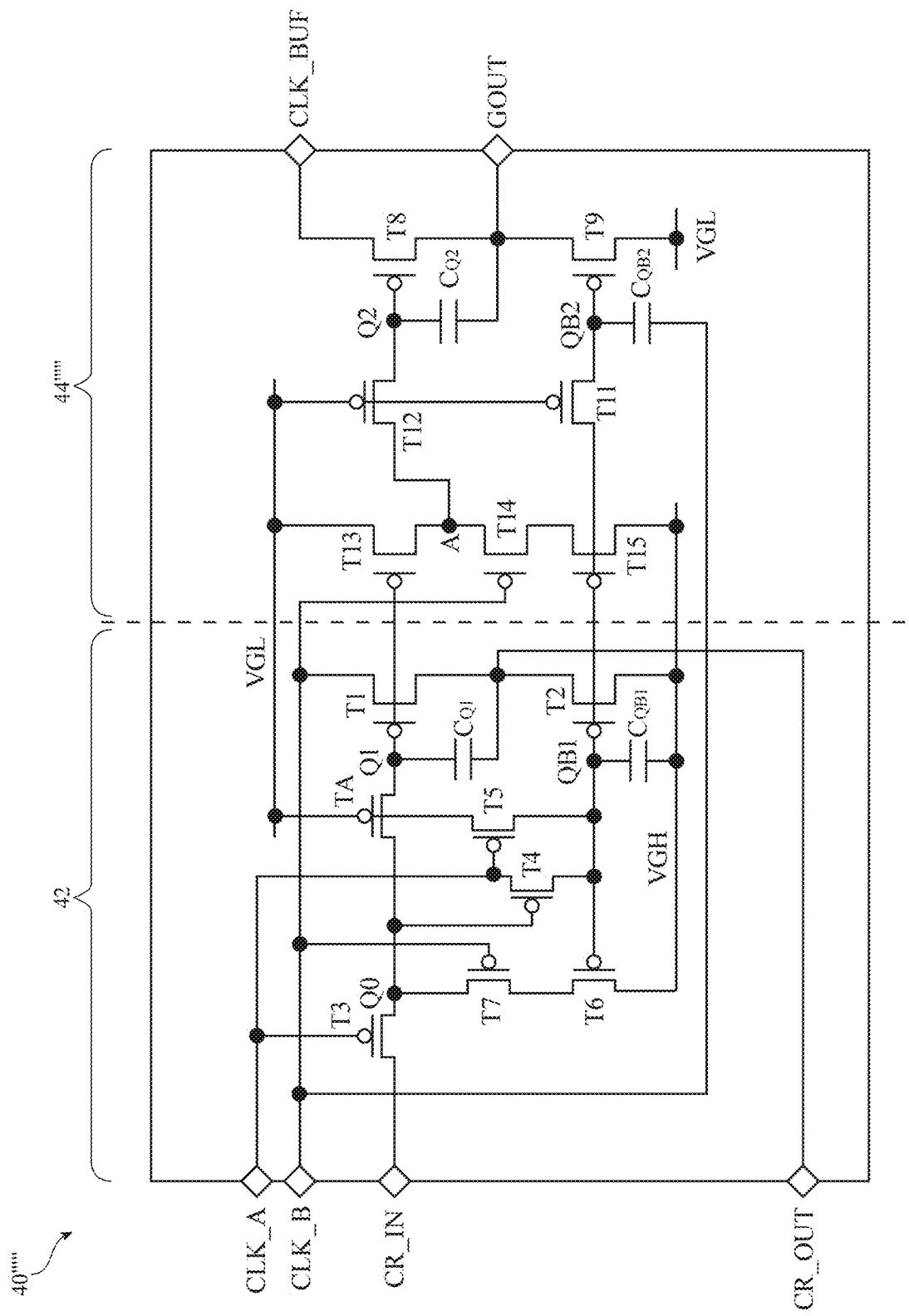
FIG. 10A is a circuit diagram of an illustrative gate driver circuit having a shift-register subcircuit that generates a carry out signal and having an output buffer subcircuit that does not receive the carry out signal in accordance with some embodiments.

FIG. 10A shows another embodiment of gate driver circuit 40''''' that is powered using power supply voltages VGL and VGH. As shown in FIG. 10A, gate driver 40''''' may include shift register subcircuit 42 and output buffer subcircuit 44'''''. The shift register subcircuit 42 in gate driver 40''''' of FIG. 10A may have an identical structure as shift register subcircuit 42 in gate driver 40 of FIG. 5A and need not be reiterated in detail to avoid obscuring the present embodiment. As an example, all of the transistors within gate driver circuit 40''''' can be implemented as silicon transistors (e.g., all of transistors within gate driver 40''''' can be implemented as PMOS LTPS thin-film transistors).

Output buffer subcircuit 44''''' may include transistor T8 coupled in series with transistor T9. First output buffer transistor T8 has a source terminal configured to receive output buffer clock signal CLK_BUF, a gate terminal coupled to node Q2, and a drain terminal coupled to a gate driver output port on which gate output signal GOUT is generated. Transistor T8 can be sized relatively large to help ensure that gate output signal GOUT has sufficiently short rise and fall times. Signal GOUT may, for example, represent a scan signal for controlling data loading transistor Tdata in FIG. 3 or other switching transistors within pixel 22. Second output buffer transistor T9 has a source terminal coupled to the gate driver output port, a gate terminal coupled to node QB2, and a drain terminal coupled to low power supply signal VGL.

Output buffer subcircuit 44''''' may also include transistor T11 and capacitor $C_{QB2}$. Transistor T11 has a first source-drain terminal coupled to node QB2, a second source-drain terminal coupled to node QB1, and a gate terminal configured to receive low voltage VGL. Capacitor $C_{QB2}$ can have a first terminal coupled to node QB2 and a second terminal configured to receive shift register clock signal CLK_B. Connected in this way, transistor T5 in subcircuit 42 and capacitor $C_{QB2}$ can be used to ensure that node QB2 is less than VGL when output buffer transistor T9 needs to be turned on.

Output buffer subcircuit 44''''' may further include transistors T12-T15 and capacitor $C_{Q2}$. Capacitor $C_{Q2}$ may be coupled across the gate terminal and the drain terminal of transistor T8. Transistor T12 may have a first source-drain terminal coupled to node Q2 (i.e., the gate terminal of transistor T8), a second source-drain terminal coupled to node A, and a gate terminal configured to receive low voltage VGL. Transistors T13 may have a drain terminal coupled to low voltage VGL, a gate terminal coupled to node Q1 in the shift register subcircuit 42, and a source terminal coupled to node A. Transistor T14 may have a drain terminal coupled to node A, a gate terminal configured to receive clock signal CLK_B, and a source terminal coupled to transistor T15. Transistor T15 may have a drain terminal coupled to the source terminal of T14, a gate terminal coupled to node QB1 in the shift register subcircuit 42, and a source terminal coupled to high power supply voltage VGH. The use of transistor T14 is optional. In embodiments where transistor T14 is omitted, node A can be directly connected to the drain terminal of T15. Omission of transistor T14 does not change the operation of gate driver 40'''''.

Figure 10B:
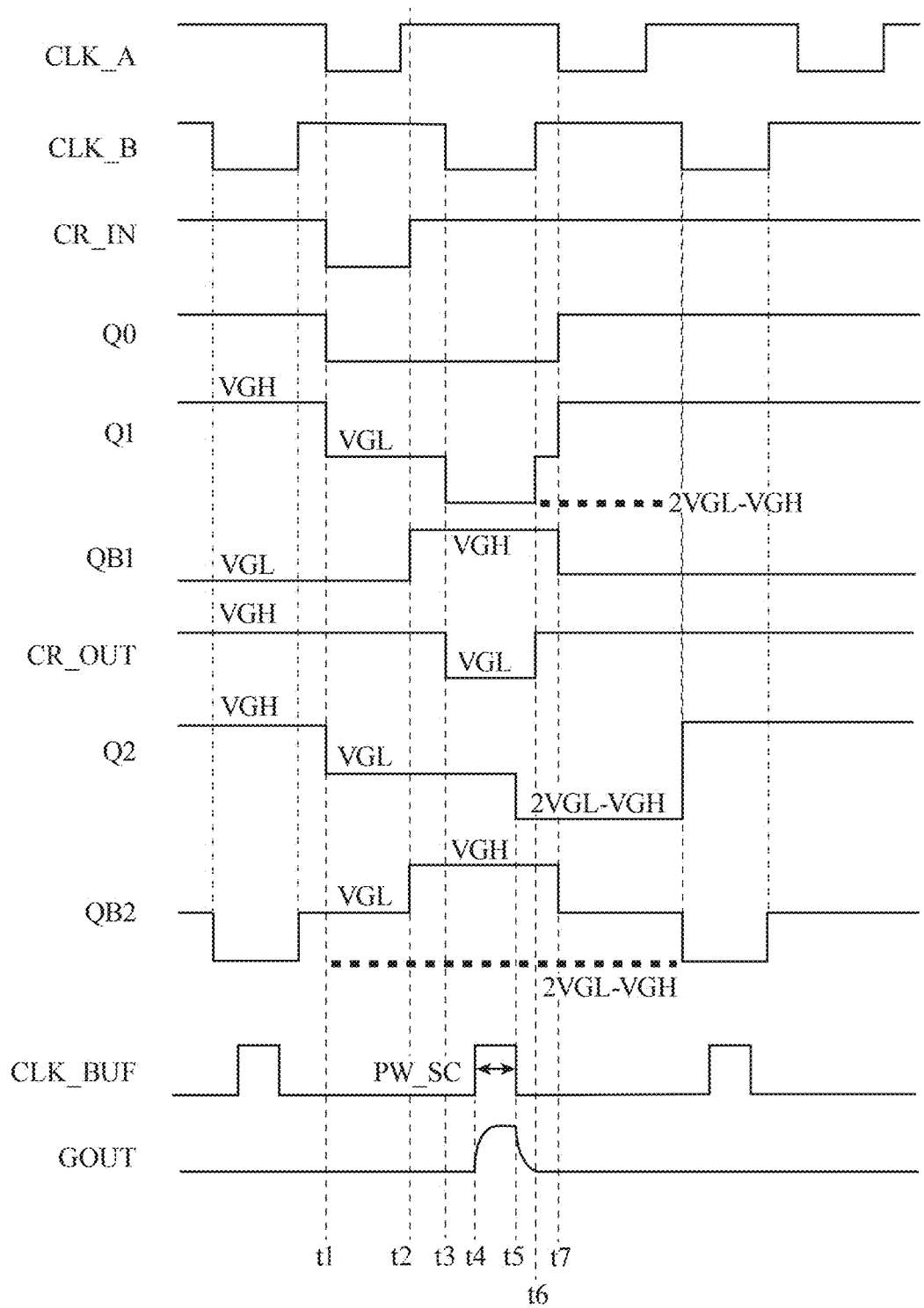
FIG. 10B is a timing diagram showing illustrative waveforms involved in operating the gate driver circuit shown in FIG. 10A in accordance with some embodiments.

FIG. 10B is a timing diagram illustrating the operation of gate driver 40''''' of the type shown in FIG. 10A. At time t1, the carry in signal CR_IN from the prior row is pulsed low (from time t1 to t2), which may be synchronized with a CLK_A pulse that turns on transistors T3 and T5, may cause nodes Q0 and Q1 to fall from VGH to VGL and node Q2 to fall from VGH to VGL. At time t2, signals CR_IN and CLK_A may be driven high, which can cause node QB1 to be driven from VGL to VGH using transistor T4 and can cause node QB2 to be bumped high to VGH via transistor T11.

At time t3, signal CLK_B may be pulsed low (from time t3 to t6), which causes carry out signal CR_OUT to be pulsed low through transistor T1. During this time, node Q1 is pushed down to an even lower level (e.g., from VGL to 2VGL-VGH) by coupling through capacitor $C_{Q1}$.

At time t4, output buffer clock signal CLK_BUF may be pulsed high, which causes the gate output signal GOUT to be pulsed high through transistor T8. Clock signal CLK_BUF may have a pulse width PW_SC. At time t5, output buffer clock signal CLK_BUF may be deasserted, which causes the gate output signal GOUT to return to its initial level. At the falling edge of GOUT at time t5, node Q2 may be coupled down to a voltage below VGL through capacitor $C_{Q2}$ (e.g., from VGL to 2VGL-VGH).

At time t6, the rising edge of shift register clock signal CLK_B will cause carry out signal CR_OUT to return to its initial VGH level. At the same time, node Q1 will rise back up to VGL due to coupling through capacitor $C_{Q1}$.

At time t7, a CLK_A pulse while the feedforward carry in signal CR_IN is high will cause node Q0 to be reset to its initial high level while resetting node QB1 low to VGL. Node Q0 rising will also cause node Q1 to be driven back up to VGH via transistor TA. By having a separate (isolated) output buffer clock pulse CLK_BUF that is narrower than the shift register clock pulses in CLK_A and CLK_B, gate driver 40''''' is able to generate gate output signal GOUT having sufficiently fast rise and fall times. Node Q2 will later be driven back up to VGH at the following CLK_B pulse.

A plurality of gate drivers 40''''' can be coupled together in a chain in a way similar to that already shown in FIG. 5C. The carry signals can be fed from one gate driver 40''''' to another gate driver 40'''''. At least four different shift register clock signals CLK_SR1, CLK_SR_2, CLK_SR_3, and CLK_SR4 can be used to control the CLK_A and CLK_B ports in each group of four gate drivers 40'''''. Similarly, at least four different output buffer clock signals CLK_BUF_1, CLK_BUF_2, CLK_BUF_3, and CLK_BUF_4 can be used to control the CLK_BUF ports in each group of four gate drivers 40'''''. The timing of these shift register clock signals and output buffer clock signals that are used to control a chain of gate drivers 40''''' can be identical or similar to the waveforms already shown in FIG. 5D.

Figure 11A:
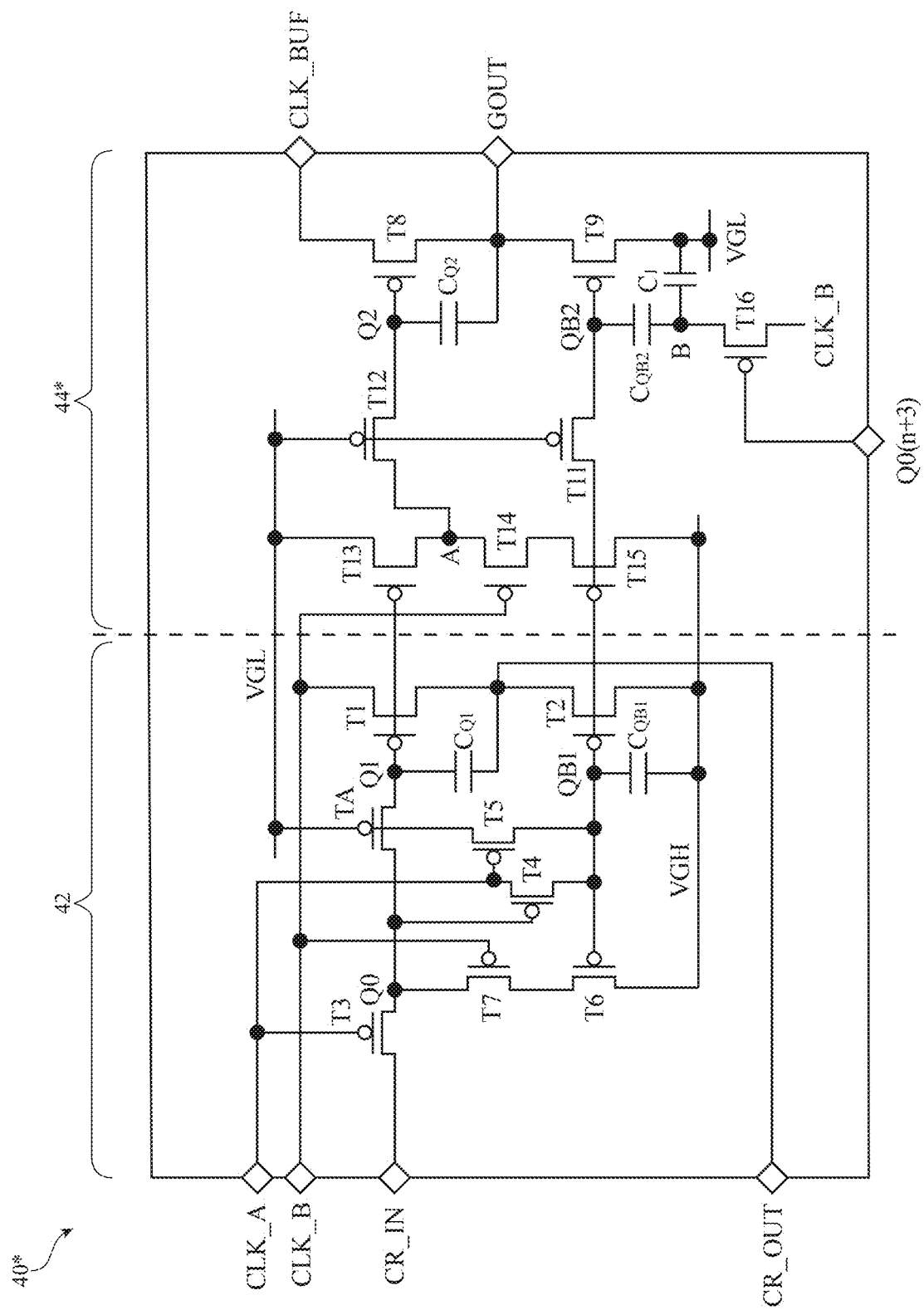
FIG. 11A is a circuit diagram of another implementation of an illustrative gate driver circuit in accordance with some embodiments.

FIG. 11A is a circuit diagram of another implementation of gate driver circuit 40*. As shown in FIG. 11A, gate driver 40* may include shift register subcircuit 42 and output buffer subcircuit 44*. The shift register subcircuit 42 in gate driver 40* of FIG. 11A may have an identical structure as shift register subcircuit 42 in gate driver 40 of FIG. 5A and need not be reiterated in detail to avoid obscuring the present embodiment. As an example, all of the transistors within gate driver circuit 40* can be implemented as silicon transistors (e.g., all of transistors within gate driver 40* can be implemented as PMOS LTPS thin-film transistors).

Output buffer subcircuit 44* may include transistor T8 coupled in series with transistor T9. First output buffer transistor T8 has a source terminal configured to receive output buffer clock signal CLK_BUF, a gate terminal coupled to node Q2, and a drain terminal coupled to a gate driver output port on which gate output signal GOUT is generated. Transistor T8 can be sized relatively large to help ensure that gate output signal GOUT has sufficiently short rise and fall times. Signal GOUT may, for example, represent a scan signal for controlling data loading transistor Tdata in FIG. 3 or other switching transistors within pixel 22. Second output buffer transistor T9 has a source terminal coupled to the gate driver output port, a gate terminal coupled to node QB2, and a drain terminal coupled to low power supply signal VGL.

Output buffer subcircuit 44* may also include transistors T11-T15 and capacitor $C_{Q2}$. Capacitor $C_{Q2}$ may be coupled across the gate terminal and the drain terminal of transistor T8. Transistor T11 has a first source-drain terminal coupled to node QB2, a second source-drain terminal coupled to node QB1, and a gate terminal configured to receive low voltage VGL. Transistor T12 may have a first source-drain terminal coupled to node Q2 (i.e., the gate terminal of transistor T8), a second source-drain terminal coupled to node A, and a gate terminal configured to receive low voltage VGL. Transistors T13 may have a drain terminal coupled to low voltage VGL, a gate terminal coupled to node Q1 in the shift register subcircuit 42, and a source terminal coupled to node A. Transistor T14 may have a drain terminal coupled to node A, a gate terminal configured to receive clock signal CLK_B, and a source terminal coupled to transistor T15. Transistor T15 may have a drain terminal coupled to the source terminal of T14, a gate terminal coupled to node QB1 in the shift register subcircuit 42, and a source terminal coupled to high power supply voltage VGH.

Output buffer subcircuit 44* may further include transistor T16 and capacitors $C_{QB2}$ and $C_1$. Capacitor $C_{QB2}$ can have a first terminal coupled to node QB2 and a second terminal coupled to a node B. Capacitor $C_1$ may have a first terminal coupled to node B and a second terminal coupled to the low power supply voltage VGL. Transistor T16 may have a first source-drain terminal coupled to node B, a second source-drain terminal configured to receive shift register clock signal CLK_B, and a gate terminal coupled to the Q0 node of another gate driver 40* from three rows below (as indicated by the "n+3" notation). Configured in this way, transistor T16 can be used to maintain the voltage at node QB2 to be lower than VGL (e.g., turning transistor T16 off can isolate capacitor $C_{QB2}$ from any noise or toggling associated with clock signal CLK_B). The example of FIG. 12 in which the gate terminal of transistor T16 is coupled to Q0(n+3) via transistor T17 is illustrative. In other embodiments, the gate terminal of transistor T16 can be coupled to Q1 (n+3) (e.g., the Q1 node of another gate driver 40*** from three rows below) via transistor T17.

Figure 11B:
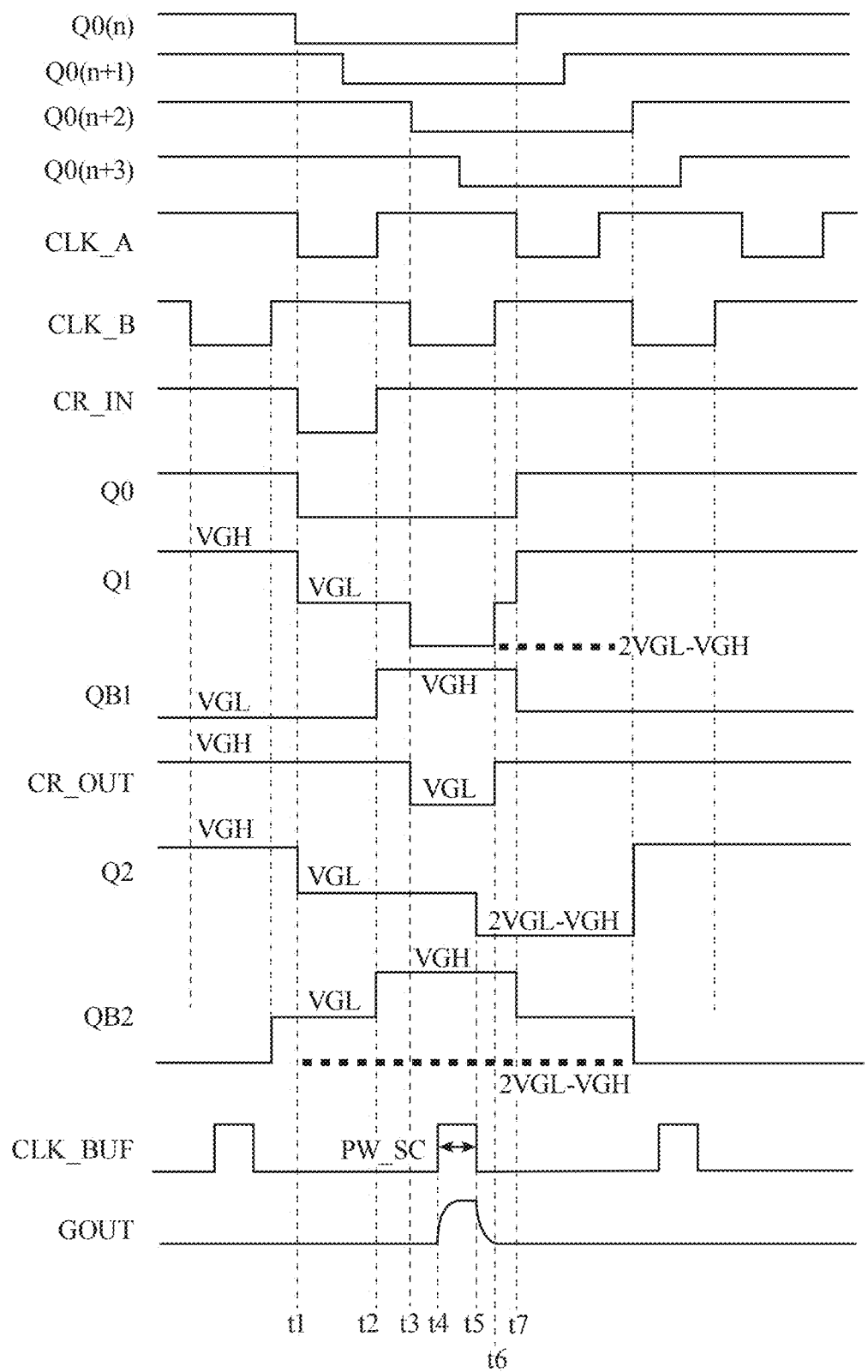
FIG. 11B is a timing diagram showing illustrative waveforms involved in operating the gate driver circuit shown in FIG. 11A in accordance with some embodiments.

FIG. 11B is a timing diagram illustrating the operation of gate driver 40* of the type shown in FIG. 11A. At time t1, the carry in signal CR_IN from the prior row is pulsed low (from time t1 to t2), which may be synchronized with a CLK_A pulse that turns on transistors T3 and T5, may cause nodes Q0 and Q1 to fall from VGH to VGL and node Q2 to fall from VGH to VGL. FIG. 11B also shows the fall and rise times of nodes Q0 for the current row (e.g., row n) and subsequent rows such as rows (n+1), (n+2), and (n+3). At time t2, signals CR_IN and CLK_A may be driven high, which can cause node QB1 to be driven from VGL to VGH using transistor T4 and can cause node QB2 to be bumped high to VGH via transistor T11.

At time t3, signal CLK_B may be pulsed low (from time t3 to t6), which causes carry out signal CR_OUT to be pulsed low through transistor T1. During this time, node Q1 is pushed down to an even lower level (e.g., from VGL to 2VGL-VGH) by coupling through capacitor $C_{Q1}$.

At time t4, output buffer clock signal CLK_BUF may be pulsed high, which causes the gate output signal GOUT to be pulsed high through transistor T8. Clock signal CLK_BUF may have a pulse width PW_SC. At time t5, output buffer clock signal CLK_BUF may be deasserted, which causes the gate output signal GOUT to return to its initial level. At the falling edge of GOUT at time t5, node Q2 may be coupled down to a voltage below VGL through capacitor $C_{Q2}$ (e.g., from VGL to 2VGL-VGH).

At time t6, the rising edge of shift register clock signal CLK_B will cause carry out signal CR_OUT to return to its initial VGH level. At the same time, node Q1 will rise back up to VGL due to coupling through capacitor $C_{Q1}$.

At time t7, a CLK_A pulse while the feedforward carry in signal CR_IN is high will cause node Q0 to be reset to its initial high level while resetting node QB1 low to VGL. Node Q0 rising will also cause node Q1 to be driven back up to VGH via transistor TA. By having a separate (isolated) output buffer clock pulse CLK_BUF that is narrower than the shift register clock pulses in CLK_A and CLK_B, gate driver 40'''' is able to generate gate output signal GOUT having sufficiently fast rise and fall times. Node Q2 will later be driven back up to VGH at the following CLK_B pulse. Note that using Q0(n+3) to control transistor T16 can help ensure that transistor T16 remains off before CLK_BUF is pulsed at time t4.

Figure 11C:
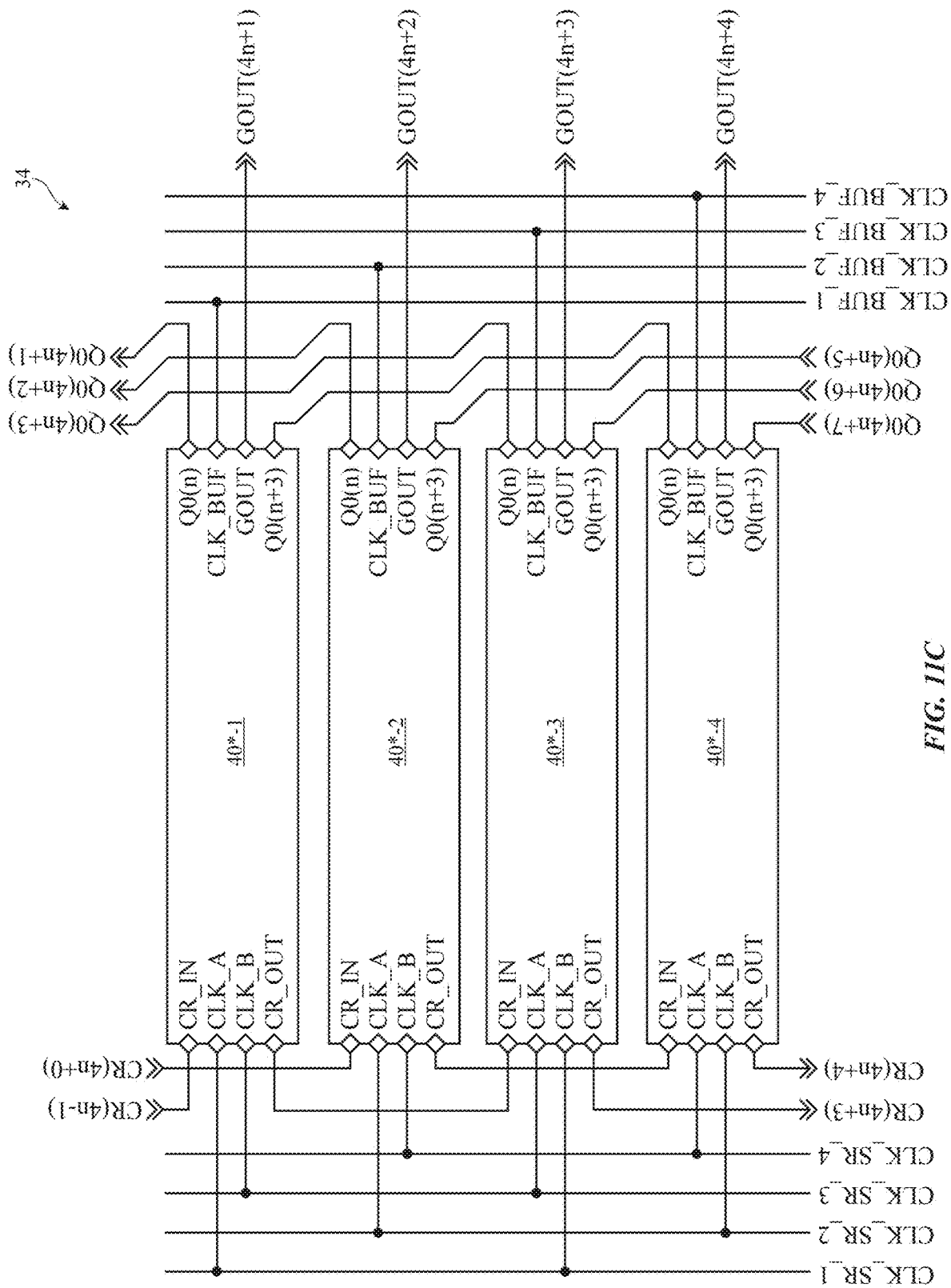
FIG. 11C is a block diagram showing multiple gate driver circuits of the type shown in FIG. 11A coupled together in a chain in accordance with some embodiments.

FIG. 11C is a block diagram showing multiple gate driver circuits 40* of the type described in connection with FIGS. 11A and 11B coupled together in a chain. As shown in FIG. 11C, gate driver circuitry 34 may include a chain of gate drivers 40* such as gate drivers 40*-1, 40*-2, 40*-3, and 40*-4. Although only four gate drivers 40* are shown in FIG. 11C, gate driver circuitry 34 may include hundreds, or thousands of gate drivers 40* connected in a chain. Gate driver 40*-1 can be configured to generate first gate output signal GOUT(4n+1). Gate driver 40*-2 can be configured to generate second gate output signal GOUT(4n+2). Gate driver 40*-3 can be configured to generate third gate output signal GOUT(4n+3). Gate driver 40*-4 can be configured to generate fourth gate output signal GOUT(4n+4). The connection of the shift register clock signals and the output buffer clock signals are similar that already described in connection with FIG. 5C. FIG. 11C, however, shows the Q0(n) being fed back to three stages above (e.g., the Q0 of driver 40*-4 is fed back to the Q0(n+3) input of driver 40*-1 and so on).

Figure 12:
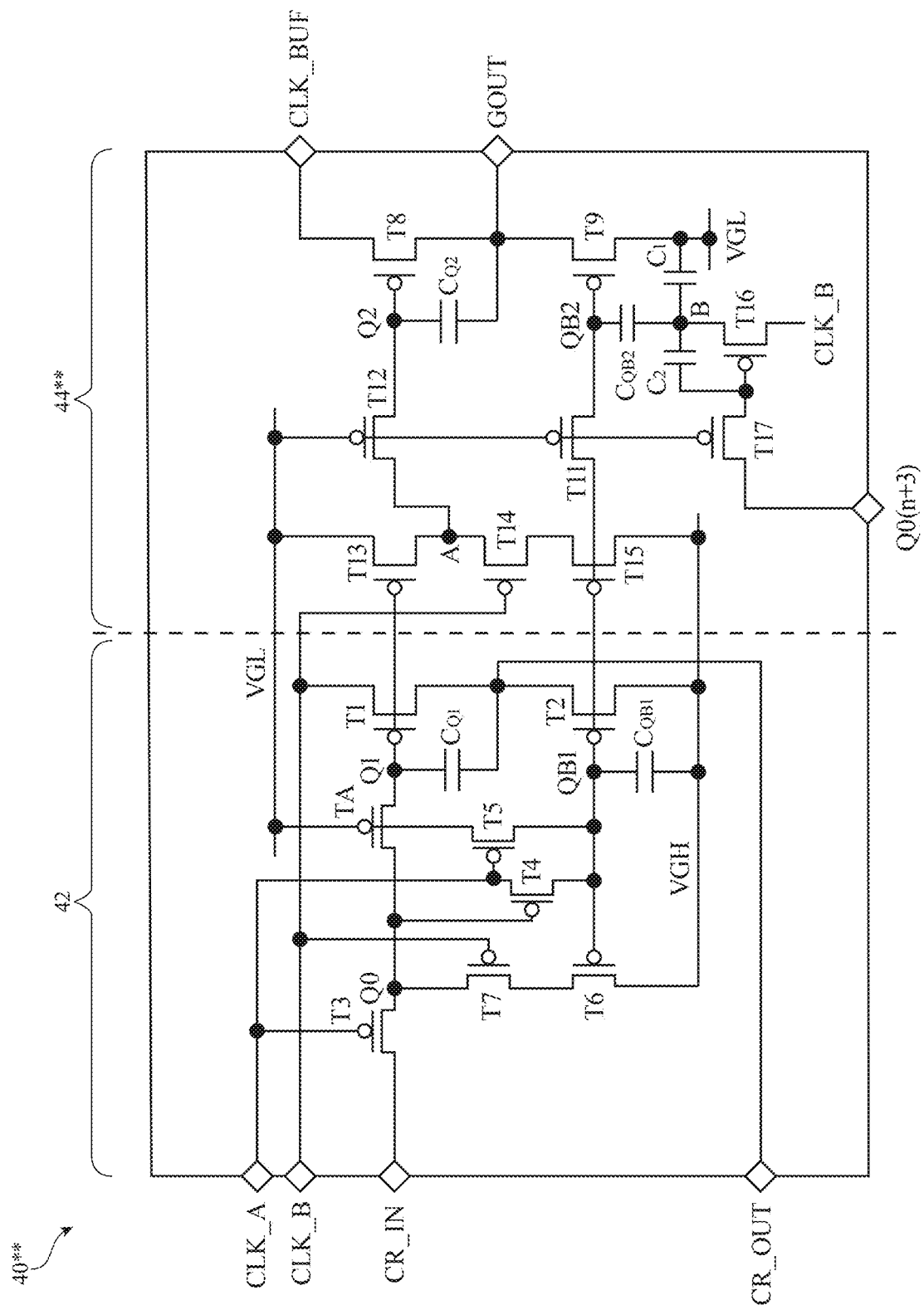
FIG. 12 is a circuit diagram of another implementation of an illustrative gate driver circuit in accordance with some embodiments.

FIG. 12 is a circuit diagram of another implementation of a gate driver circuit such as gate driver circuit 40. As shown in FIG. 12, gate driver 40 may include shift register subcircuit 42 and output buffer subcircuit 44. The shift register subcircuit 42 in gate driver 40 of FIG. 12 may have an identical structure as shift register subcircuit 42 in gate driver 40 of FIG. 5A and need not be reiterated in detail to avoid obscuring the present embodiment. As an example, all of the transistors within gate driver circuit 40 can be implemented as silicon transistors (e.g., all of transistors within gate driver 40 can be implemented as PMOS LTPS thin-film transistors).

Output buffer subcircuit 44** may include transistor T8 coupled in series with transistor T9. First output buffer transistor T8 has a source terminal configured to receive output buffer clock signal CLK_BUF, a gate terminal coupled to node Q2, and a drain terminal coupled to a gate driver output port on which gate output signal GOUT is generated. Transistor T8 can be sized relatively large to help ensure that gate output signal GOUT has sufficiently short rise and fall times. Signal GOUT may, for example, represent a scan signal for controlling data loading transistor Tdata in FIG. 3 or other switching transistors within pixel 22. Second output buffer transistor T9 has a source terminal coupled to the gate driver output port, a gate terminal coupled to node QB2, and a drain terminal coupled to low power supply signal VGL.

Output buffer subcircuit 44** may also include transistors T11-T15 and capacitor $C_{Q2}$. Capacitor $C_{Q2}$ may be coupled across the gate terminal and the drain terminal of transistor T8. Transistor T11 has a first source-drain terminal coupled to node QB2, a second source-drain terminal coupled to node QB1, and a gate terminal configured to receive low voltage VGL. Transistor T12 may have a first source-drain terminal coupled to node Q2 (i.e., the gate terminal of transistor T8), a second source-drain terminal coupled to node A, and a gate terminal configured to receive low voltage VGL. Transistors T13 may have a drain terminal coupled to low voltage VGL, a gate terminal coupled to node Q1 in the shift register subcircuit 42, and a source terminal coupled to node A. Transistor T14 may have a drain terminal coupled to node A, a gate terminal configured to receive clock signal CLK_B, and a source terminal coupled to transistor T15. Transistor T15 may have a drain terminal coupled to the source terminal of T14, a gate terminal coupled to node QB1 in the shift register subcircuit 42, and a source terminal coupled to high power supply voltage VGH.

Output buffer subcircuit 44 may further include transistors T16-T17 and capacitors $C_{QB2}$, $C_1$, and $C_2$. Capacitor $C_{QB2}$ can have a first terminal coupled to node QB2 and a second terminal coupled to a node B. Capacitor C1 may have a first terminal coupled to node B and a second terminal coupled to the low power supply voltage VGL. Transistor T16 may have a first source-drain terminal coupled to node B, a second source-drain terminal configured to receive shift register clock signal CLK_B, and a gate terminal. Capacitor $C_2$ may have a first terminal coupled to node B and a second terminal coupled to the gate terminal of transistor T16. Transistor T17 may have a gate terminal coupled to the low power supply voltage VGL, a first source-drain terminal coupled to the gate terminal of transistor T16, and a second source-drain terminal coupled to the Q0 node of another gate driver 40 from three rows below (as indicated by the "n+3" notation). Configured in this way, transistor T16 can be used to maintain the voltage at node QB2 to be lower than VGL (e.g., turning transistor T16 off can isolate capacitor $C_{QB2}$ from any noise or toggling associated with clock signal CLK_B).

The operation of gate driver 40 of FIG. 12 is substantially similar to the timing diagram already shown in FIG. 11B and need not be reiterated in detail to avoid obscuring the present embodiments. The only difference in the timing waveforms for gate driver 40 is that at the rising edge of Q0(n+3), node QB2 may rise up slightly due to the capacitive coupling through capacitors $C_2$ and $C_{QB2}$. A plurality of gate drivers 40** can be coupled together in a chain using an arrangement that is similar or identical to the control scheme already shown in FIG. 11C.

Figure 13:
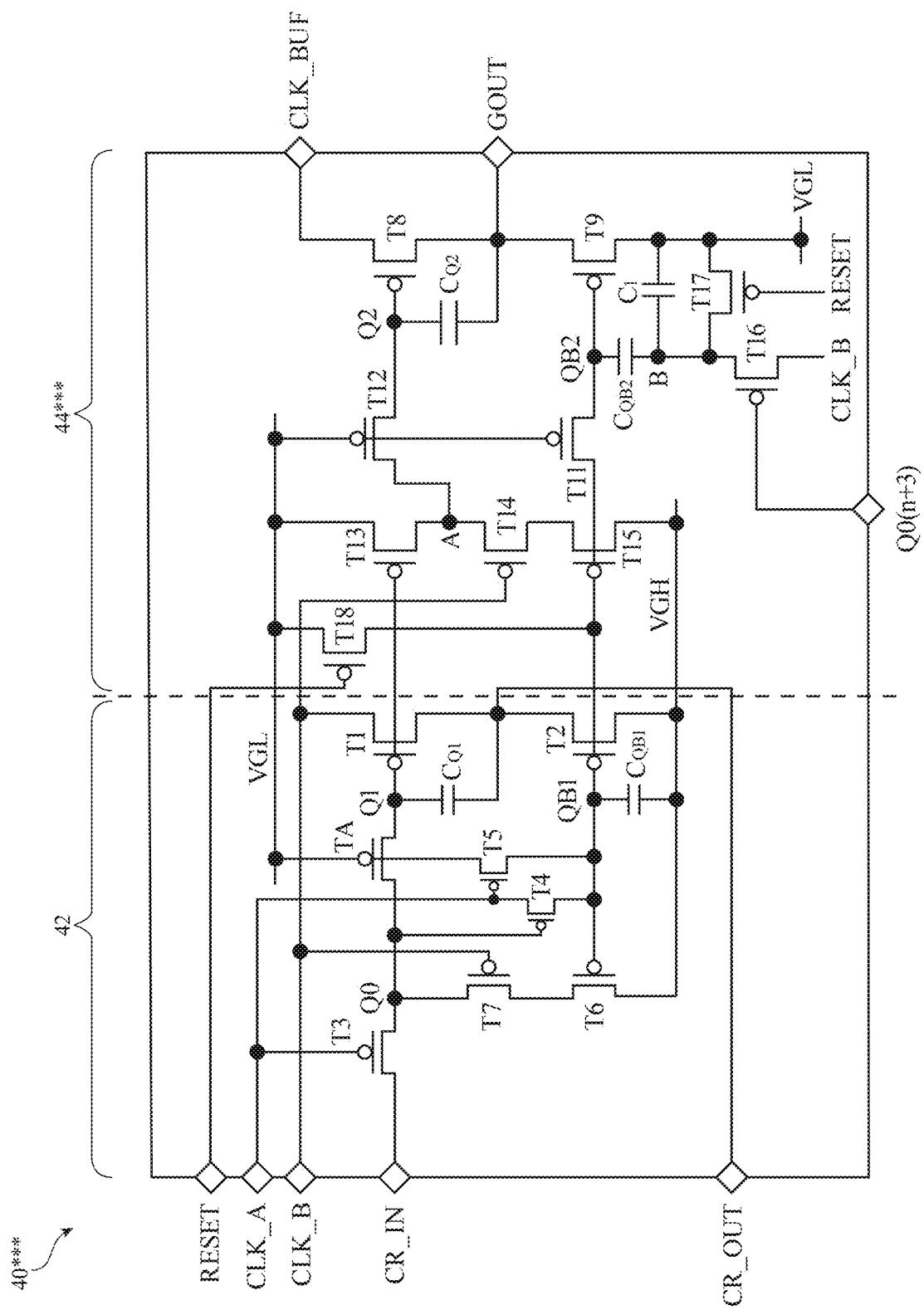
FIG. 13 is a circuit diagram of another implementation of an illustrative gate driver circuit configured to receive a reset signal in accordance with some embodiments.

FIG. 13 is a circuit diagram of another implementation of a gate driver circuit such as gate driver circuit 40* configured to receive a reset signal. As shown in FIG. 13, gate driver 40* may include shift register subcircuit 42 and output buffer subcircuit 44*. The shift register subcircuit 42 in gate driver 40* of FIG. 13 may have an identical structure as shift register subcircuit 42 in gate driver 40 of FIG. 5A and need not be reiterated in detail to avoid obscuring the present embodiment. As an example, all of the transistors within gate driver circuit 40* can be implemented as silicon transistors (e.g., all of transistors within gate driver circuit 40* can be implemented as PMOS LTPS thin-film transistors).

Output buffer subcircuit 44*** may include transistor T8 coupled in series with transistor T9. First output buffer transistor T8 has a source terminal configured to receive output buffer clock signal CLK_BUF, a gate terminal coupled to node Q2, and a drain terminal coupled to a gate driver output port on which gate output signal GOUT is generated. Transistor T8 can be sized relatively large to help ensure that gate output signal GOUT has sufficiently short rise and fall times. Signal GOUT may, for example, represent a scan signal for controlling data loading transistor Tdata in FIG. 3 or other switching transistors within pixel 22. Second output buffer transistor T9 has a source terminal coupled to the gate driver output port, a gate terminal coupled to node QB2, and a drain terminal coupled to low power supply signal VGL.

Output buffer subcircuit 44*** may also include transistors T11-T15 and capacitor $C_{Q2}$. Capacitor $C_{Q2}$ may be coupled across the gate terminal and the drain terminal of transistor T8. Transistor T11 has a first source-drain terminal coupled to node QB2, a second source-drain terminal coupled to node QB1, and a gate terminal configured to receive low voltage VGL. Transistor T12 may have a first source-drain terminal coupled to node Q2 (i.e., the gate terminal of transistor T8), a second source-drain terminal coupled to node A, and a gate terminal configured to receive low voltage VGL. Transistors T13 may have a drain terminal coupled to low voltage VGL, a gate terminal coupled to node Q1 in the shift register subcircuit 42, and a source terminal coupled to node A. Transistor T14 may have a drain terminal coupled to node A, a gate terminal configured to receive clock signal CLK_B, and a source terminal coupled to transistor T15. Transistor T15 may have a drain terminal coupled to the source terminal of T14, a gate terminal coupled to node QB1 in the shift register subcircuit 42, and a source terminal coupled to high power supply voltage VGH.

Output buffer subcircuit 44* may further include transistors T16-T18 and capacitors $C_{QB2}$ and $C_1$. Capacitor $C_{QB2}$ can have a first terminal coupled to node QB2 and a second terminal coupled to a node B. Capacitor $C_1$ may have a first terminal coupled to node B and a second terminal coupled to the low power supply voltage VGL. Transistor T16 may have a first source-drain terminal coupled to node B, a second source-drain terminal configured to receive shift register clock signal CLK_B, and a gate terminal coupled to the Q0 node of another gate driver 40* from three rows below (as indicated by the "n+3" notation).

Transistor T17 may have a source terminal coupled to node B, a drain terminal coupled to low power supply voltage VGL, and a gate terminal configured to receive a reset signal. The reset signal may be a global reset signal that controls every gate driver 40*** simultaneously. Transistor T18 may have a drain terminal coupled to node QB1, a source terminal coupled to low power supply voltage VGL, and a gate terminal configured to receive the reset signal. Configured in this way, transistors T16, T17, and T18 can be used to stabilize the gate driver a low refresh rates (e.g., when the display is operation at refresh rates of less than 30 Hz, less than 10 Hz, less than 5 Hz, 2 Hz or less, 1 Hz or less, etc.). For example, use of transistors T16 and T17 can help minimize the impact of leakage from CLK_B to node B, whereas the use of transistor T18 can help minimize the impact of leakage from CLK_A to node QB1 through transistor T4. The global reset signal can be asserted during a vertical blanking period to turn on transistors T17 and T18. Transistors T17 and T18 may remain off during normal display refresh operations.

The operation of gate driver 40* of FIG. 13 is substantially similar to the timing diagram already shown in FIG. 11B and need not be reiterated in detail to avoid obscuring the present embodiments. A plurality of gate drivers 40* can be coupled together in a chain using an arrangement that is similar or identical to the control scheme already shown in FIG. 11C.

Figure 14:
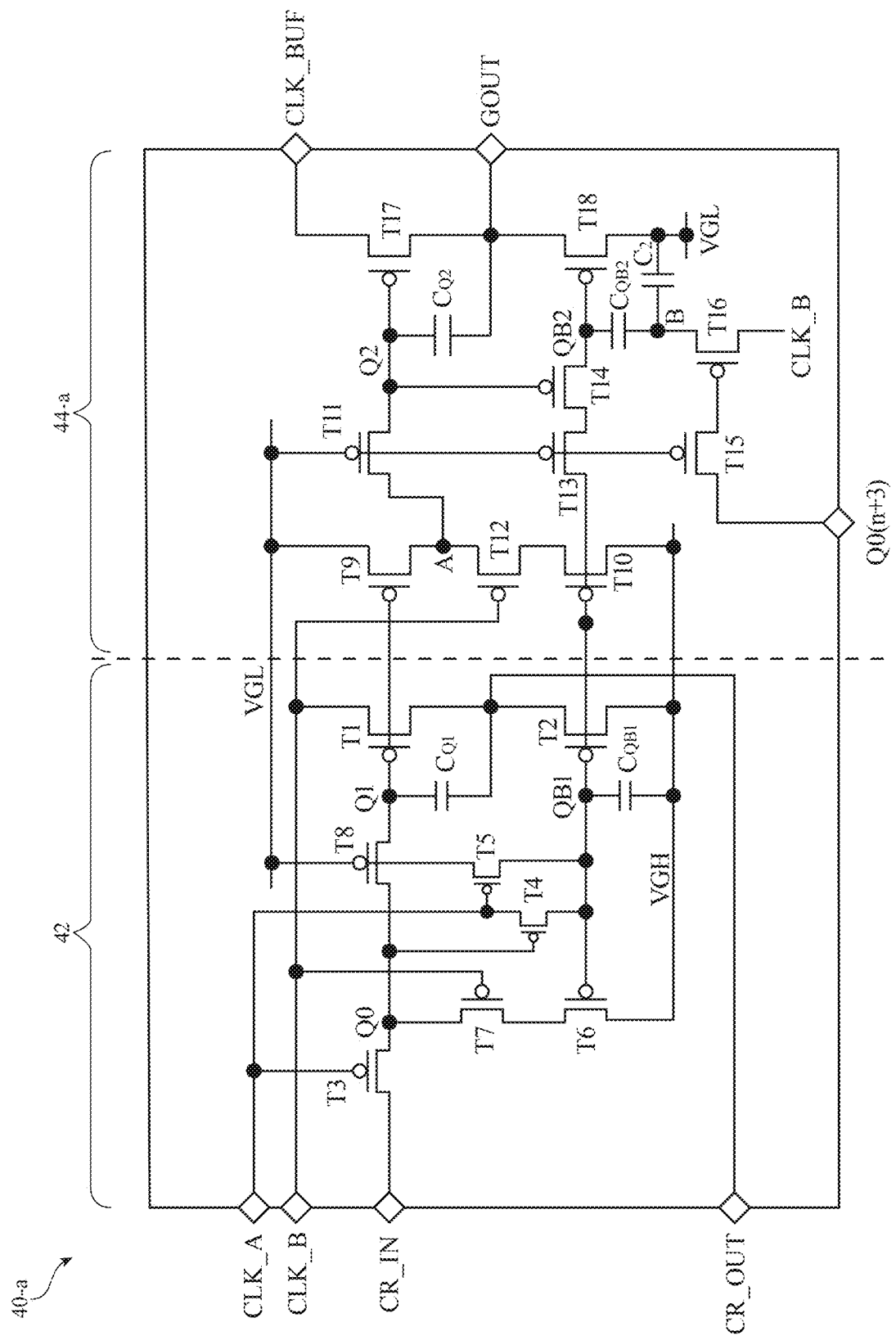
FIG. 14 is a circuit diagram of another implementation of an illustrative gate driver circuit in accordance with some embodiments.

FIG. 14 is a circuit diagram of another implementation of a gate driver circuit such as gate driver circuit 40-*a*. As shown in FIG. 14, gate driver 40-*a* may include shift register subcircuit 42 and output buffer subcircuit 44-*a*. The shift register subcircuit 42 in gate driver 40-*a* of FIG. 14 may have an identical structure as shift register subcircuit 42 in gate driver 40 of FIG. 5A and need not be reiterated in detail to avoid obscuring the present embodiment. There is one minor difference only in the labeling of transistors in portion 42, where transistor TA in FIG. 5A is now relabeled as transistor T8 in FIG. 14. As an example, all of the transistors within gate driver circuit 40-*a* can be implemented as silicon transistors (e.g., all of transistors within gate driver 40-*a* can be implemented as PMOS LTPS thin-film transistors).

Output buffer subcircuit 44-*a* may include a first output buffer transistor T17 coupled in series with a second output buffer transistor T18. First output buffer transistor T17 has a source terminal configured to receive output buffer clock signal CLK_BUF, a gate terminal coupled to node Q2, and a drain terminal coupled to a gate driver output port on which gate output signal GOUT is generated. Transistor T17 can be sized relatively large to help ensure that gate output signal GOUT has sufficiently short rise and fall times. Signal GOUT may, for example, represent a scan signal for controlling data loading transistor Tdata in FIG. 3 or other switching transistors within pixel 22. Second output buffer transistor T18 has a source terminal coupled to the gate driver output port, a gate terminal coupled to node QB2, and a drain terminal coupled to low power supply signal VGL.

Output buffer subcircuit 44-*a* may also include transistors T9-T16 (e.g., PMOS silicon transistors) and capacitors $C_{Q2}$, $C_2$, and $C_{QB2}$. Capacitor $C_{Q2}$ may be coupled across the gate terminal and the drain terminal of output buffer transistor T17. Transistor T13 has a first source-drain terminal coupled to node QB2, a second source-drain terminal coupled to node QB1, and a gate terminal configured to receive low voltage VGL. Transistor T11 may have a first source-drain terminal coupled to node Q2 (i.e., the gate terminal of transistor T17), a second source-drain terminal coupled to node A, and a gate terminal configured to receive low voltage VGL. Transistors T9 may have a drain terminal coupled to low voltage VGL, a gate terminal coupled to node Q1 in the shift register subcircuit 42, and a source terminal coupled to node A. Transistor T12 may have a drain terminal coupled to node A, a gate terminal configured to receive clock signal CLK_B, and a source terminal coupled to transistor T10. Transistor T10 may have a drain terminal coupled to the source terminal of T12, a gate terminal coupled to node QB1 in the shift register subcircuit 42, and a source terminal coupled to high power supply voltage VGH.

Capacitor $C_{QB2}$ can have a first terminal coupled to node QB2 and a second terminal coupled to a node B. Capacitor $C_2$ may have a first terminal coupled to node B and a second terminal coupled to the low power supply voltage VGL. Transistor T16 may have a first source-drain terminal coupled to node B, a second source-drain terminal configured to receive shift register clock signal CLK_B, and a gate terminal. Transistor T15 may have a gate terminal coupled to the low power supply voltage VGL, a first source-drain terminal coupled to the gate terminal of transistor T16, and a second source-drain terminal coupled to the Q0 node of another gate driver 40-*a* from three rows below (as indicated by the "n+3" notation). Configured in this way, transistor T16 can be used to maintain the voltage at node QB2 to be lower than VGL (e.g., turning transistor T16 off can isolate capacitor $C_{QB2}$ from any noise or toggling associated with clock signal CLK_B).

If care is not taken, current can leak through transistor T13, which could increase the voltage at node QB2. Such increase in voltage at node QB2 would increase the on-state resistance of output buffer transistor T18. This could be problematic during vertical blanking periods, during which a touch event on touch screen display 14 would result in a corresponding signal coupling onto the GOUT scan signal. If the on-state resistance of output buffer transistor T18 is increased (thus causing GOUT to be driven at a higher impedance), the touch signal coupling onto the GOUT scan signal could result in undesired display artifacts. To reduce such undesired effects, the leakage current at node QB2 can be reduced by including an additional transistor T14. Transistor T14 may have a gate terminal coupled to node Q2, a first source-drain terminal coupled to node QB2, and a second source-drain terminal coupled to transistor T13. Coupling transistors T13 and T14 in series in this way can help reduce the amount of leakage current flowing into node QB2. This can be technically advantageous to ensure that GOUT is driven low with low impedance, which can be beneficial during vertical blanking periods in normal refresh rate operations and low refresh rate operations. The operation of gate driver 40-*a* of FIG. 14 is substantially similar to the timing diagram already shown in FIG. 11B and need not be reiterated in detail to avoid obscuring the present embodiments.

Figure 15:
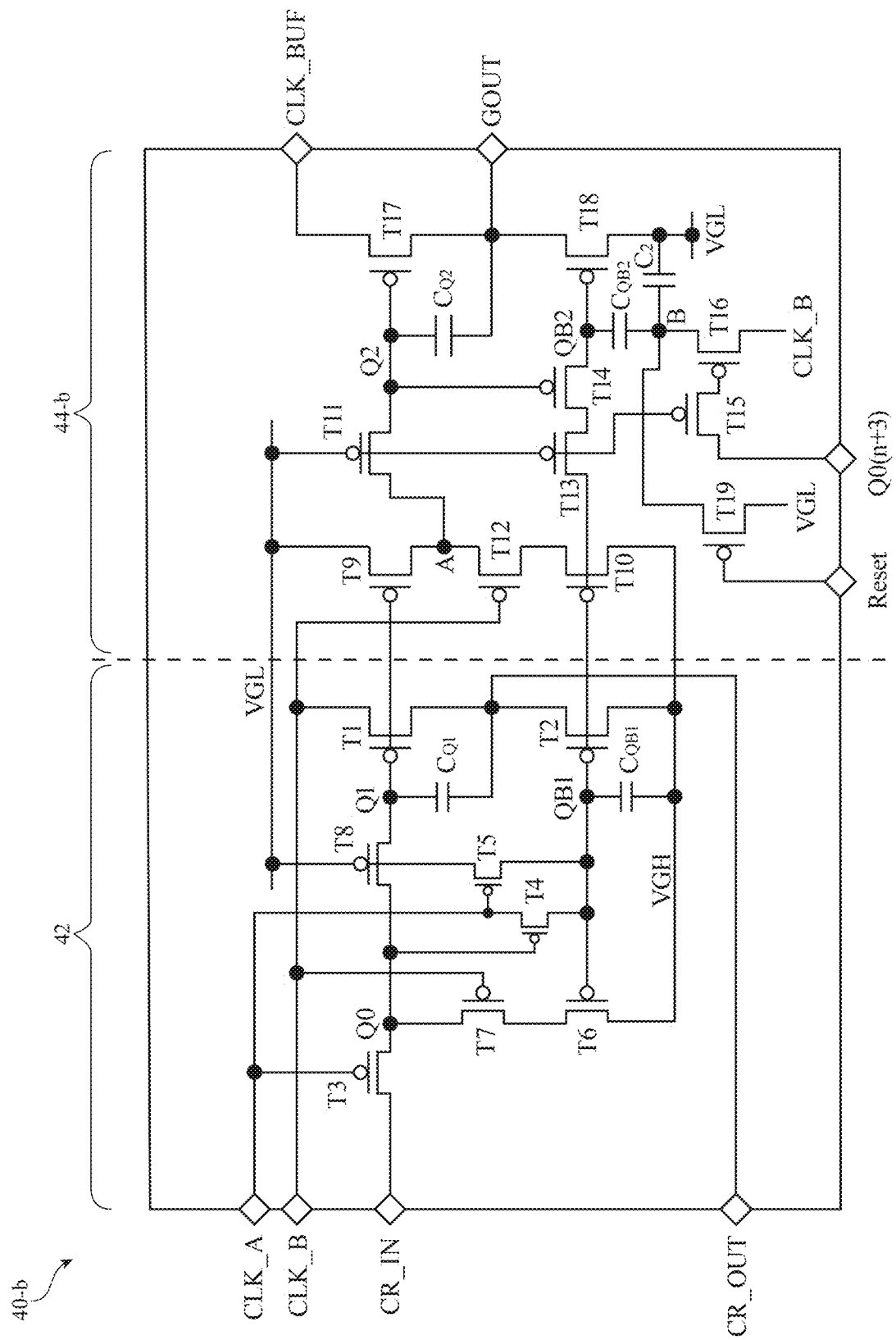
FIG. 15 is a circuit diagram of another implementation of an illustrative gate driver circuit in accordance with some embodiments.

The example of gate driver 40-*a* of FIG. 14 is illustrative. FIG. 15 shows another embodiment of a gate driver circuit such as gate driver 40-*b*. As shown in FIG. 15, gate driver 40-*b* may include shift register subcircuit 42 and output buffer subcircuit 44-*b*. The shift register subcircuit 42 in gate driver 40-*b* of FIG. 15 may have an identical structure as shift register subcircuit 42 in gate driver 40 of FIG. 5A and need not be reiterated in detail to avoid obscuring the present embodiment.

Figure 16A:
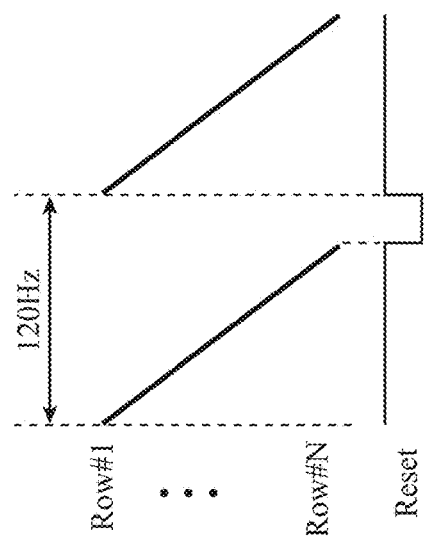
FIG. 16A is a timing diagram showing the behavior of a reset signal for a display operating at a high(er) refresh rate in accordance with some embodiments.

The output buffer subcircuit 44-*b* in gate driver 40-*b* of FIG. 15 may be substantially similar to the output buffer subcircuit 44-*a* of FIG. 14, except output buffer subcircuit 44-*b* includes an additional transistor T19 (e.g., a p-type silicon transistor). Transistor T19 may have a gate terminal configured to receive a reset (control) signal, a source terminal coupled to node B, and a drain terminal coupled to low power supply voltage VGL. The behavior of the reset signal can be illustrated in FIG. 16A or 16B. FIG. 16A is a timing diagram showing the behavior of the reset signal for display 14 operating at a high(er) refresh rate (e.g., at refresh rates greater than 10 Hz, greater than 30 Hz, greater than 60 Hz, greater than 90 Hz, greater than 100 Hz, greater than 120 Hz, 30-120 Hz, or other high refresh rates). As shown in the example of FIG. 16A illustrating a 120 Hz refresh rate, a vertical blanking period Vblank can occur after all N rows in the display has been refreshed. The reset signal can be pulsed low during vertical blanking period Vblank and driven high during other periods (e.g., during refresh periods).

Figure 16B:
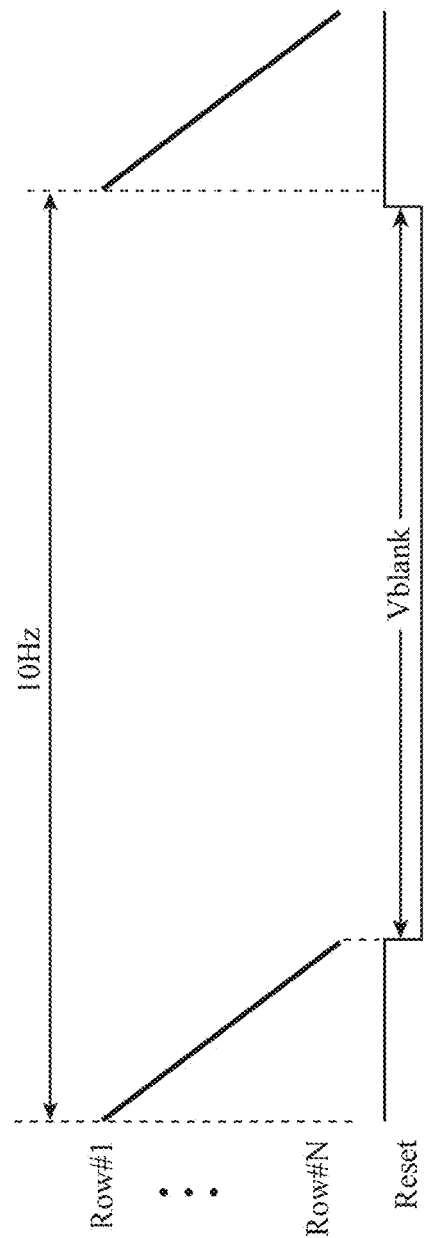
FIG. 16B is a timing diagram showing the behavior of a reset signal for a display operating at a low(er) refresh rate in accordance with some embodiments.

FIG. 16B is a timing diagram showing the behavior of the reset signal for display 14 operating at a low(er) refresh rate (e.g., at refresh rates less than 20 Hz, less than 15 Hz, less than 10 Hz, less than 5 Hz, less than 2 Hz, less than 1 Hz, 1-10 Hz, or other low refresh rates). As shown in the example of FIG. 16B illustrating a 10 Hz refresh rate, a vertical blanking period Vblank can occur after all N rows in the display has been refreshed. The reset signal can be pulsed low during vertical blanking period Vblank and driven high during other periods (e.g., during refresh periods). Adjusting the reset signal that is applied to the output buffer subcircuit in this manner can be beneficial. In the example of FIG. 15, pulsing the reset signal low during the vertical blanking period will activate (turn on) p-type silicon transistor T19, which will pull node B towards VGL. In other words, the reset signal can be "asserted" (e.g., driven low for p-type transistors) during the vertical blanking period to turn on the corresponding transistor and "deasserted" (e.g., driven high for p-type transistors) during other times. Doing so can ensure that node B, which is capacitively coupled to node QB2 via capacitor $C_{QB2}$, is actively driven low, which can further enhance the stability of output buffer subcircuit 44-b during the vertical blanking period.

Figure 17:
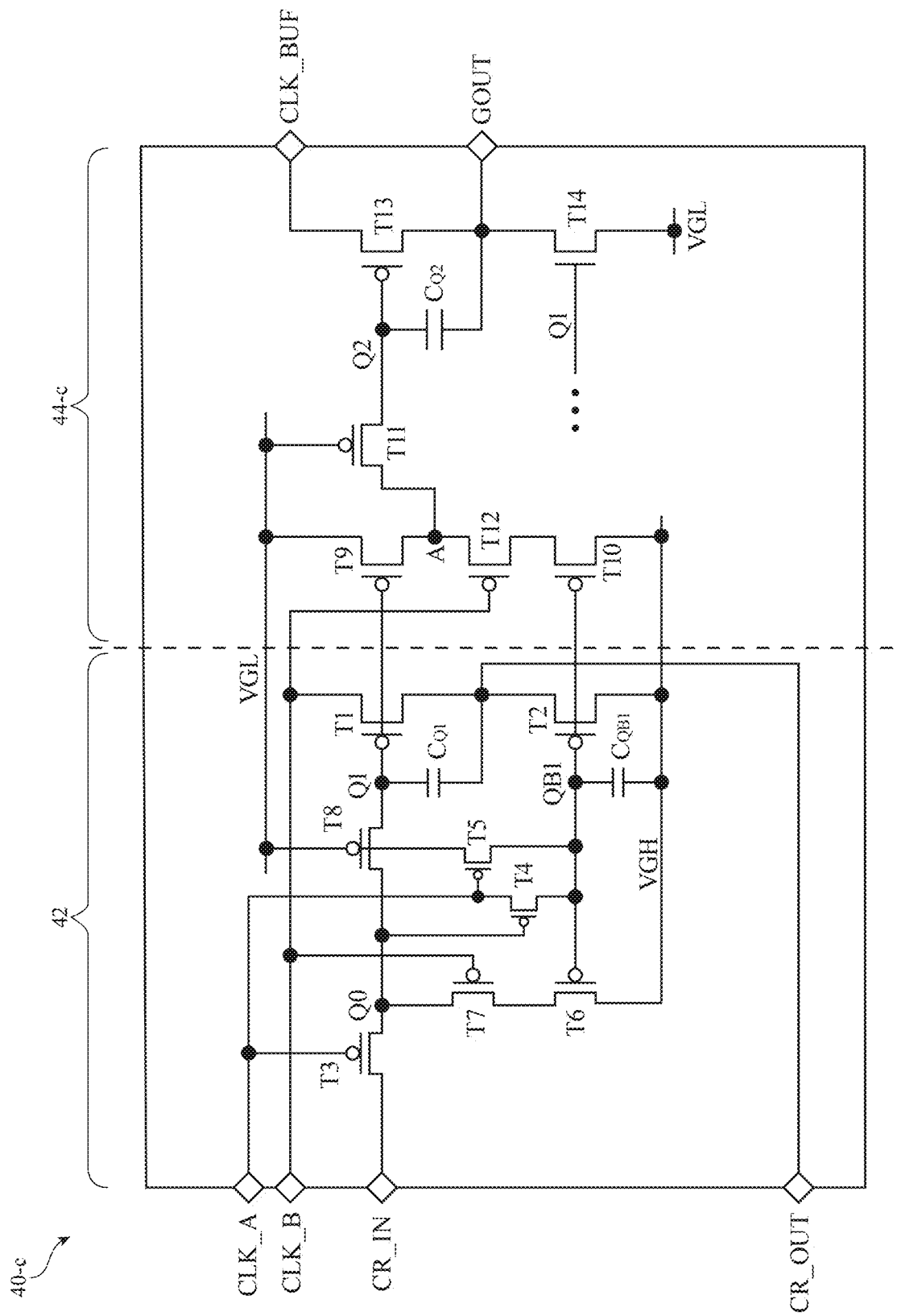
FIG. 17 is a circuit diagram of another implementation of an illustrative gate driver circuit in accordance with some embodiments.

FIG. 17 shows another embodiment of a gate driver circuit such as gate driver 40-c. As shown in FIG. 17, gate driver 40-c may include shift register subcircuit 42 and output buffer subcircuit 44-c. The shift register subcircuit 42 in gate driver 40-c of FIG. 17 may have an identical structure as shift register subcircuit 42 in gate driver 40 of FIG. 14 and need not be reiterated in detail to avoid obscuring the present embodiment.

Output buffer subcircuit 44-c may include a first output buffer transistor T13 coupled in series with a second output buffer transistor T14. First output buffer transistor T13 may be a p-type silicon transistor having a source terminal configured to receive output buffer clock signal CLK_BUF, a gate terminal coupled to node Q2, and a drain terminal coupled to a gate driver output port on which gate output signal GOUT is generated. Transistor T13 can be sized relatively large to help ensure that gate output signal GOUT has sufficiently short rise and fall times. Signal GOUT may, for example, represent a scan signal for controlling data loading transistor Tdata in FIG. 3 or other switching transistors within pixel 22.

Second output buffer transistor T14 may be implemented as an n-type semiconducting oxide transistor having a drain terminal coupled to the gate driver output port, a gate terminal coupled to the Q1 node in shift register subcircuit 42, and a drain terminal coupled to low power supply signal VGL. Implementing the second (pull-down) output buffer transistor T14 as a semiconducting oxide transistor may be technically advantageous and beneficial since semiconducting oxide transistors are less prone to leakage. Since node Q1 is held high at VGH during vertical blanking periods, transistor T14 can exhibit low on-state resistance, which ensures that scan signal GOUT is driven at a low impedance and can help minimize any potential parasitic perturbations caused by user touch events during operation of touch screen display 14. This configuration in which gate driver 40-c includes both silicon transistors and semiconducting oxide transistors can be referred to as a "hybrid" gate driver circuit.

Output buffer subcircuit 44-c may also include transistors T9-T11 (e.g., PMOS silicon transistors) and capacitor $C_{Q2}$. Capacitor $C_{Q2}$ may be coupled across the gate terminal and the drain terminal of output buffer transistor T13. Transistor T11 may have a first source-drain terminal coupled to node Q2 (i.e., the gate terminal of transistor T17), a second source-drain terminal coupled to node A, and a gate terminal configured to receive low voltage VGL. Transistors T9 may have a drain terminal coupled to low voltage VGL, a gate terminal coupled to node Q1 in the shift register subcircuit 42, and a source terminal coupled to node A. Transistor T12 may have a drain terminal coupled to node A, a gate terminal configured to receive clock signal CLK_B, and a source terminal coupled to transistor T10. Transistor T10 may have a drain terminal coupled to the source terminal of T12, a gate terminal coupled to node QB1 in the shift register subcircuit 42, and a source terminal coupled to high power supply voltage VGH. The operation of gate driver 40-c of FIG. 17 is similar to the timing diagram already shown in FIG. 11B and need not be reiterated in detail to avoid obscuring the present embodiments.

Figure 18:
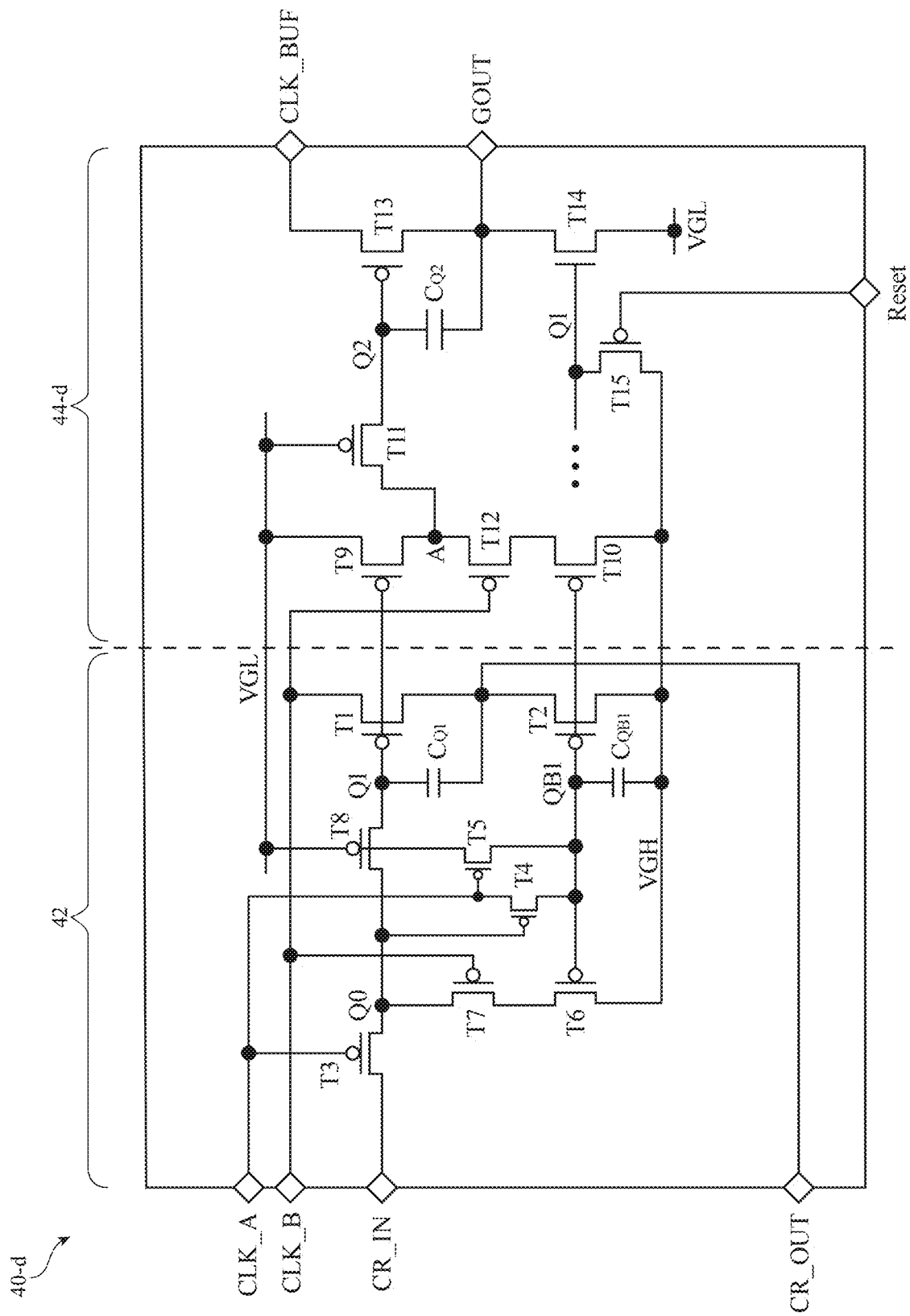
FIG. 18 is a circuit diagram of another implementation of an illustrative gate driver circuit in accordance with some embodiments.

The example of gate driver 40-c of FIG. 17 is illustrative. FIG. 18 shows another embodiment of a gate driver circuit such as gate driver 40-d. As shown in FIG. 18, gate driver 40-d may include shift register subcircuit 42 and output buffer subcircuit 44-d. The shift register subcircuit 42 in gate driver 40-d of FIG. 18 may have an identical structure as shift register subcircuit 42 in gate driver 40-c of FIG. 17 and need not be reiterated in detail to avoid obscuring the present embodiment.

The output buffer subcircuit 44-d in gate driver 40-d of FIG. 18 may be substantially similar to the output buffer subcircuit 44-c of FIG. 17, except output buffer subcircuit 44-d includes an additional transistor T15 (e.g., a p-type silicon transistor). Transistor T15 may have a gate terminal configured to receive a reset (control) signal, a source terminal coupled to high power supply voltage VGH, and a drain terminal coupled to the gate terminal of transistor T14 (and thus also node Q1). The behavior of the reset signal can be illustrated in FIG. 16A or 16B, where the reset signal can be pulsed low during vertical blanking period Vblank and driven high during other periods (e.g., during refresh periods). Adjusting the reset signal that is applied to the output buffer subcircuit in this manner can be beneficial. In the example of FIG. 18, pulsing the reset signal low during the vertical blanking period will activate (turn on) p-type silicon transistor T15, which will actively pull node Q1 towards VGH. Doing so can ensure that n-type semiconducting oxide transistor T14 is fully activated with low on-state resistance during the vertical blanking period.

Figure 19:
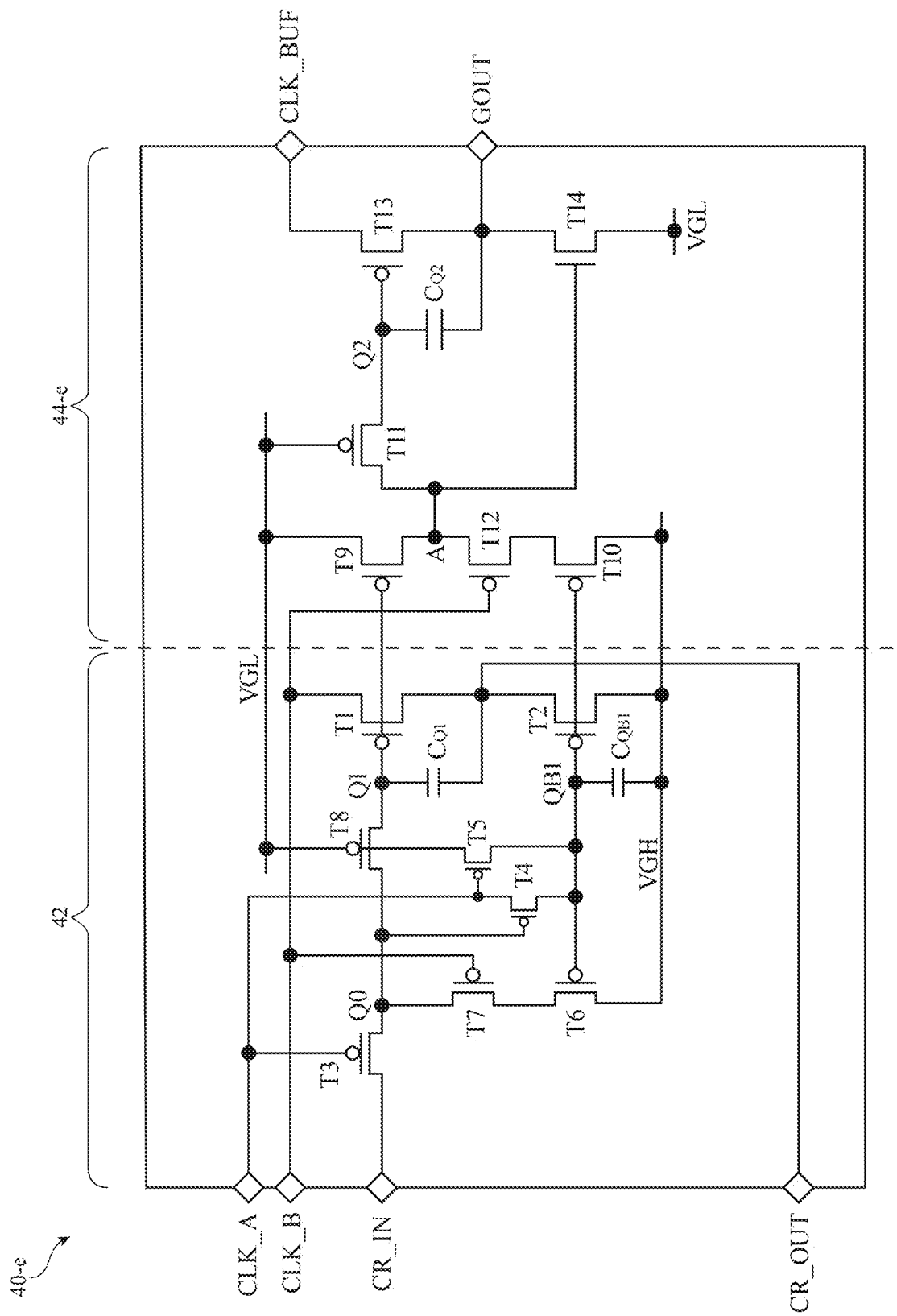
FIG. 19 is a circuit diagram of another implementation of an illustrative gate driver circuit in accordance with some embodiments.

The embodiment FIG. 17 in which the gate terminal of second output buffer transistor T14 is connected to the Q1 node is illustrative. FIG. 19 shows another embodiment of the gate driver circuit such as gate driver 40-e that includes shift register subcircuit 42 and output buffer subcircuit 44-e. As shown in FIG. 19, the gate terminal of second output buffer transistor T14 in subcircuit 44-e can be connected to intermediate node A that is interposed between transistors T9 and T12. The remaining structure of gate driver 40-e is identical to that already described in connection with FIG. 17 and need not be iterated to avoid obscuring the present embodiment.

Figure 20:
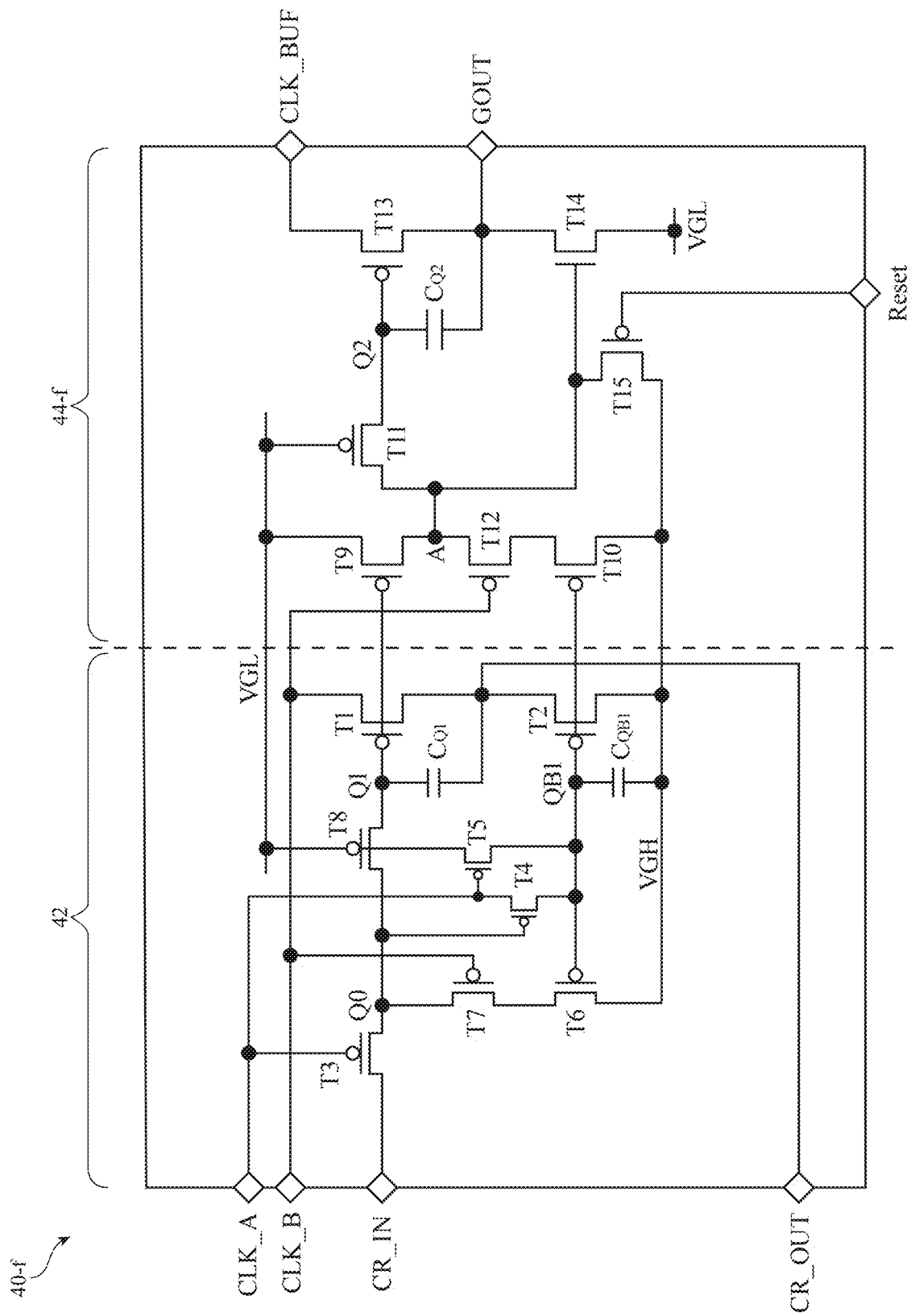
FIG. 20 is a circuit diagram of another implementation of an illustrative gate driver circuit in accordance with some embodiments.

FIG. 20 shows a variation of the gate driver of FIG. 19 such as gate driver 40-f. As shown in FIG. 20, gate driver 40-f can include shift register subcircuit 42 and output buffer subcircuit 44-f. Relative to gate driver 40-e of FIG. 19, gate driver 40-f of FIG. 20 can further include an additional transistor T15 (e.g., a p-type silicon transistor). Transistor T15 may have a gate terminal configured to receive a reset (control) signal, a source terminal coupled to high power supply voltage VGH, and a drain terminal coupled to the gate terminal of transistor T14 (and thus also node Q1). The behavior of the reset signal can be illustrated in FIG. 16A or 16B, where the reset signal can be pulsed low during vertical blanking period Vblank and driven high during other periods (e.g., during refresh periods). Adjusting the reset signal that is applied to the output buffer subcircuit in this manner can be beneficial. In the example of FIG. 20, pulsing the reset signal low during the vertical blanking period will activate (turn on) p-type silicon transistor T15, which will actively pull node A towards VGH. Doing so can ensure that n-type semiconducting oxide transistor T14 is fully activated with low on-state resistance during the vertical blanking period.

Figure 21:
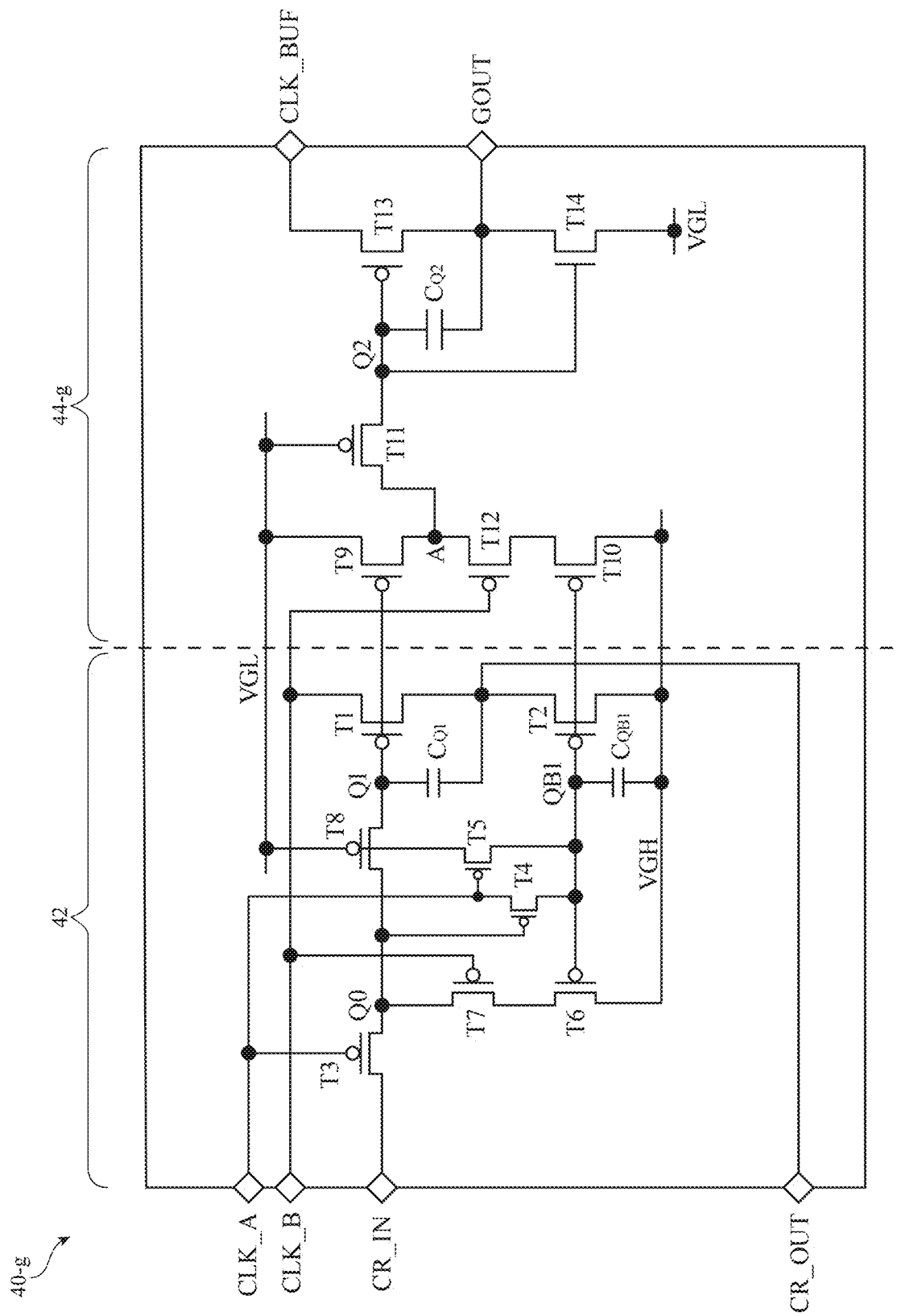
FIG. 21 is a circuit diagram of another implementation of an illustrative gate driver circuit in accordance with some embodiments.

The embodiment FIG. 19 in which the gate terminal of second output buffer transistor T14 is connected to node A is illustrative. FIG. 21 shows another embodiment of the gate driver circuit such as gate driver 40-g that includes shift register subcircuit 42 and output buffer subcircuit 44-g. As shown in FIG. 21, the gate terminal of second output buffer transistor T14 in subcircuit 44-g can be connected to node Q2 at the gate of the first output buffer transistor T13. The remaining structure of gate driver 40-g is identical to that already described in connection with FIG. 19 and need not be iterated to avoid obscuring the present embodiment.

Figure 22:
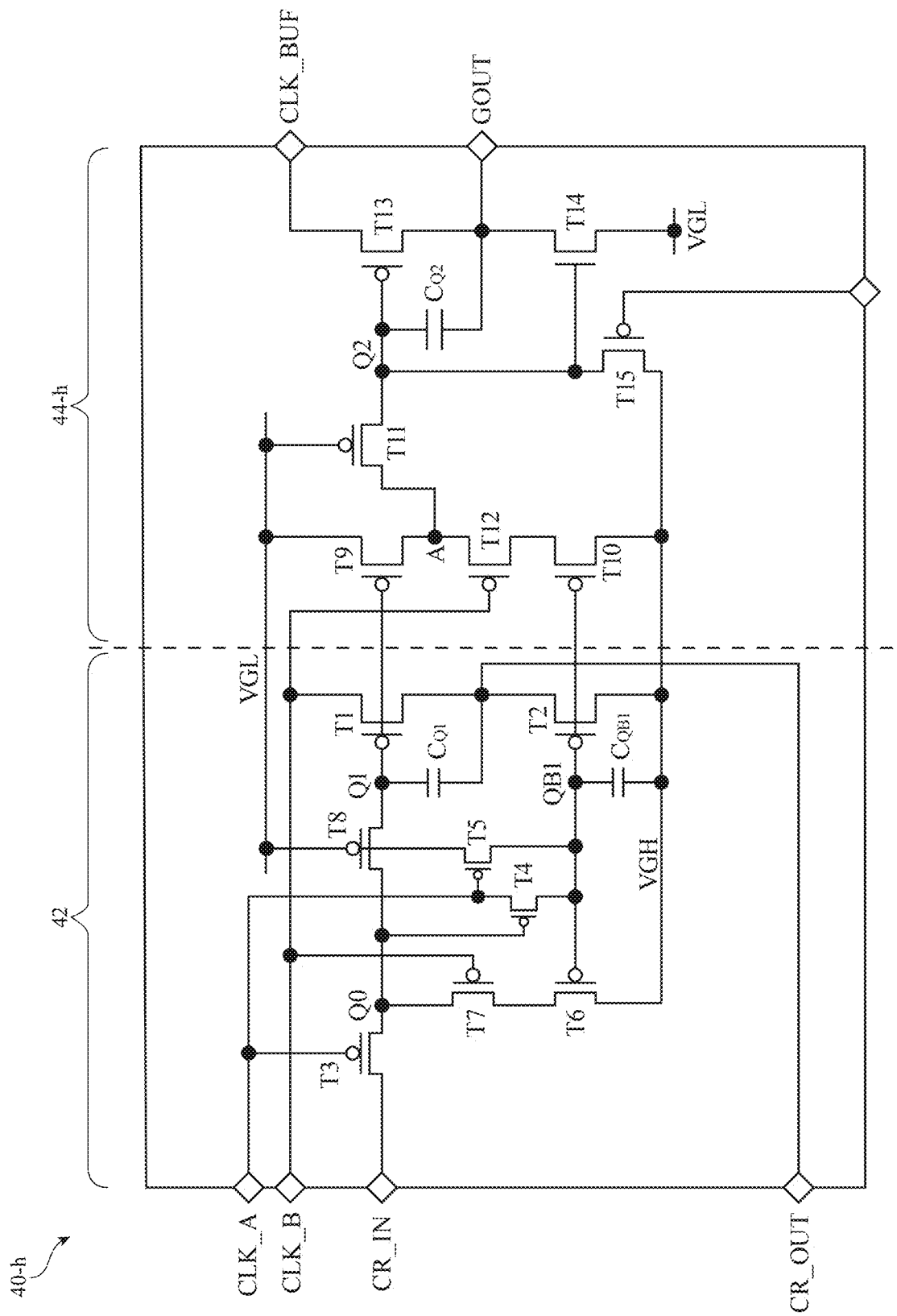
FIG. 22 is a circuit diagram of another implementation of an illustrative gate driver circuit in accordance with some embodiments.
Figure 23:
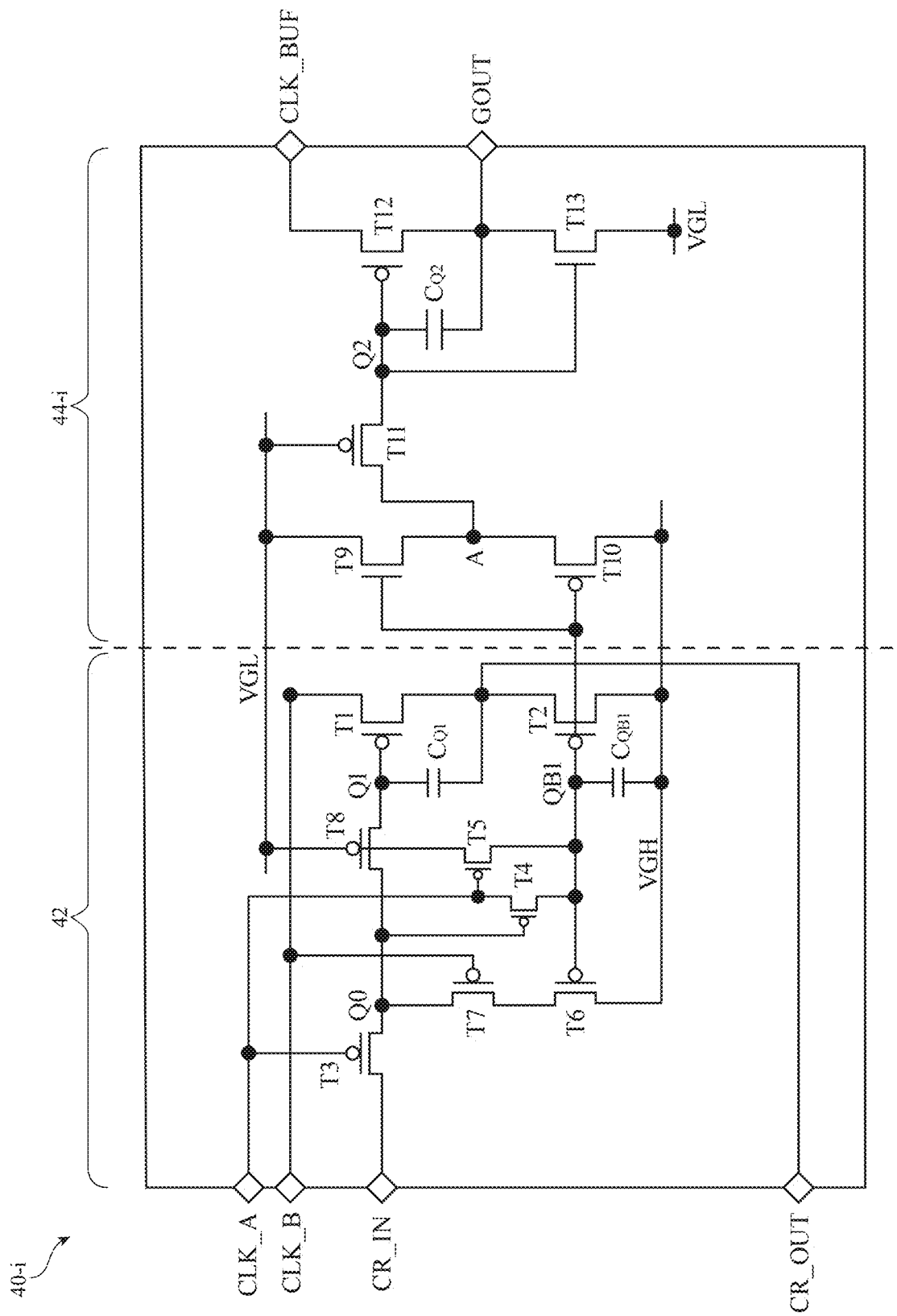
FIG. 23 is a circuit diagram of another implementation of an illustrative gate driver circuit in accordance with some embodiments.

FIG. 22 shows a variation of the gate driver of FIG. 21 such as gate driver 40-h. As shown in FIG. 22, gate driver 40-h can include shift register subcircuit 42 and output buffer subcircuit 44-h. Relative to gate driver 40-g of FIG. 21, gate driver 40-h of FIG. 22 can further include an additional transistor T15 (e.g., a p-type silicon transistor). Transistor T15 may have a gate terminal configured to receive a reset (control) signal, a source terminal coupled to high power supply voltage VGH, and a drain terminal coupled to the gate terminal of transistor T14 (and thus also node Q1). The behavior of the reset signal can be illustrated in FIG. 16A or 16B, where the reset signal can be pulsed low during vertical blanking period Vblank and driven high during other periods (e.g., during refresh periods). Adjusting the reset signal that is applied to the output buffer subcircuit in this manner can be beneficial. In the example of FIG. 22, pulsing the reset signal low during the vertical blanking period will activate (turn on) p-type silicon transistor T15, which will actively pull node Q2 towards VGH. Doing so can ensure that n-type semiconducting oxide transistor T14 is fully activated with low on-state resistance (while ensuring that p-type transistor T13 is fully deactivated) during the vertical blanking period. The embodiment of FIG. 21 in which the output buffer subcircuit 44-g has three transistors T9, T12, and T10 connected in series between VGL and VGH is illustrative. FIG. 23 shows another embodiment of a gate driver circuit such as gate driver 40-i that includes shift register subcircuit 42 and output buffer subcircuit 44-i. As shown in FIG. 23, output buffer subcircuit 44-i may omit transistor T12, and transistor T9 is now implemented as an n-type semiconducting oxide transistor. In particular, n-type transistor T9 may have a source terminal coupled to the VGL power supply line, a drain terminal coupled to node A, and a gate terminal shorted to the gate terminal of transistor T10 (e.g., the gate terminal of transistor T9 can be connected to node QB1). The remaining structure of gate driver 40-i may be identical to that already described above in connection with FIG. 21 and need not be reiterated to avoid obscuring the present embodiment.

Figure 24:
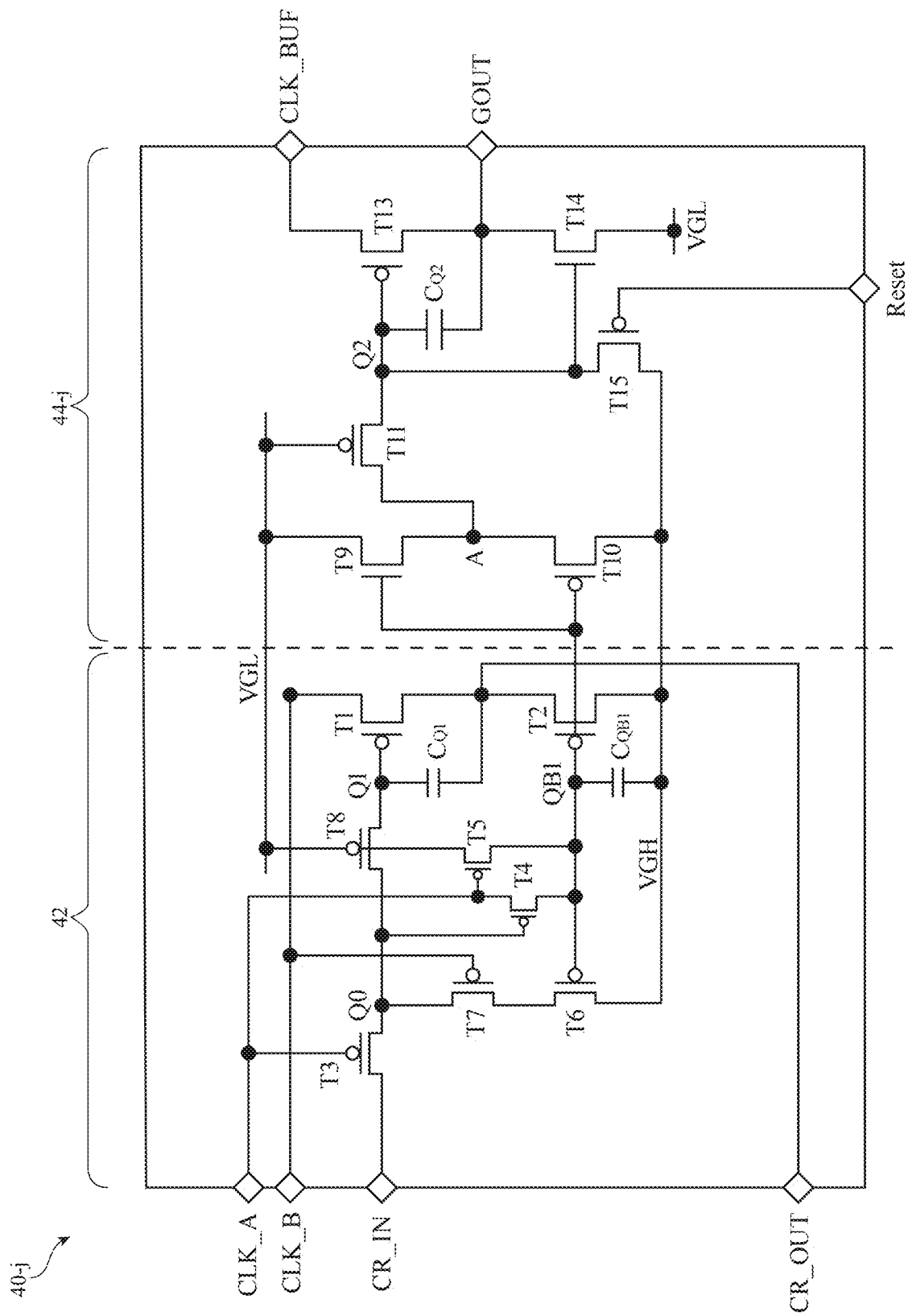
FIG. 24 is a circuit diagram of another implementation of an illustrative gate driver circuit in accordance with some embodiments.

FIG. 24 shows a variation of the gate driver of FIG. 23 such as gate driver 40-j. As shown in FIG. 24, gate driver 40-j can include shift register subcircuit 42 and output buffer subcircuit 44-j. Relative to gate driver 40-i of FIG. 23, gate driver 40-j of FIG. 24 can further include an additional transistor T15 (e.g., a p-type silicon transistor). Transistor T15 may have a gate terminal configured to receive a reset (control) signal, a source terminal coupled to high power supply voltage VGH, and a drain terminal coupled to the gate terminal of transistor T14 (and thus also node Q1). The behavior of the reset signal can be illustrated in FIG. 16A or 16B, where the reset signal can be pulsed low during vertical blanking period Vblank and driven high during other periods (e.g., during refresh periods). Adjusting the reset signal that is applied to the output buffer subcircuit in this manner can be beneficial. In the example of FIG. 24, pulsing the reset signal low during the vertical blanking period will activate (turn on) p-type silicon transistor T15, which will actively pull node Q2 towards VGH. Doing so can ensure that n-type semiconducting oxide transistor T14 is fully activated with low on-state resistance (while ensuring that p-type transistor T13 is fully deactivated) during the vertical blanking period.

Figure 25:
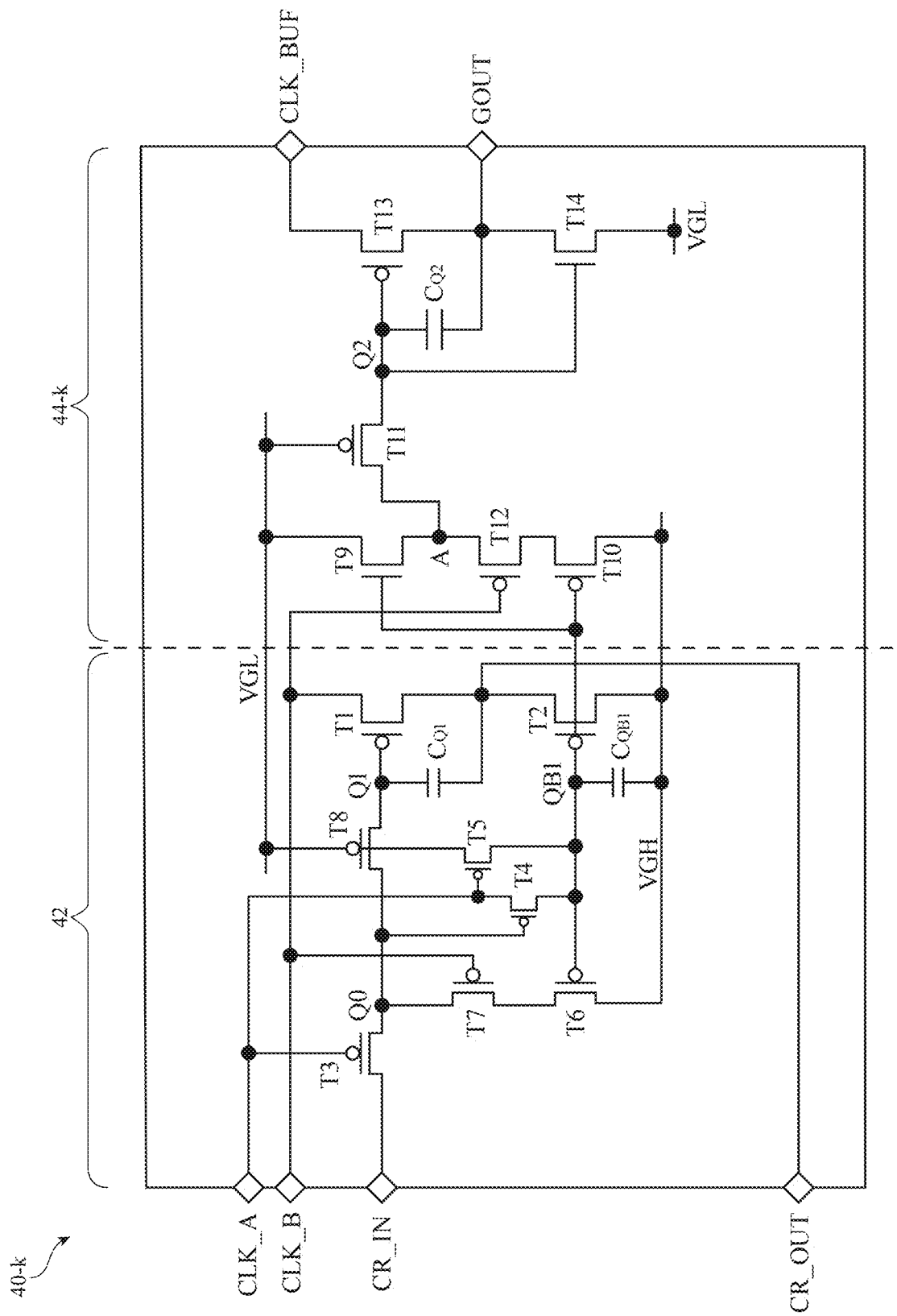
FIG. 25 is a circuit diagram of another implementation of an illustrative gate driver circuit in accordance with some embodiments.

The embodiment of FIG. 21 in which the output buffer subcircuit 44-g has three transistors T9, T12, and T10 connected in series between VGL and VGH and are all implemented as p-type silicon transistors is illustrative. FIG. 25 shows another embodiment of a gate driver circuit such as gate driver 40-k that includes shift register subcircuit 42 and output buffer subcircuit 44-k. As shown in FIG. 25, transistor T9 of output buffer subcircuit 44-k is now implemented as an n-type semiconducting-oxide transistor. In particular, transistor T9 may have a source terminal coupled to the VGL power supply line, a drain terminal coupled to node A, and a gate terminal shorted to the gate terminal of transistor T10 (e.g., the gate terminal of transistor T9 can be connected to node QB1). The remaining structure of gate driver 40-k may be identical to that already described above in connection with FIG. 21 and need not be reiterated to avoid obscuring the present embodiment.

Figure 26:
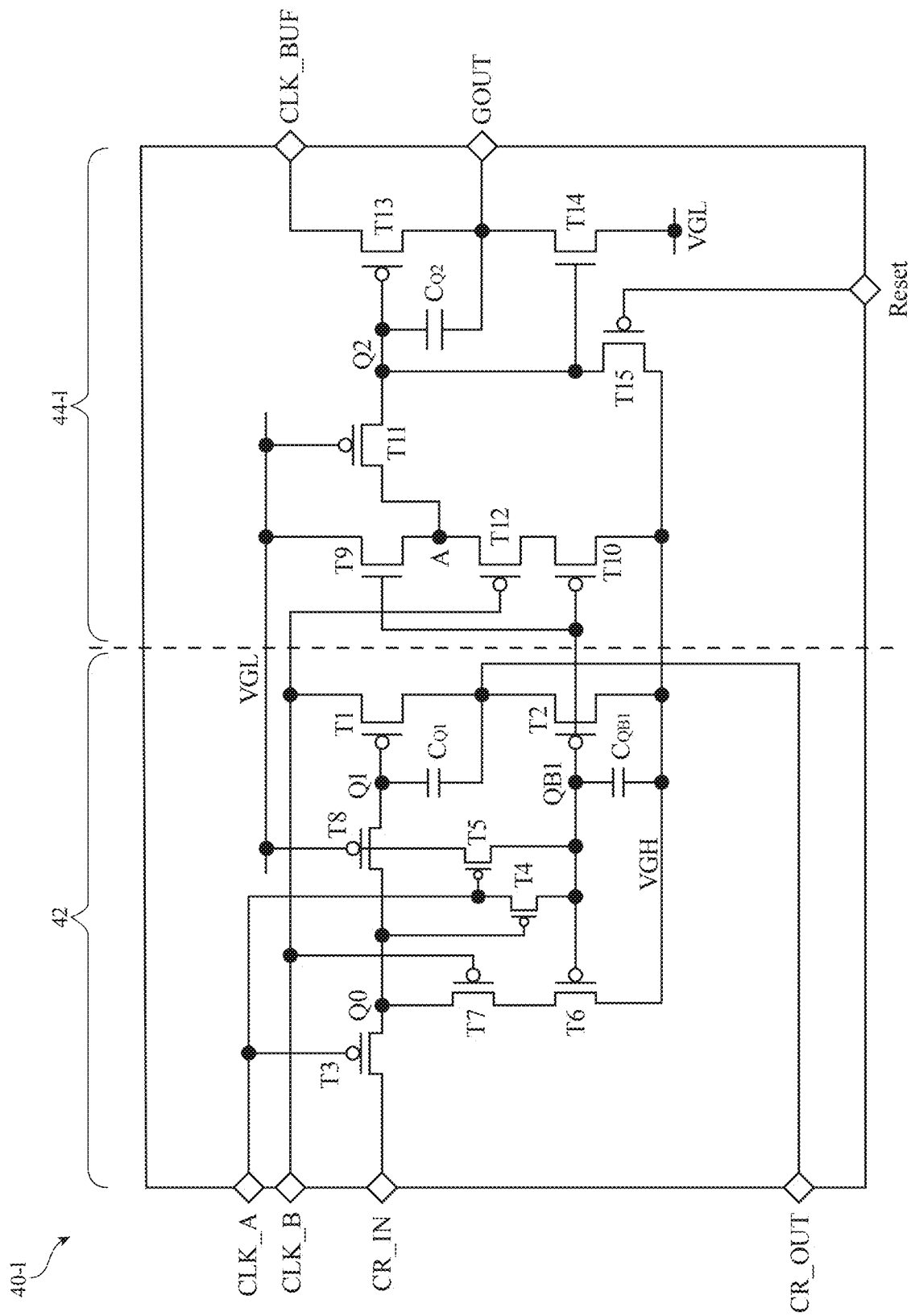
FIG. 26 is a circuit diagram of another implementation of an illustrative gate driver circuit in accordance with some embodiments.

FIG. 26 shows a variation of the gate driver of FIG. 25 such as gate driver 40-l. As shown in FIG. 26, gate driver 40-l can include shift register subcircuit 42 and output buffer subcircuit 44-l. Relative to gate driver 40-k of FIG. 25, gate driver 40-l of FIG. 26 can further include an additional transistor T15 (e.g., a p-type silicon transistor). Transistor T15 may have a gate terminal configured to receive a reset (control) signal, a source terminal coupled to high power supply voltage VGH, and a drain terminal coupled to the gate terminal of transistor T14 (and thus also node Q1). The behavior of the reset signal can be illustrated in FIG. 16A or 16B, where the reset signal can be pulsed low during vertical blanking period Vblank and driven high during other periods (e.g., during refresh periods). Adjusting the reset signal that is applied to the output buffer subcircuit in this manner can be beneficial. In the example of FIG. 26, pulsing the reset signal low during the vertical blanking period will activate (turn on) p-type silicon transistor T15, which will actively pull node Q2 towards VGH. Doing so can ensure that n-type semiconducting oxide transistor T14 is fully activated with low on-state resistance (while ensuring that p-type transistor T13 is fully deactivated) during the vertical blanking period.

Figure 27:
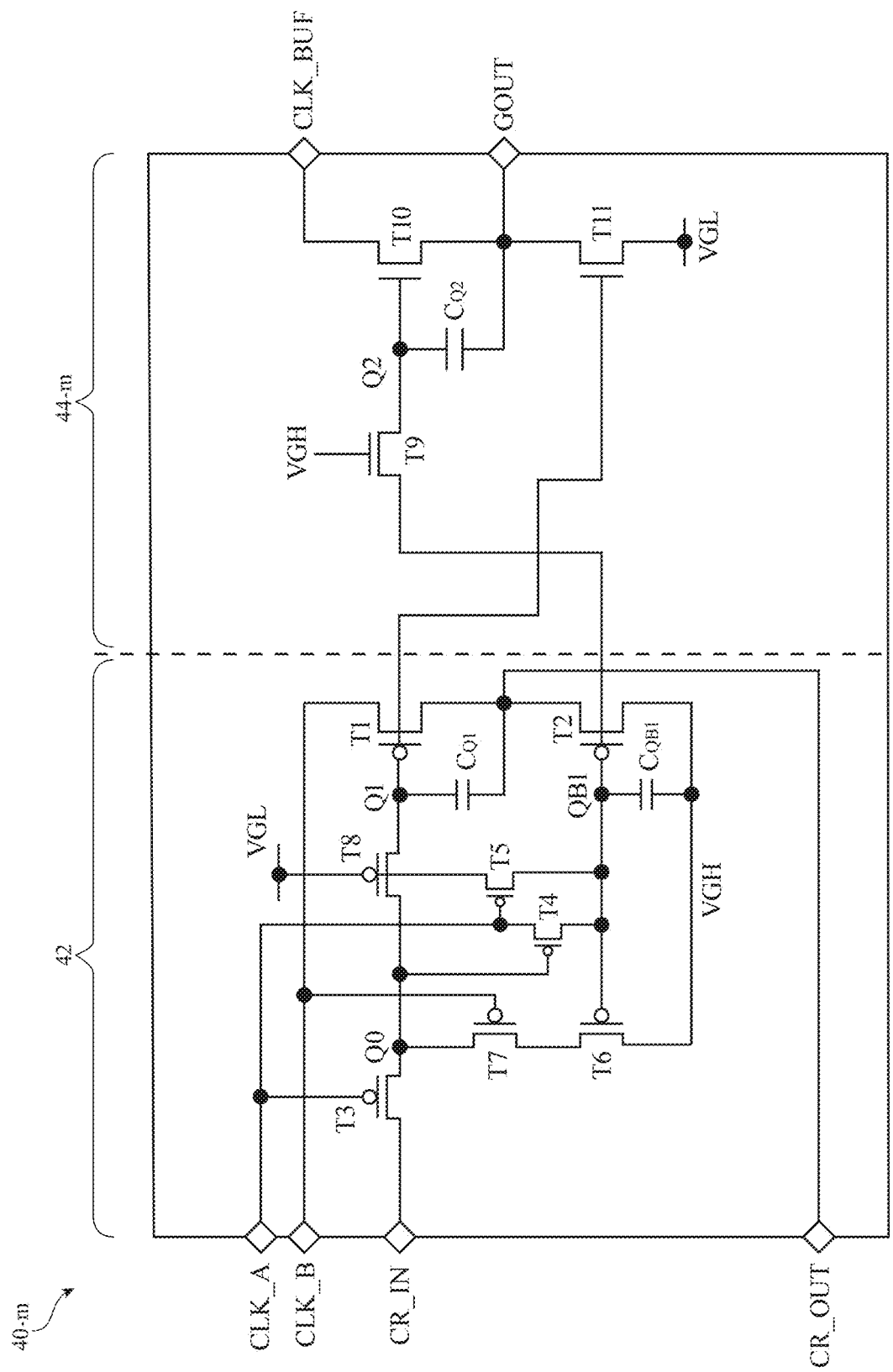
FIG. 27 is a circuit diagram of another implementation of an illustrative gate driver circuit in accordance with some embodiments.

FIG. 27 is a circuit diagram of another implementation of a gate driver circuit such as gate driver circuit 40-m. As shown in FIG. 27, gate driver 40-m may include shift register subcircuit 42 and output buffer subcircuit 44-m. The shift register subcircuit 42 in gate driver 40-m of FIG. 14 may have an identical structure as shift register subcircuit 42 in gate driver 40 of FIG. 5A and need not be reiterated in detail to avoid obscuring the present embodiment. There is one minor difference only in the labeling of transistors in portion 42, where transistor TA in FIG. 5A is now relabeled as transistor T8 in FIG. 27. Here, the difference is that all of the transistors within output buffer subcircuit 44-m is now implemented as semiconducting oxide transistors (e.g., n-type transistors).

Output buffer subcircuit 44-m may include a first output buffer transistor T10 coupled in series with a second output buffer transistor T11. Transistors T10 and T11 can both be n-type semiconducting oxide transistors. First output buffer transistor T10 has a drain terminal configured to receive output buffer clock signal CLK_BUF, a gate terminal coupled to node Q2, and a source terminal coupled to a gate driver output port on which gate output signal GOUT is generated. Transistor T10 can be sized relatively large to help ensure that gate output signal GOUT has sufficiently short rise and fall times. Second output buffer transistor T11 can have a drain terminal coupled to the gate driver output port, a gate terminal coupled to node Q1 within shift register subcircuit 42, and a drain terminal coupled to low power supply signal VGL.

Output buffer subcircuit 44-*m* may also include transistor T9 (e.g., an n-type semiconducting oxide transistor) and capacitors $C_{Q2}$. Capacitor $C_{Q2}$ may be coupled across the gate terminal and the source terminal of output buffer transistor T10. Transistor T9 may have a first source-drain terminal coupled to node Q2 (i.e., the gate terminal of transistor T10), a second source-drain terminal coupled to node QB1 within shift register subcircuit 42, and a gate terminal configured to receive high voltage VGH. Implementing all transistors within output buffer subcircuit 44-*m* may be technically advantageous and beneficial to help maintain low on-resistance for transistor T11 during vertical blanking periods while providing optimal stability.

Figure 28:
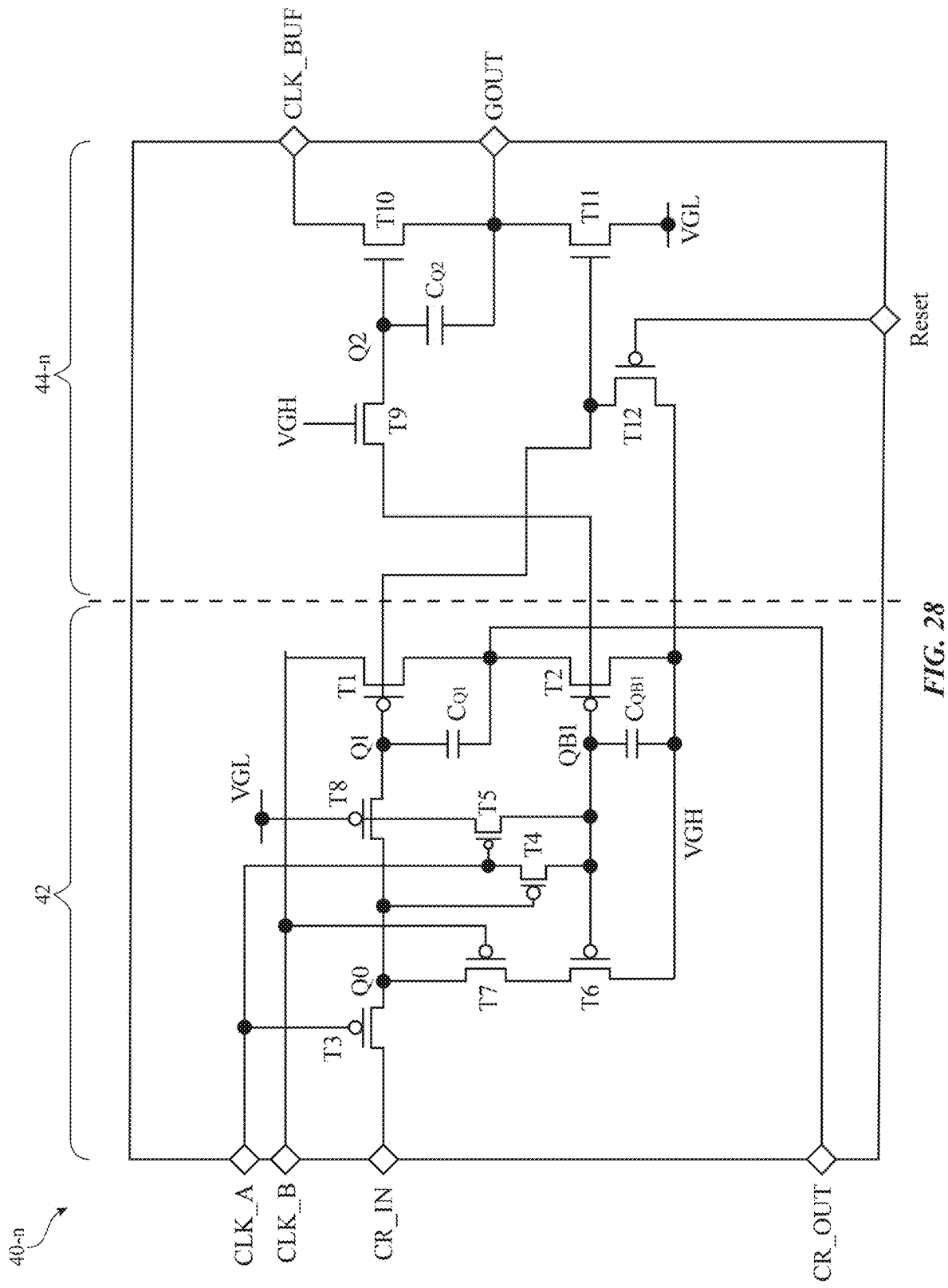
FIG. 28 is a circuit diagram of another implementation of an illustrative gate driver circuit in accordance with some embodiments.

FIG. 28 shows a variation of the gate driver of FIG. 27 such as gate driver 40-*n*. As shown in FIG. 28, gate driver 40-*n* can include shift register subcircuit 42 and output buffer subcircuit 44-*n*. Relative to gate driver 40-*m* of FIG. 27, gate driver 40-*n* of FIG. 28 can further include an additional transistor T12 (e.g., a p-type silicon transistor). Transistor T12 may have a gate terminal configured to receive a reset (control) signal, a source terminal coupled to high power supply voltage VGH, and a drain terminal coupled to the gate terminal of transistor T11 (and thus also node Q1). The behavior of the reset signal can be illustrated in FIG. 16A or 16B, where the reset signal can be pulsed low (e.g., asserted) during vertical blanking period Vblank and driven high (or deasserted) during other periods (e.g., during refresh periods). Adjusting the reset signal that is applied to the output buffer subcircuit in this manner can be beneficial. In the example of FIG. 28, pulsing the reset signal low during the vertical blanking period will activate (turn on) p-type silicon transistor T12, which will actively pull node Q1 towards VGH. Doing so can ensure that n-type semiconducting oxide transistor T11 is fully activated with low on-state resistance during the vertical blanking period.

The foregoing is merely illustrative and various modifications can be made to the described embodiments. The foregoing embodiments may be implemented individually or in any combination.

What is claimed is:

1. A display gate driver circuit comprising:
a shift register subcircuit configured to receive shift register clock signals, to receive a carry in signal, and to generate a carry out signal; and
an output buffer subcircuit configured to receive an output buffer clock signal and to generate a corresponding gate output signal, the output buffer subcircuit including:
a first transistor having a first source-drain terminal configured to receive the output buffer clock signal, a second source-drain terminal at which the gate output signal is generated, and a gate terminal;
a second transistor having a first source-drain terminal coupled to the second source-drain terminal of the first transistor, a second source-drain terminal coupled to a power supply line, and a gate terminal; and
a third transistor having a gate terminal coupled to the gate terminal of the first transistor, a first source-drain terminal coupled to the gate terminal of the second transistor, and a second source-drain terminal configured to receive a time-varying voltage signal from the shift register subcircuit.

2. The display gate driver circuit of claim 1, wherein the output buffer subcircuit further comprises:
a fourth transistor having a gate terminal coupled to the power supply line, a first source-drain terminal coupled to the second source-drain terminal of the third transistor, and a second source-drain terminal coupled to the shift register subcircuit.

3. The display gate driver circuit of claim 2, wherein the output buffer subcircuit further comprises:
a first capacitor coupled between the gate terminal and the second source-drain terminal of the first transistor;
a second capacitor having a first terminal coupled to the gate terminal of the second transistor and having a second terminal; and
a third capacitor having a first terminal coupled to the second terminal of the second capacitor and having a second terminal coupled to the power supply line.

4. The display gate driver circuit of claim 3, wherein the output buffer subcircuit further comprises:
a fifth transistor having a first source-drain terminal coupled to the second terminal of the second capacitor, a second source-drain terminal configured to receive one of the shift register clock signals, and a gate terminal; and
a sixth transistor having a first source-drain terminal coupled to the gate terminal of the fifth transistor, a second source-drain terminal coupled to another display gate driver circuit, and a gate terminal coupled to the power supply line.

5. The display gate driver circuit of claim 4, wherein the output buffer subcircuit further comprises:
a seventh transistor having a first source-drain terminal coupled to the gate terminal of the first transistor, a gate terminal coupled to the power supply line, and a second source-drain terminal; and
a plurality of transistors connected in series between the power supply line and an additional power supply line, wherein the second source-drain terminal of the seventh transistor is coupled to a node disposed along the plurality of series-connected transistors.

6. The display gate driver circuit of claim 4, wherein the output buffer subcircuit further comprises:
an seventh transistor having a first source-drain terminal coupled to the second terminal of the second capacitor, a second source-drain terminal coupled to the power supply line, and a gate terminal configured to receive a reset signal that is pulsed during a vertical blanking period.

7. A display gate driver circuit comprising:
a shift register subcircuit configured to receive shift register clock signals, to receive a carry in signal, and to generate a carry out signal; and
an output buffer subcircuit configured to receive an output buffer clock signal and to generate a corresponding gate output signal, the output buffer subcircuit including:
a first transistor having a first source-drain terminal configured to receive the output buffer clock signal, a second source-drain terminal at which the gate output signal is generated, and a gate terminal;
a second transistor having a first source-drain terminal coupled to the second source-drain terminal of the first transistor, a second source-drain terminal coupled to a power supply line, and a gate terminal; and third and fourth transistors coupled in series between the gate terminal of the second transistor and the shift register subcircuit.

8. The display gate driver circuit of claim 7, wherein:
the third transistor has a first source-drain terminal coupled to the gate terminal of the second transistor, a gate terminal coupled to the gate terminal of the first transistor, and a second source-drain terminal; and
the fourth transistor has a first source-drain terminal coupled to the second source-drain terminal of the third transistor, a gate terminal coupled to the power supply line, and a second source-drain terminal coupled to the the shift register subcircuit.

9. The display gate driver circuit of claim 8, wherein the output buffer subcircuit further comprises:
a fifth transistor having a first source-drain terminal coupled to the gate terminal of the second transistor and having a second source-drain terminal configured to receive one of the shift register clock signals.

10. The display gate driver circuit of claim 9, wherein the output buffer subcircuit further comprises:
a first capacitor having a first terminal coupled to the gate terminal of the second transistor and having a second terminal coupled to the first source-drain terminal of the fifth transistor; and
a second capacitor having a first terminal coupled to the second terminal of the first capacitor and having a second terminal coupled to the power supply line.

11. The display gate driver circuit of claim 9, wherein the output buffer subcircuit further comprises:
a sixth transistor having a first source-drain terminal coupled to a gate terminal of the fifth transistor, a gate terminal coupled to the power supply line, and a second source-drain terminal coupled to an additional display gate driver circuit.

12. The display gate driver circuit of claim 11, wherein the output buffer subcircuit further comprises:
a seventh transistor having a first source-drain terminal coupled to the first source-drain terminal of the fifth transistor, a second source-drain terminal coupled to the power supply line, and a gate terminal configured to receive a reset signal.

13. The display gate driver circuit of claim 12, wherein the output buffer subcircuit further comprises:
an eighth transistor coupled to the power supply line;
a ninth transistor coupled in series with the eighth transistor, wherein the gate terminal of the first transistor is coupled to a node disposed between the eighth and ninth transistors; and
a tenth transistor having a first source-drain terminal coupled to the ninth transistor, a second source-drain terminal coupled to an additional power supply line, and a gate terminal coupled to the shift register subcircuit.

14. Display circuitry comprising:
an array of display pixels; and
a plurality of gate driver circuits coupled to corresponding rows of display pixels in the array of display pixels, wherein at least one gate driver circuit in the plurality of gate driver circuits comprises:
a shift register subcircuit configured to receive shift register clock signals, to receive a carry in signal, and to generate a carry out signal; and
an output buffer subcircuit configured to receive an output buffer clock signal and to generate a corresponding gate output signal, the output buffer subcircuit including:
a first transistor having a first source-drain terminal configured to receive the output buffer clock signal, a second source-drain terminal at which the gate output signal is generated, and a gate terminal;
a second transistor having a first source-drain terminal coupled to the second source-drain terminal of the first transistor, a second source-drain terminal coupled to a power supply line, and a gate terminal; and
a third transistor having a first source-drain terminal coupled to the gate terminal of the second transistor, a second source-drain terminal coupled to the power supply line, and a gate terminal configured to receive a reset signal.

15. The display circuitry of claim 14, wherein the output buffer subcircuit of the at least one gate driver circuit in the plurality of gate driver circuits further comprises:
a fourth transistor having a first source-drain terminal coupled to the gate terminal of the second transistor, a second source-drain terminal configured to receive one of the shift register clock signals, and a gate terminal.

16. The display circuitry of claim 14, wherein the output buffer subcircuit of the at least one gate driver circuit in the plurality of gate driver circuits further comprises:
a fifth transistor having a first source-drain terminal coupled to the gate terminal of the fourth transistor and a second source-drain terminal coupled to an additional gate driver circuit in the plurality of gate driver circuits.

17. The display circuitry of claim 16, wherein the output buffer subcircuit of the at least one gate driver circuit in the plurality of gate driver circuits further comprises:
a first capacitor coupled between the gate terminal of the second transistor and the fourth transistor; and
a second capacitor coupled between the power supply line and the first source-drain terminal of the fourth transistor.

18. The display circuitry of claim 16, wherein the output buffer subcircuit of the at least one gate driver circuit in the plurality of gate driver circuits further comprises:
sixth and seventh transistors coupled in series between the gate terminal of the second transistor and the shift register subcircuit.

19. The display circuitry of claim 18, wherein the output buffer subcircuit of the at least one gate driver circuit in the plurality of gate driver circuits further comprises:
eighth, ninth, and tenth transistors coupled in series between the power supply line and an additional power supply line, wherein the tenth transistor has a gate terminal coupled to a source-drain terminal of the seventh transistor.

20. The display circuitry of claim 19, wherein the output buffer subcircuit of the at least one gate driver circuit in the plurality of gate driver circuits further comprises:
an eleventh transistor having a first source-drain terminal coupled to the gate terminal of the first transistor, a gate terminal coupled to the power supply linen, and a second source-drain terminal coupled to a node disposed between the eighth and ninth transistors.

* * * * *